(12) United States Patent
Dias et al.

(10) Patent No.: US 12,539,350 B2
(45) Date of Patent: Feb. 3, 2026

(54) ION-SUBSTITUTED BOVINE HYDROXYAPATITE FOR BONE REGENERATION

(71) Applicants: Dhawan Shrey, New Delhi (IN); Shamindhi Subasinghe, New Delhi (IN)

(72) Inventors: S. N. George P. J. Dias, Dunedin (NZ); Jithendra Ratnayake, Dunedin (NZ); Ramesh Niranjan, Dunedin (NZ)

( * ) Notice: Subject to any disclaimer, the term of this patent is extended or adjusted under 35 U.S.C. 154(b) by 522 days.

(21) Appl. No.: 17/999,882

(22) PCT Filed: May 24, 2021

(86) PCT No.: PCT/IN2021/050501
§ 371 (c)(1),
(2) Date: Nov. 25, 2022

(87) PCT Pub. No.: WO2021/240539
PCT Pub. Date: Dec. 2, 2021

(65) Prior Publication Data
US 2023/0241284 A1    Aug. 3, 2023

(30) Foreign Application Priority Data

May 25, 2020    (IN) .............................. 202011021805

(51) Int. Cl.
*A61L 27/12*    (2006.01)

(52) U.S. Cl.
CPC .................................. *A61L 27/12* (2013.01)

(58) Field of Classification Search
None
See application file for complete search history.

(56) References Cited

U.S. PATENT DOCUMENTS

2015/0098875 A1    4/2015    Lee et al.

FOREIGN PATENT DOCUMENTS

| EP | 2445543 A1 | 5/2012 | |
|---|---|---|---|
| EP | 3777904 B1 * | 4/2022 | ............ A61L 27/12 |
| IN | 201931010903 A | 5/2020 | |
| IN | 202021047886 A | 11/2020 | |
| IN | 202041057139 A | 1/2021 | |
| WO | 2005046746 A2 | 5/2005 | |
| WO | 2007092559 A2 | 8/2007 | |
| WO | 2010036919 A1 | 4/2010 | |
| WO | 2015162589 A2 | 10/2015 | |
| WO | 2019115704 A1 | 6/2019 | |

OTHER PUBLICATIONS

Adv. Mater. Lett. 6(11): 984-989 (2015). (Year: 2015).*
International Search Report, PCT/IN2021/050501, mailed Aug. 23, 2021, 4 pgs.
Written Opinion of the International Searching Authority, PCT/IN2021/050501, mailed May 24, 2021, 5 pgs.
Agrawal, K., Synthesis and Characterization of Hydroxyapatite Powder by Sol-Gel Method for Biomedical Application. 2011. Journal of Minerals & Materials Characterization & Engineering.
Aina et al., Cytotoxicity of zinc-containing bioactive glasses in contact with human osteoblasts. 2007. Chem. Biol. Interact. 167, 207-218.
Aina, V., et al., Magnesium- and strontium-co-substituted hydroxyapatite: the effects of doped-ions on the structure and chemico-physical properties. 2012. J. Mater. Sci. Mater. Med. 23, 2867-79.
Akram, M., et al., 2014. Extracting hydroxyapatite and its precursors from natural resources. 2014. J. Mater. Sci. 49, 1461-1475.
Aminian, A., Synthesis of silicon-substituted hydroxyapatite by a hydrothermal method with two different phosphorous sources. 2011. Ceram. Int. 37, 1219-1229.
Aurobind, S. V. et al., Sol-gel based surface modification of electrodes for electro analysis. 2006. Advances in Colloid and Interface Science. 121, 1-7.
Bang, L.T., et al., Carbonate Hydroxyapatite and Silicon-Substituted Carbonate Hydroxyapatite: Synthesis, Mechanical Properties, and Solubility Evaluations. 2014. Sci. World J. 1-9.
Bellows, C.G. et al., Initiation and progression of mineralization of bone nodules formed in vitro: the role of alkaline phosphatase and organic phosphate. 1991. Bone Miner. 14, 27-40.
Ben-Nissan, B., Sol-gel production of bioactive nanocoatings for medical applications. Part 1: an introduction. 2006. Nanomedicine 1, 311-319.
Bezzi, G., A novel sol-gel technique for hydroxyapatite preparation. 2003. Mater. Chem. Phys. 78, 816-824.
Bigi, A. et al., Chemical and structural characterization of the mineral phase from cortical and trabecular bone. 1997. Inorg Biochem 68, 45-51.
Bigi, A. et al., Magnesium influence on hydroxyapatite crystallization. 1993. J. Inorg. Biochem. 49, 69-78.
Bigi, A. et al., Rietveld structure refinements of calcium hydroxylapatite containing magnesium. 1996. Acta Crystallogr. Sect. B Struct. Sci. 52, 87-92.

(Continued)

*Primary Examiner* — David J Blanchard
*Assistant Examiner* — Daniel F Coughlin
(74) *Attorney, Agent, or Firm* — Carlson, Caspers, Vandenburgh & Lindquist, P.A.

(57) ABSTRACT

The present invention relates an ion substituted bovine-derived hydroxyapatite (ion substituted BHA) with at least one type of ion selected from F, Si, Cl, carbonate, citrate, Na, K, Ag, Mn, Zn, Zr, Cu, Co, Fe, Au, B, Ba, Al, Bi, Mg or Sr, or combinations thereof. The modified BHA by ionic doping augments the strength and biocompatibility of the bone graft, reduces healing time, and have a minimal reaction in the body after surgery. The various aspects of the ion-substituted BHA of the present invention have been described along with the FIGS. 1 to 50. The present invention also relates to a process of preparing the ion substituted bovine-derived hydroxyapatite. The invention further relates to a scaffold comprising the ion-substituted bovine-derived hydroxyapatite.

7 Claims, 45 Drawing Sheets
(15 of 45 Drawing Sheet(s) Filed in Color)

(56) References Cited

OTHER PUBLICATIONS

Bigi, A. et al., Structural and chemical characterization of inorganic deposits in calcified human mitral valve. 1988. J. Inorg. Biochem. 34, 75-82.

Bigi, A. et al., The role of magnesium on the structure of biological apatites. 1992. Calcif. Tissue Int. 50, 439-444.

Bignon, A. et al., Effect of micro- and macroporosity of bone substitutes on their mechanical properties and cellular response. 2003. J. Mater. Sci. Mater. Med.

Boanini, E., et al., Ionic substitutions in calcium phosphates synthesized at low temperature. 2010. Acta Biomater 6, 1882-1894.

Boanini, E., et al., Osteopenic bone cell response to strontium-substituted hydroxyapatite. 2011. J. Mater. Sci. Mater. Med. 22, 2079-88.

Bornapour, M. et al., Biocompatibility and biodegradability of Mg—Sr alloys: the formation of Sr-substituted hydroxyapatite. 2013. Acta Biomater. 9, 5319-30.

Botelho, C.M., Structural analysis of Si-substituted hydroxyapatite: zeta potential and X-ray photoelectron spectroscopy. 2002. J. Mater. Sci. Mater. Med. 13, 1123-1127.

Calabrese, G. et al., Collagen-Hydroxyapatite Scaffolds Induce Human Adipose Derived Stem Cells Osteogenic Differentiation In Vitro. 2016. PLoS One 11, e0151181.

Canalis, E., The divalent strontium salt S12911 enhances bone cell replication and bone formation in vitro. 1996. Bone 18, 517-523.

Cerozi, B. da S., The effect of pH on phosphorus availability and speciation in an aquaponics nutrient solution. 2016. Bioresour. Technol. 219, 778-781.

Chen, Y., et al., In Vitro Biocompatibility and Osteoblast Differentiation of an Injectable Chitosan/Nano-Hydroxyapatite/Collagen Scaffold. 2012. J. Nanomater., 1-6.

Chen, Y., Thermal and chemical stability of fluorohydroxyapatite ceramics with different fluorine contents. 2005. Biomaterials 26, 1205-1210.

Cheng, K. et al., Sol-gel derived fluoridated hydroxyapatite films. 2003. Mater. Res. Bull. 38, 89-97.

Cheng, K., Sol-gel preparation of fluoridated hydroxyapatite in Ca(NO 3)2-PO(OH)3-x(OEt)x-HPF6 system. 2006. J. Sol-Gel Sci. Technol. 38, 13-17.

Christoffersen, J., et al., Effects of strontium ions on growth and dissolution of hydroxyapatite and on bone mineral detection. 1997. Bone 20, 47-54.

Christoffersen, M.R. et al., Kinetics of growth and dissolution of calcium hydroxyapatite in suspensions with variable calcium to phosphate ratio. 1998. J. Cryst. Growth 186, 283-290.

Coelho, M.J., et al., Human bone cell cultures in biocompatibility testing. Part II: Effect of ascorbic acid, β-glycerophosphate and dexamethasone on osteoblastic differentiation. 2000. Biomaterials 21, 1095-1102.

Cordell, J.M., et al., The influence of micropore size on the mechanical properties of bulk hydroxyapatite and hydroxyapatite scaffolds. 2009. J. Mech. Behav. Biomed. Mater. 2, 560-570.

Damien, E., A preliminary study on the enhancement of the osteointegration of a novel synthetic hydroxyapatite scaffold in vivo. 2003. J. Biomed. Mater. Res.—Part A 66, 241-246.

Darroudi, M., Preparation and Characterization of Fluorohydroxyapatite Nanopowders by Nonalkoxide Sol-Gel Method. 2010. Dig. J. Nanomater. Biostructures 5, 29-33.

Dastjerdi, R. et al., A review on the application of inorganic nano-structured materials in the modification of textiles: Focus on anti-microbial properties. 2010. Colloids Surfaces B Biointerfaces 79, 5-18.

Díaz-Visurraga, J. et al., Metal nanostructures as antibacterial agents. 2011. Sci. Technol. against Microb. Pathog. Res. Dev. Eval. 210-218.

Dorozhkin, S. V., et al., Biological and Medical Significance of Calcium Phosphates. Angew. 2002. Chemie Int. Ed. 41, 3130-3146.

Elliott, J.C., Structure and Chemistry of the Apatites and Other Calcium Orthophosphates, Studies in Inorganic Chemistry. 1994.

Farley, Wergedal, et al., Fluoride directly stimulates proliferation and alkaline phosphatase activity of bone-forming cells. 1983. Science (80). 222, 330-332.

Foster, D.L., Studies on Calcium Phosphates Derived from New Zealand Animal Bone, University of Waikato. 2001.

Gaasbeek, R.D.A., et al., Mechanism of bone incorporation of β-TCP bone substitute in open wedge tibial osteotomy in patients. 2005. Biomaterials 26, 6713-6719.

Gao, Y., et al., Characterization and osteoblast-like cell compatibility of porous scaffolds: bovine hydroxyapatite and novel hydroxyapatite artificial bone. 2006. J. Mater. Sci. Mater. Med. 17, 815-823.

Gayathri, B. et al., Magnesium incorporated hydroxyapatite nanoparticles: Preparation, characterization, antibacterial and larvicidal activity. 2018. Arab. J. Chem. 11, 645-654.

Gonzalez, J. et al., Magnesium degradation under physiological conditions—Best practice. 2018. Bioact. Mater. 3, 174-185.

Gopi et al., Synthesis and spectral characterization of silver/magnesium co-substituted hydroxyapatite for biomedical applications, Spectrochim. 2014. Acta. A. Mol. Biomol. Spectrosc. 127, 286-91.

Gu, Y.W., et al., Bone-like apatite layer formation on hydroxyapatite prepared by spark plasma sintering (SPS). 2004. Biomaterials 25, 4127-4134.

Habibovic, P. et al., 3D microenvironment as essential element for osteoinduction by biomaterials. 2005. Biomaterials 26, 3565-3575.

Hajipour, M.J. et al., Antibacterial properties of nanoparticles. 2012. Trends Biotechnol. 30, 499-511.

Hing, K.A. et al., Microporosity enhances bioactivity of synthetic bone graft substitutes, in: Journal of Materials Science: Materials in Medicine. 2005.

Hing, K.A., et al., Characterization of porous hydroxyapatite. 1999. J. Mater. Sci. Mater. Med. 10, 135-45.

Jiao, M.-J. et al., Electrolytic deposition of magnesium-substituted hydroxyapatite crystals on titanium substrate. 2009. Mater. Lett. 63, 2286-2289.

Simchi, A. et al., Recent progress in inorganic and composite coatings with bactericidal capability for orthopaedic applications. 2011. Nanomedicine Nanotechnology, Biol. Med. 7, 22-39.

Sogo, Y., et al., Zinc containing hydroxyapatite ceramics to promote osteoblastic cell activity. 2004. Mater. Sci. Technol. 20, 1079-1083.

Sopyan, I., Synthesis of nano sized hydroxyapatite powder using sol-gel technique and its conversion to dense and porous bodies. 2008. Indian J. Chem.—Sect. A Inorganic, Phys. Theor. Anal. Chem. 47, 1626.

Tahmasebifar, A., et al., Structural and mechanical characteristics of hydroxyapatite and tri-calcium phosphates doped with Al3+ and F-ions. 2013. J. Ceram. Process. Res. 14, 549-556.

Takahashi, N. et al., S 12911-2 inhibits osteoclastic bone resorption in vitro. 2003. J. Bone Miner. Res. 18, 1082-7.

Tang, Q., Production and characterization of HA and SiHA coatings. 2010. J Mater Sci Mater Med 21, 173-181.

Tang, X.L., Structural characterization of silicon-substituted hydroxyapatite synthesized by a hydrothermal method. 2005. Mater. Lett. 59, 3841-3846.

Tavares, D. dos S. et al., Synthesis and cytotoxicity evaluation of granular magnesium substituted B-tricalcium phosphate. 2013. J. Appl. Oral Sci. 21, 37-42.

Teixeira, S. et al., Biocompatibility of highly macroporous ceramic scaffolds: cell adhesion and morphology studies. 2008. J. Mater. Sci. Mater. Med. 19, 855-859.

Thian, E.S., The response of osteoblasts to nanocrystalline silicon-substituted hydroxyapatite thin films. 2006. Biomaterials 27, 2692-2698.

Tredwin, C.J., Sol-gel derived hydroxyapatite, fluorhydroxyapatite and fluorapatite coatings for titanium implants. 2009. University College London.

Tsai, S.-W. et al., Fabrication and Characterization of Strontium-Substituted Hydroxyapatite-CaO—CaCO3 Nanofibers with a Mesoporous Structure as Drug Delivery Carriers. 2018. Pharmaceutics 10, 179.

(56) References Cited

OTHER PUBLICATIONS

Valiense, H. et al., In vitro and in vivo evaluation of strontium-containing nanostructured carbonated hydroxyapatite/sodium alginate for sinus lift in rabbits. 2016. J. Biomed. Mater. Res.—Part B Appl. Biomater. 104, 274-282.
Veiderma, M., et al., Impact of anionic substitutions on apatite structure and properties, 2005. Journal of Organometallic Chemistry. pp. 2638-2643.
Vijayalakshmi, U., Preparation and characterization of microcrystalline hydroxyapatite using sol gel method. 2006. Trends Biomater. Artif. Organs 19, 57-62.
Wei et al., Synthesis and characterization of hydroxyapatite, fluoride-substituted hydroxyapatite and fluorapatite. 2003. J. Mater. Sci. Mater. Med. 14, 311-320.
Witte, F. et al., Biodegradable magnesium-hydroxyapatite metal matrix composites. 2007. Biomaterials 28, 2163-74.
Woodard, J.R. et al., The mechanical properties and osteoconductivity of hydroxyapatite bone scaffolds with multi-scale porosity. 2007. Biomaterials 28, 45-54.
Zhang, E. et al., In vivo evaluation of biodegradable magnesium alloy bone implant in the first 6 months implantation. 2009. J. Biomed. Mater. Res. A 90, 882-93.
Zou, S., Crystal imperfection studies of pure and silicon substituted hydroxyapatite using Raman and XRD, in: Journal of Materials Science: Materials in Medicine. 2005. J Mater Sci Mater Med, pp. 1143-1148.
Jillavenkatesa, A., Sol-gel processing of hydroxyapatite. 1998. J. Mater. Sci. 33, 4111-4119.
Johnson et al., The processing and characterization of animal-derived bone to yield materials with biomedical applications. Part 1: Modifiable porous implants from bovine condyle cancellous bone and characterization of bone materials as a function of processing. 2000, J. Mater. Sci. Mater. Med. 11, 427-441.
Joschek, S. et al., Chemical and physicochemical characterization of porous hydroxyapatite ceramics made of natural bone. 2000. Biomaterials 21, 1645-1658.
Jyoti, M.A., et al., In vitro bioactivity and biocompatibility of calcium phosphate cements using Hydroxy-propyl-methyl-Cellulose (HPMC). 2010. Appl. Surf. Sci. 257, 1533-1539.
Kannan, S., Effect of sodium addition on the preparation of hydroxyapatites and biphasic ceramics. 2008. Ceram. Int. 34, 7-13.
Kanno, T. et al., Platelet-rich plasma enhances human osteoblast-like cell proliferation and differentiation. 2005. J. Oral Maxillofac. Surg. 63, 362-369.
Karageorgiou, V., Porosity of 3D biomaterial scaffolds and osteogenesis. 2005. Biomaterials 26 5474-5491.
Kaygili, O. et al., Sol-gel synthesis and characterization of Sr/Mg, Mg/Zn and Sr/Zn co-doped hydroxyapatites. 2015. Mater. Lett. 141, 161-164.
Kim, H.W., Fluor-hydroxyapatite sol-gel coating on titanium substrate for hard tissue implants. 2004. Biomaterials 25, 3351-3358.
Kim, H.W., Sol-gel derived fluor-hydroxyapatite biocoatings on zirconia substrate. 2004. Biomaterials 25, 2919-2926.
Kokubo, T. et al., Solutions able to reproduce in vivo surface-structure changes in bioactive glass-ceramic A-W3. 1990. J. Biomed. Mater. Res. 24, 721-734.
Kokubo, T., Bioactive glass ceramics: properties and applications. 1991. Biomaterials. 12, 155-163.
Kolmas et al., Incorporation of carbonate and magnesium ions into synthetic hydroxyapatite: The effect on physicochemical properties. 2011. J. Mol. Struct. 987, 40-50.
Krishnamurithy et al., Characterization of bovine-derived porous hydroxyapatite scaffold and its potential to support osteogenic differentiation of human bone marrow derived mesenchymal stem cells. 2014. Ceram. Int. 40, 771-777.
Kuboki, Y., BMP-induced osteogenesis on the surface of hydroxyapatite with geometrically feasible and nonfeasible structures: Topology of osteogenesis. 1998. J. Biomed. Mater. Res. 39, 190-199.

Kuriakose, T.A. et al., Synthesis of stoichiometric nano crystalline hydroxyapatite by ethanol-based sol-gel technique at low temperature. 2004. J. Cryst. Growth 263, 517-523.
Landi, E., Biomimetic Mg-substituted hydroxyapatite: from synthesis to in vivo behaviour. 2008. J. Mater. Sci. Mater. Med. 19, 239-47.
Larsen, M.J., Solubility, unit cell dimensions and crystallinity of fluoridated human dental enamel. 1989. Arch. Oral Biol. 34, 969-973.
Le Huec, J.C. et al., Influence of porosity on the mechanical resistance of hydroxyapatite ceramics under compressive stress. 1995. Biomaterials 16, 113-118.
Lee, J.H. et al., Physicochemical characterization of porcine bone-derived grafting material and comparison with bovine xenografts for dental applications. 2017. J. Periodontal Implant Sci. 47, 388-401.
LeGeros, et al., Significance of the Porosity and Physical Chemistry of Calcium Phosphate Ceramics Biodegradation-Bioresorption. 1988. Ann. N. Y. Acad. Sci. 523, 268-271.
Lin, Y. et al., Synthesis, characterization, and antibacterial property of strontium half and totally substituted hydroxyapatite nanoparticles. 2008. J. Wuhan Univ. Technol. Sci. Ed. 23, 475-479.
Liu, D.M., Water-based sol-gel synthesis of hydroxyapatite: process development. 2001. Biomaterials 22, 1721-30.
Loh, Q.L. et al., Three-dimensional scaffolds for tissue engineering applications: role of porosity and pore size. 2013. Tissue Eng. Part B. Rev. 19, 485-502.
Lowry, N. et al., Strontium and zinc co-substituted nanophase hydroxyapatite. 2017. Ceram. Int. 43, 12070-12078.
Martin, R.I., Mechanical properties of hydroxyapatite formed at physiological temperature. 1995. J. Mater. Sci. Mater. Med. 6, 138-143.
Matsumoto, T. et al., Effects of sintered bovine bone on cell proliferation, collagen synthesis, and osteoblastic expression in MC3T3-E1 osteoblast-like cells. 1999. J. Orthop. Res. 17, 586-592.
Matsunaga, K., Formation Energies of Substitutional Sodium and Potassium in Hydroxyapatite. 2009. Mater. Trans. 50, 1041-1045).
Mauney, J.R., et al., In vitro and in vivo evaluation of differentially demineralized cancellous bone scaffolds combined with human bone marrow stromal cells for tissue engineering. 2005. Biomaterials.
Mbarki, M. et al., Hydroxyapatite bioceramic with large porosity. 2017. Mater. Sci. Eng. C 76, 985-990.
Moore, W.R., et al., Synthetic bone graft substitutes. 2001. Anz J. Surg. 71, 354-361.
Moreno, E.C., Fluoridated hydroxyapatite solubility and caries formation. 1974. Nature 247, 64-65.
Mucalo, M.R., et al., Biomedicals from Bone. 2008. Chem. New Zeal. 72, 13-18.
Murugan, R., et al., Nanoporous hydroxy-carbonate apatite scaffold made of natural bone. 2006. Mater. Lett. 60, 2844-2847.
O'Brien, F.J. et al., The effect of pore size on cell adhesion in collagen-GAG scaffolds. 2005. Biomaterials 26, 433-441.
Oliveira, J.M. et al., Macroporous hydroxyapatite scaffolds for bone tissue engineering applications: Physicochemical characterization and assessment of rat bone marrow stromal cell viability. 2009. J. Biomed. Mater. Res. Part A 91A, 175-186.
Ooi, C.Y., et al., Properties of hydroxyapatite produced by annealing of bovine bone. 2007. Ceram. Int. 33, 1171-1177.
Orlovskii, V.P. et al., Hydroxyapatite and Hydroxyapatite-Based Ceramics. 2002. Inorg. Mater. 38, 973-984.
Oyane, A. et al., Preparation and assessment of revised simulated body fluids. 2003. J. Biomed. Mater. Res. 65A, 188-195.
Park, J. et al., Biomaterials: An Introduction. Springer Science & Business Media. 2007.
Porter, A.E., et al., Comparison of in vivo dissolution processes in hydroxyapatite and silicon-substituted hydroxyapatite bioceramics. 2003. Biomaterials 24, 4609-4620.
Qi, G. et al., Osteoblastic cell response on magnesium-incorporated apatite coatings. 2008. Appl. Surf. Sci. 255, 304-307.
Ratnayake et al., Development and characterization of a xenograft material from New Zealand sourced bovine cancellous bone, 2016. J. Biomed. Mater. Res. B. Appl. Biomater. 105, 1054-1062.

(56) References Cited

OTHER PUBLICATIONS

Ratnayake, J.T.B., et al., Substituted hydroxyapatites for bone regeneration: A review of current trends. 2017. J. Biomed. Mater. Res. Part B Appl. Biomater. 105, 1285-1299.

Ravi, N.D. et al., Strontium-Substituted Calcium Deficient Hydroxyapatite Nanoparticles: Synthesis, Characterization, and Antibacterial Properties. 2012. J. Am. Ceram. Soc. 95, 2700-2708.

Reffitt, D.M., et al., Orthosilicic acid stimulates collagen type 1 synthesis and osteoblastic differentiation in human osteoblast-like cells in vitro. 2003. Bone 32, 127-135.

Ren, F. et al., Synthesis, characterization and ab initio simulation of magnesium-substituted hydroxyapatite. 2010. Acta Biomater. 6, 2787-2796.

Rodan, S.B. et al., Characterization of a Human Osteosarcoma Cell Line (Saos-2) with Osteoblastic Properties, Cancer Research. 1987.

Saalfeld, U., Solubility behaviour of synthetic hydroxyapatites in aqueous solution: Influence of amorphous constituents on pH value. 1994. Biomaterials 15, 905-908.

Schachtman, D.P., Phosphorus Uptake by Plants: From Soil to Cell. 1998. Plant Physiol.

Gibson, I.R., Chemical characterization of silicon-substituted hydroxyapatite. 1999. J Biomed Mater Res 44, 422-428.

LeGeros, et al., Calcium phosphates in oral biology and medicine. 1990. Monogr. Oral Sci. 15, 1-201.

LeGeros, et al., Fluoride-cation interactions in the formation and stability of apatites. 1998. J. Fluor. Chem. 41, 53-64.

Wong, L.H., et al. Functionally graded tricalcium phosphate/fluoroapatite composites. 2002. Mater. Sci. Eng. C 20, 111-115.

\* cited by examiner

The custom-made beaker

Placing the BHA scaffolds on top of the wire mesh of the custom-made beaker as a white chalk colour appear in the solution Schematic flow chart of the sol-gel technique used to incorporate fluoride ions into the BHA scaffold FTIR Spectra of BFA Superimposed FTIR spectra of BHA (P) and BFA (B). The BFA spectra showing the absence of the OH- group at $3571 cm^{-1}$ Superimposed FTIR spectra of the carbonate peaks (1650-1473 cm-1 and 873 cm-1) of BHA (P) and BFA (B)

Figure 8: FTIR spectra of silicon substituted bovine hydroxyapatite

Superimposed FTIR spectra of the carbonate groups (1650-1473 cm$^{-1}$) of BHA (B) and SiBHA(R)

EDX analysis (A) bovine hydroxyapatite, (B) bovine fluorapatite, (C) silicon substituted bovine hydroxyapatite (A) FA pattern (JPDS pattern 01-080-3032), (B) HA pattern (JPDS pattern 00-001-1008)

XRD pattern of bovine fluorapatite (BFA)

Comparative X-Ray powder diffraction patterns for BFA (R) and FA (B) (JPDS pattern 01-080-303

Comparative X-Ray powder diffraction patterns for Si substituted hydroxyapatite (R) and bovine hydroxyapatite (B)

Superimposed XRD patterns of BHA (blue) and SiBHA (red)

Peak shift for SiBHA, SiBHA (R) and BHA (B)

Scanning electron micrograph of the BFA scaffold. (C) Outer surface (D) inner surface. Bar=100μm Scanning electron micrograph of the SiBHA scaffold. (E) Outer surface (F) inner surface. Bar=100μm 3D image of the BFA(A) and SiBHA(B) scaffold showing an interconnected porous architecture. Bar=2mm Thermogravimetric trace of BHA(A), BFA(B) and SiBHA(C) showing the weight loss against temperature (0-1000°C)

Change in pH of SBF solution for each time point after immersing the BFA scaffolds (n=3)

Change in pH of SBF solution for each time point after immersing the SiBHA scaffolds (n=3)

The weight loss of the BFA scaffolds as a function of time in SBF solution (n=3, **** P< 0.0001, error bars represent SE ± of the mean).

The weight loss of the BHA scaffolds as a function of time in SBF solution.

(n=3, *** P< 0.001, error bars represent SE ± of the mean)

Graphical representation of the Young's modulus (E) for each scaffold type.

Graphical representation of the yield strength for each scaffold type.

The cell viability assay for 24h, 48h and 72h after seeding Saos-2 cells onto the BHA, BFA and SiBHA scaffolds.

Error bars represent ± SE of the mean after 1-way ANOVA with Tukey's multiple comparison test. n=3, *P < 0.05

Fluorescent images of the BFA scaffolds seeded with Saos-2 cells after undergoing the LIVE/DEAD viability assay after the desired time points.

Green= live cells (calcein). Red cells = dead cells ethidium homodimer-1). 24 h (a-c), 48 hours (d-f) and 72 hours (g-i). Bar=100µm Fluorescent images of the SiBHA scaffolds seeded with Saos-2 cells after undergoing the LIVE/DEAD viability assay after the desired time points.

Green= live cells (calcein). Red cells = dead cells ethidium homodimer-1). 24 h (a-c), 48 hours (d-f) and 72 hours (g-i). Bar=100µm

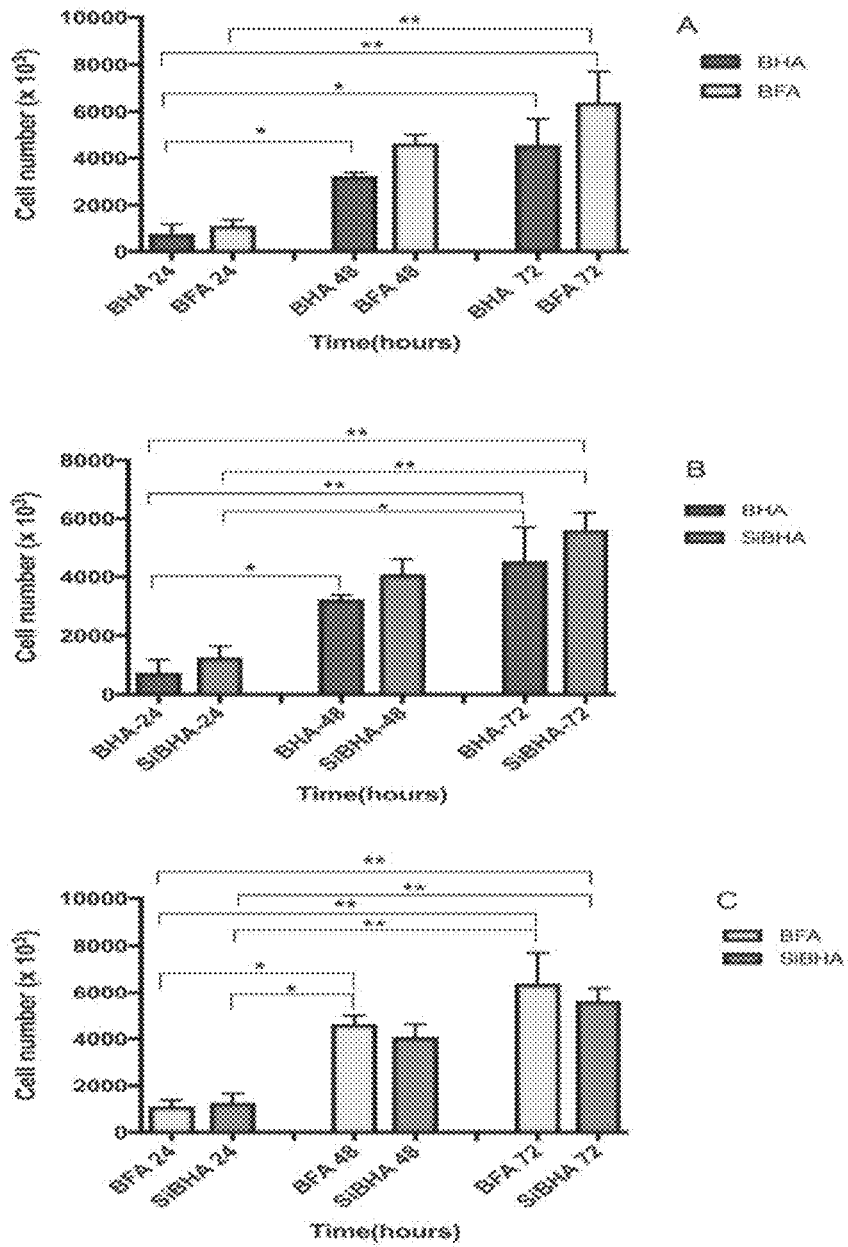

Figure 30: Graphical representation showing cell proliferation of Saos-2 cells after seeding onto the surface of the respective scaffolds.
A). Bovine hydroxyapitate (BHA) vs bovine fluorapatite (BFA). B) Bovine hydroxyapatite (BHA) vs silicon substituted bovine hydroxyapatite (SiBHA) and C) Bovine fluorapatite (BFA) vs silicon substituted bovine hydroxyapatite (SIBHA) after 24h, 48h and 72h.
Error bars represent ± SE of the mean after 1-way ANOVA with Tukey's multiple comparison test.
* $P < 0.05$, **$P < 0.01$. n=3.

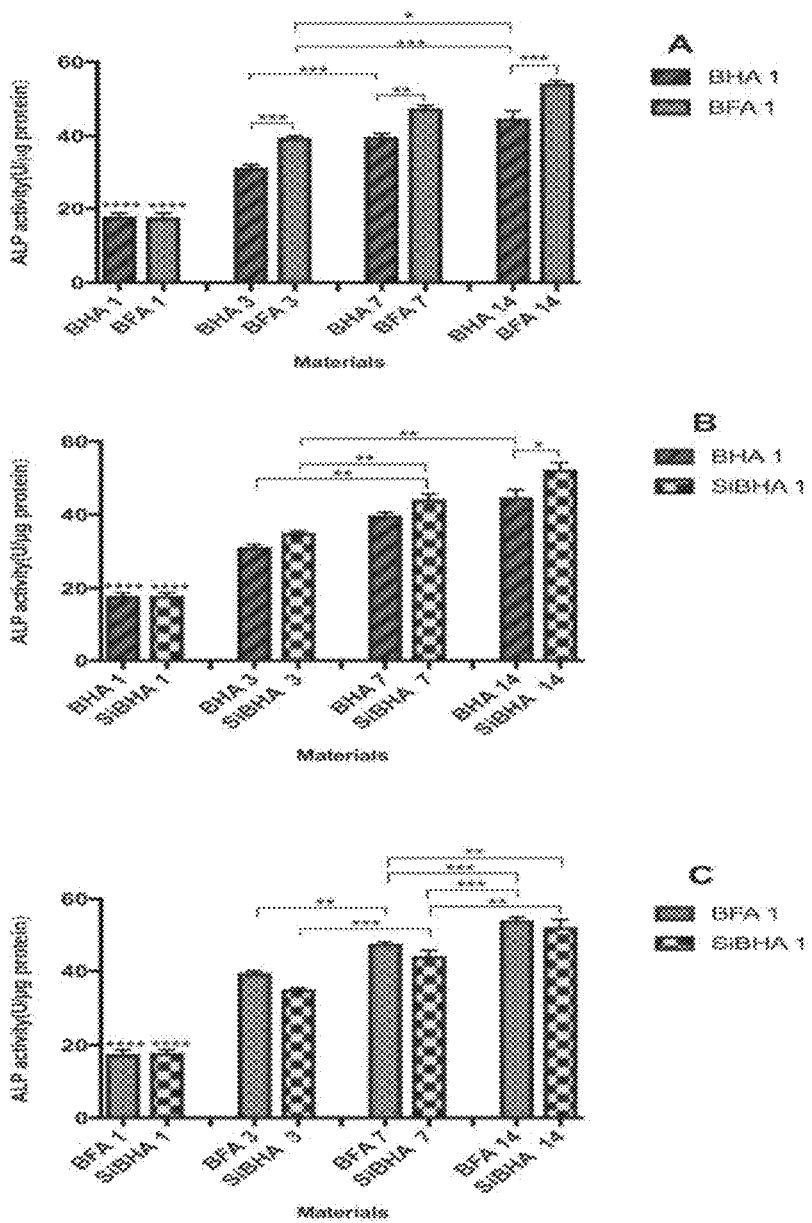

Figure 31: Graphical representation showing the ALP activity of Saos-2 cells after seeding onto the surface of the respective scaffolds.
A). Bovine hydroxyapitate (BHA) vs bovine fluorapatite (BFA) B). Bovine hydroxyapatite (BHA) vs silicon substituted bovine hydroxyapatite (SiBHA) and C). Bovine fluorapatite (BFA) vs silicon substituted bovine hydroxyapatite (SIBHA) after 1, 3, 7 and 14 days
Error bars represent ±SE of the mean after 1-way ANOVA with Tukey's multiple comparison test, * $P < 0.05$, $P < 0.01$, *$P < 0.001$, **** $P < 0.0001$, n=3

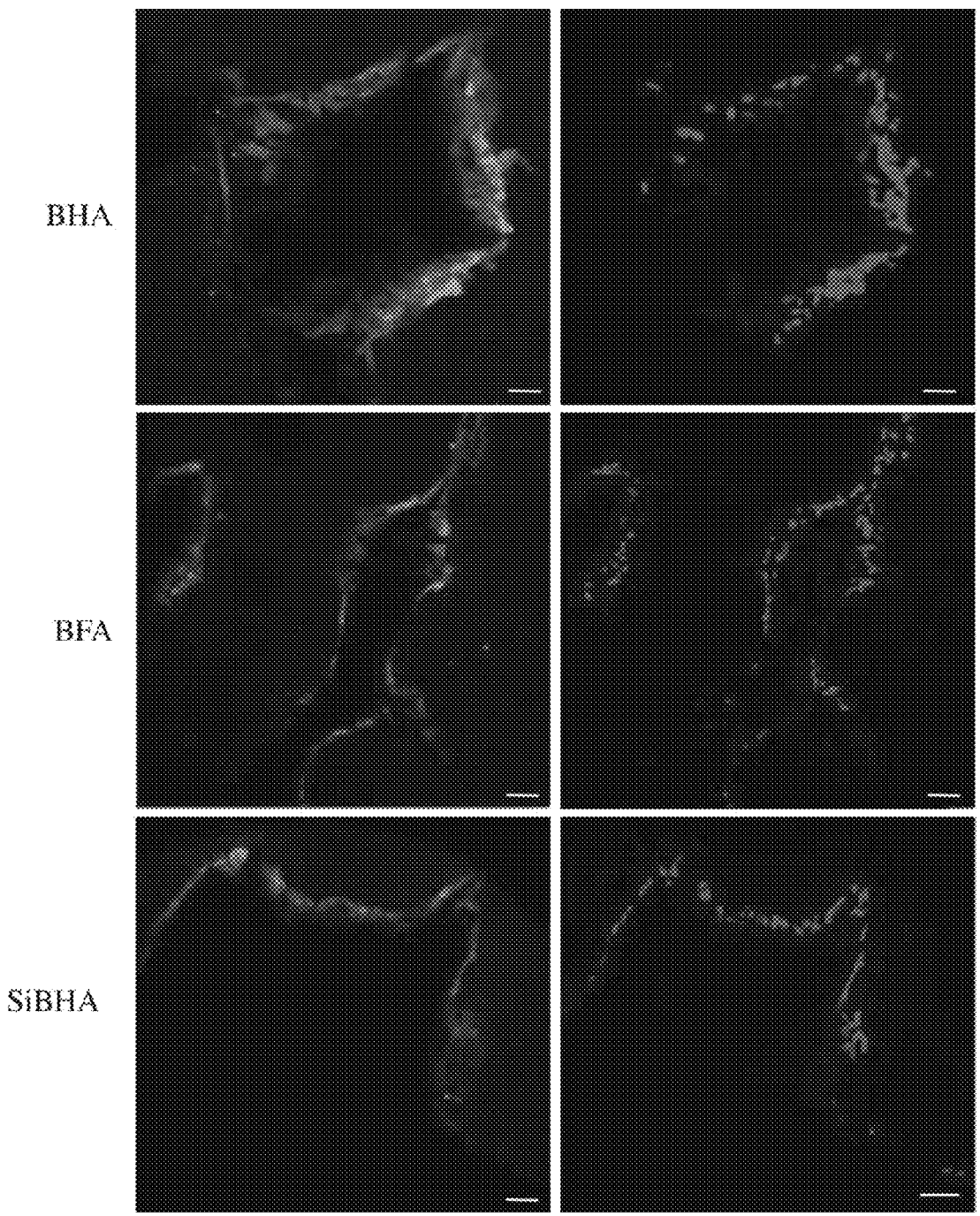
Figure 32: Immunohistochemical analysis of the specific bone protein, osteonectin, on the three scaffolds.

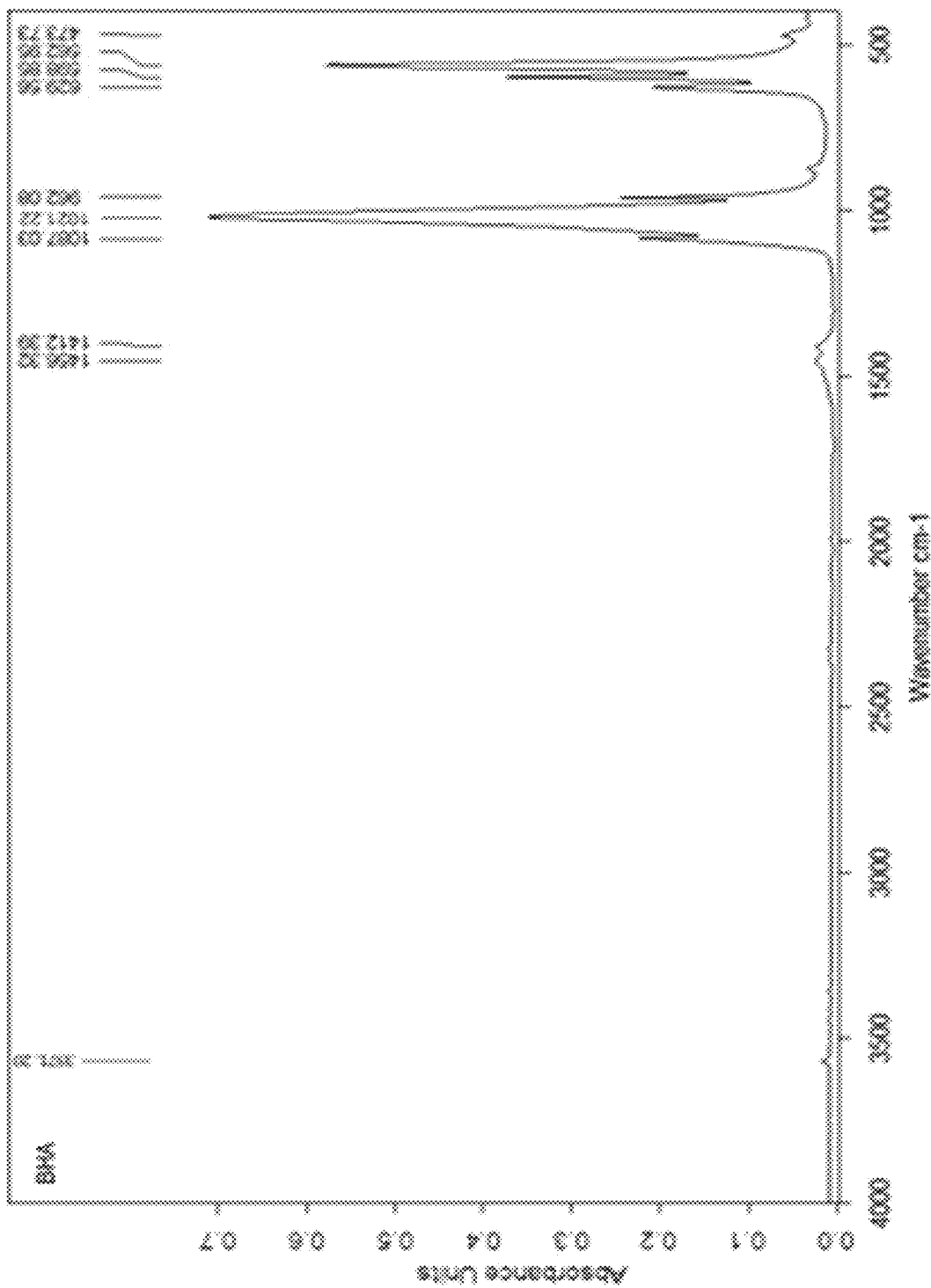
Figure 33: IR spectra of BHA

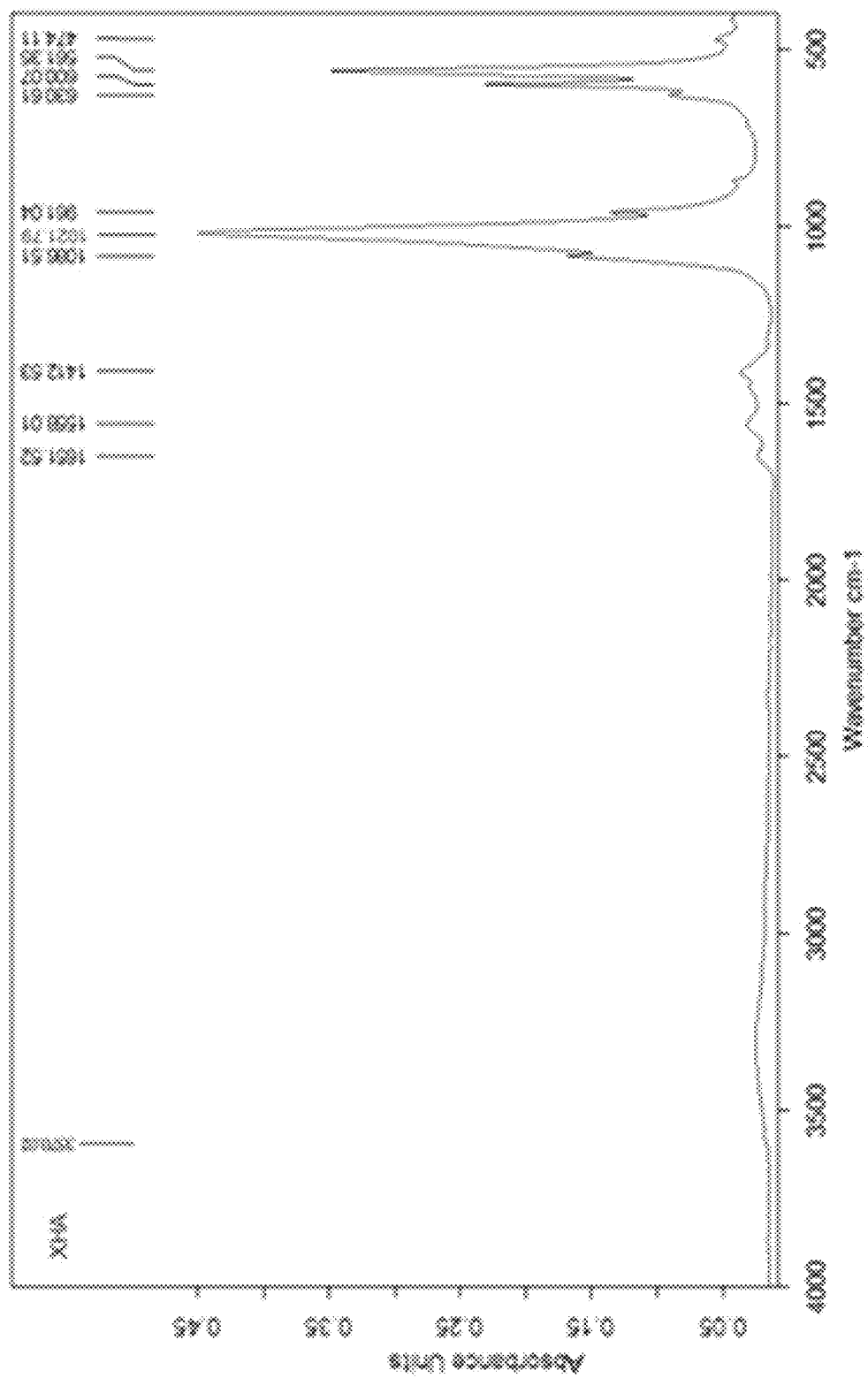
Figure 34: IR spectra of XHA showing a highly condensed hydroxyl peak at 3570 cm$^{-1}$

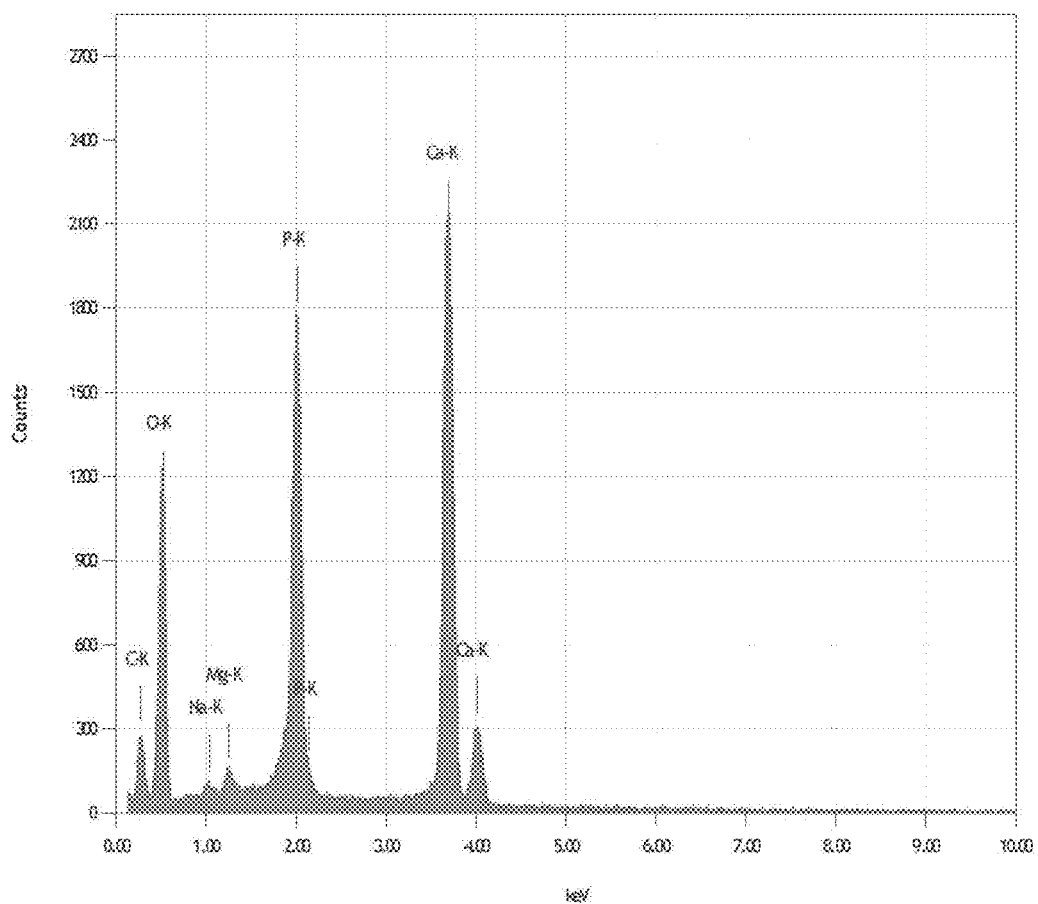
Figure 35: EDX spectra of BHA

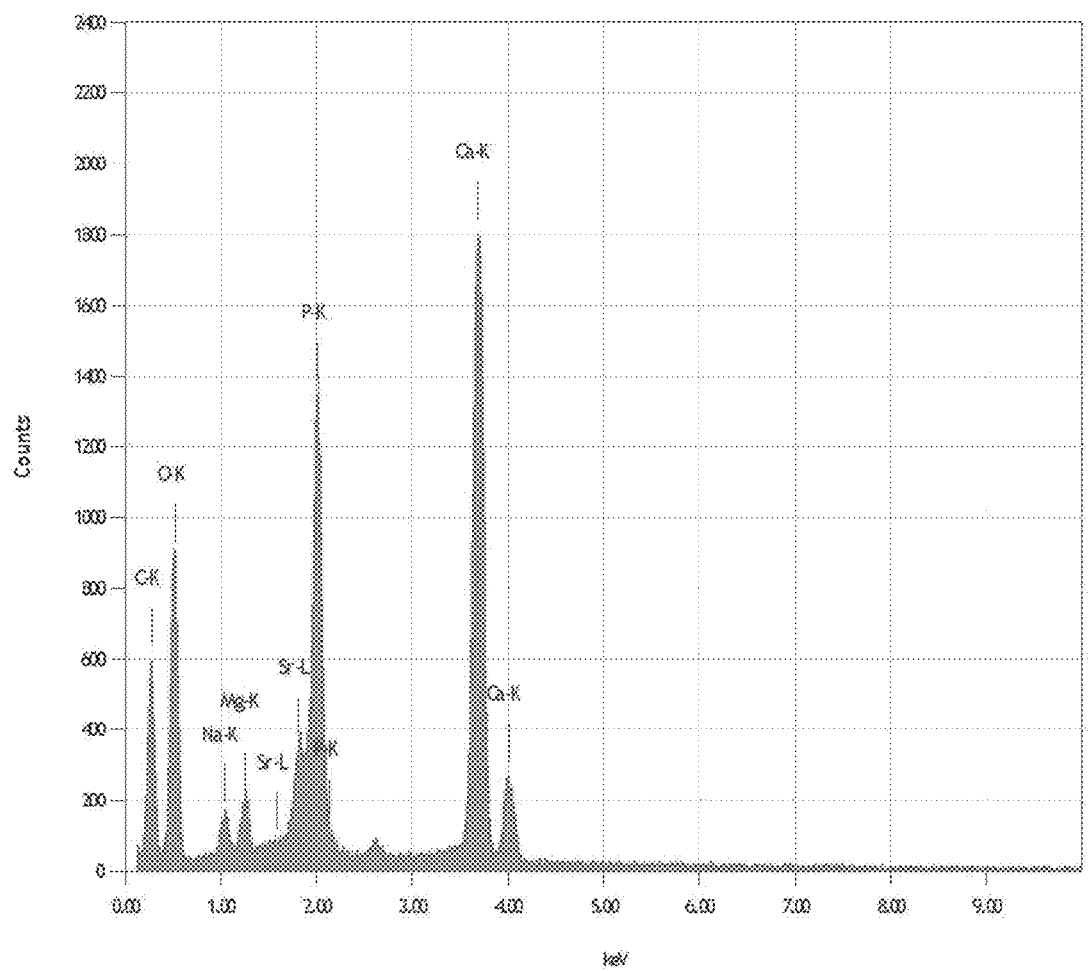
Figure 36: EDX spectra of XHA

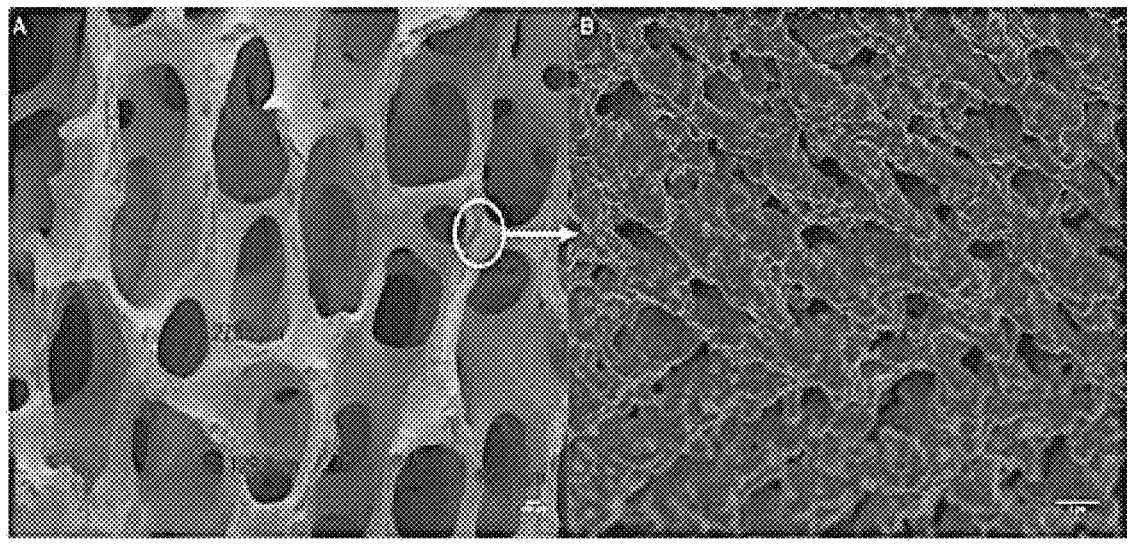
Figure 37: SEM image of BHA scaffold showing (A) open porosity (Bar = 100 μm) and (B) hi-res SEM image of the solid pore-walls (Bar = 1 μm).
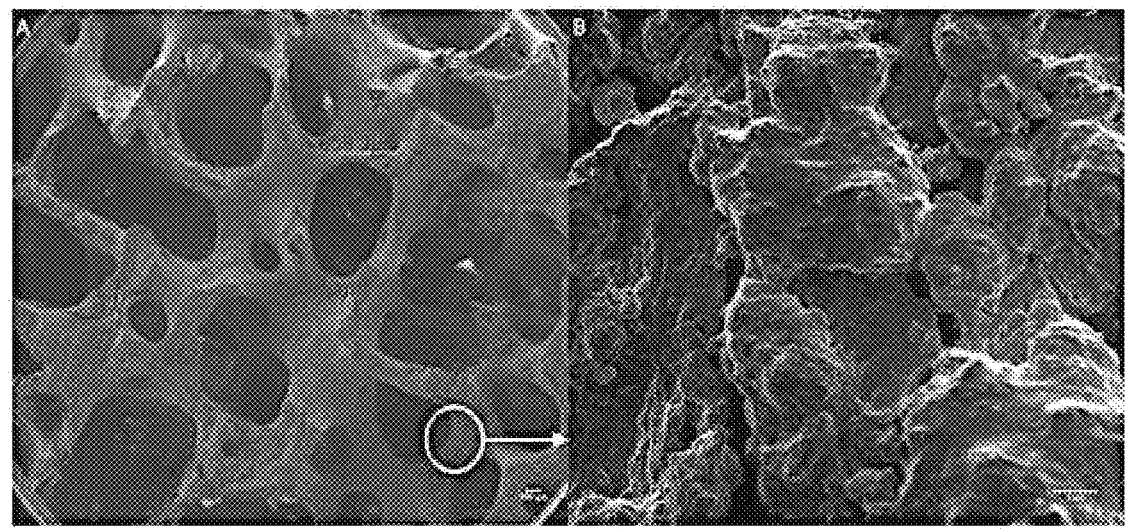
Figure 38: SEM image of XHA scaffold showing (A) open porosity (Bar = 100 μm) and (B) hi-res SEM image of the solid pore-walls. (Bar = 1 μm).

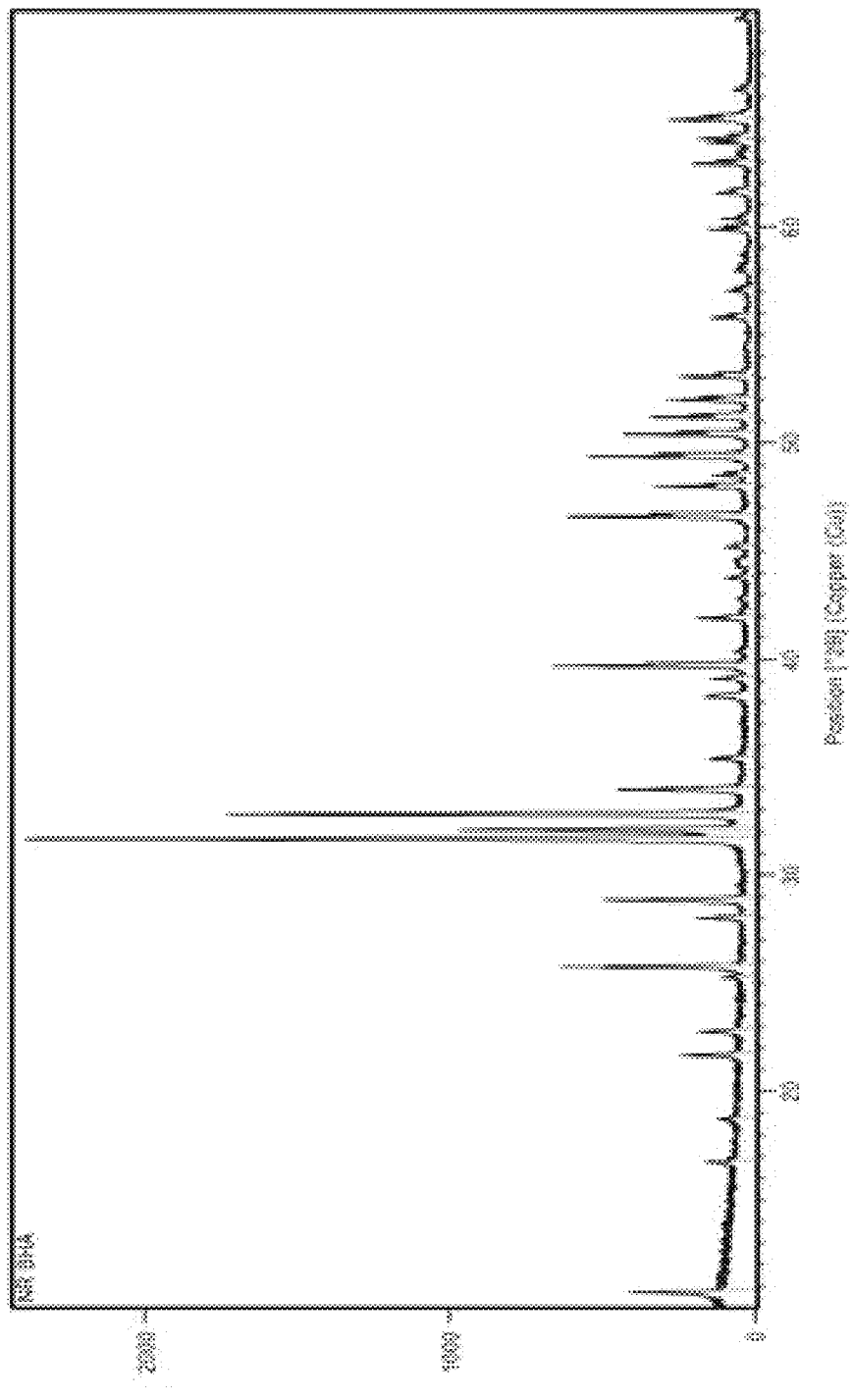
Figure 39: XRD spectra of BHA (black) superimposed with the reference peaks of JCPDS card 00-09-0432 (green)

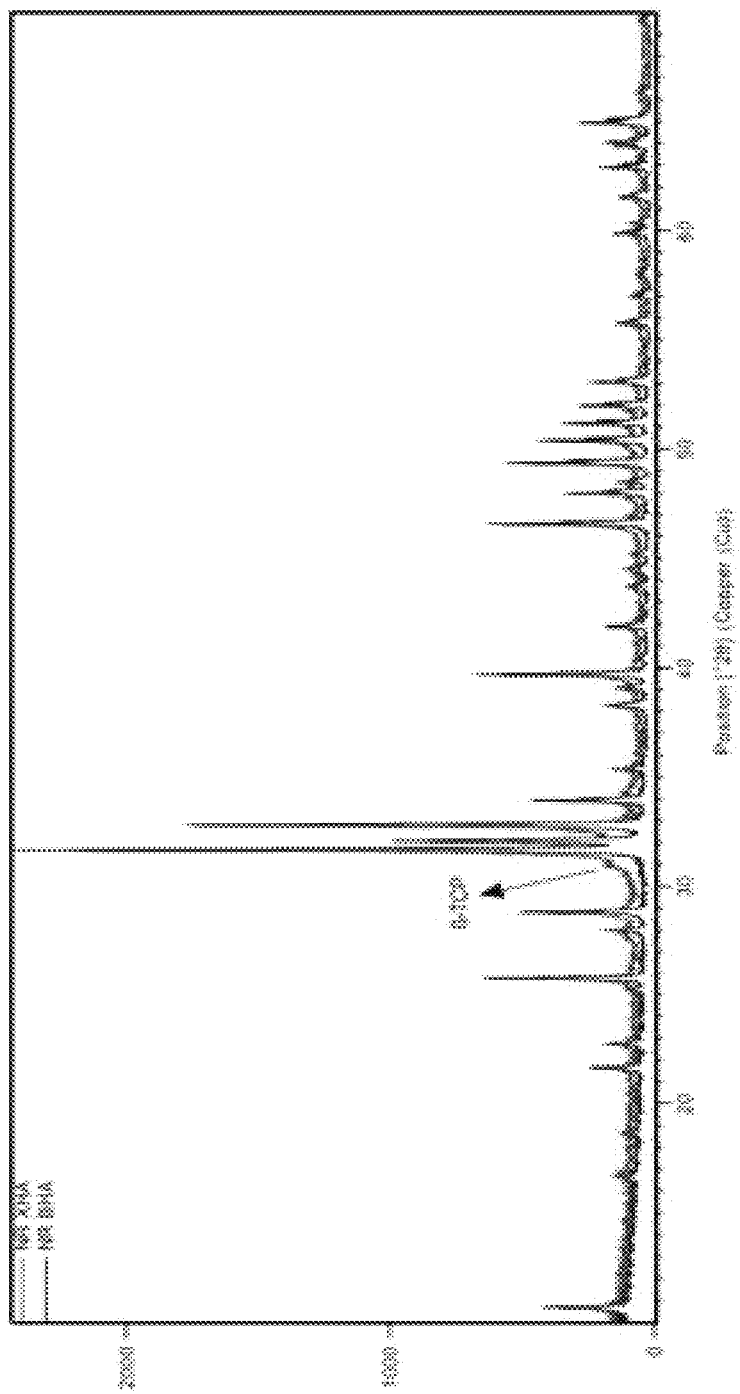
Figure 40: XRD spectral comparison of BHA (black) & XHA (green) indicating peak-broadening & peak-shift to lower frequencies in XHA and a peak indicative of β-TCP phase at $2\theta = 30.9°$

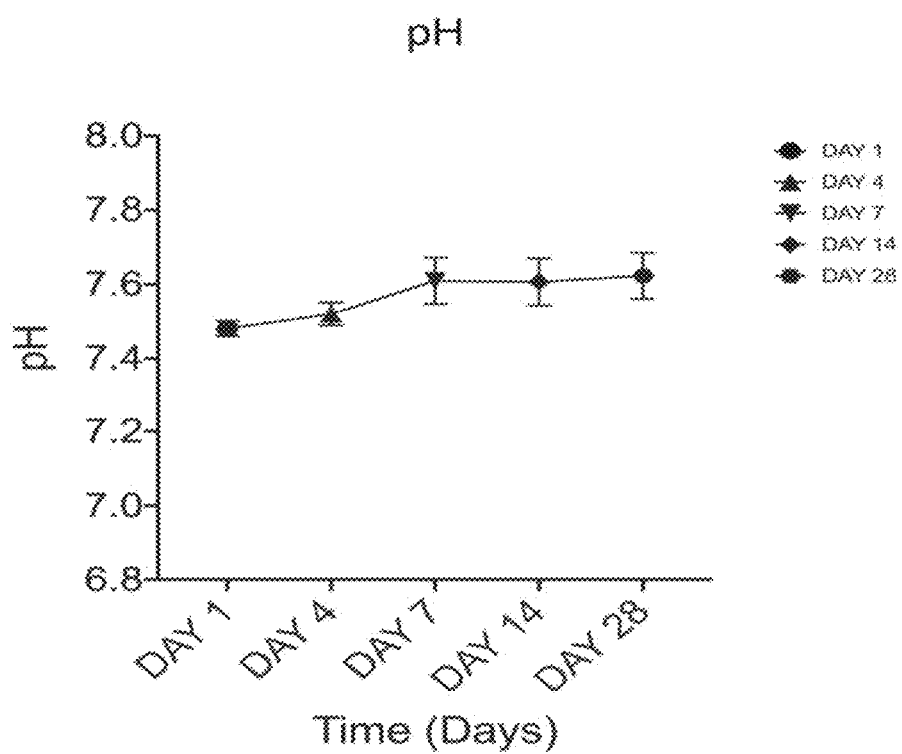
Figure 41: Chemical stability of BHA (n=3) shown as pH changes in SBF at different timepoints. Bars in graph reported as ± standard error of means

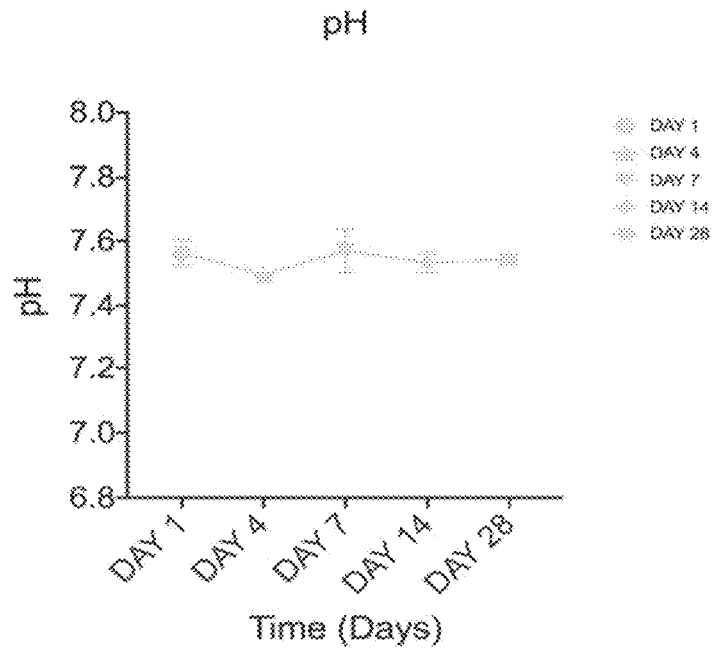
Figure 42: Chemical stability of XHA (n=3) shown as pH changes in SBF at different timepoints. Bars in graph reported as ± standard error of means
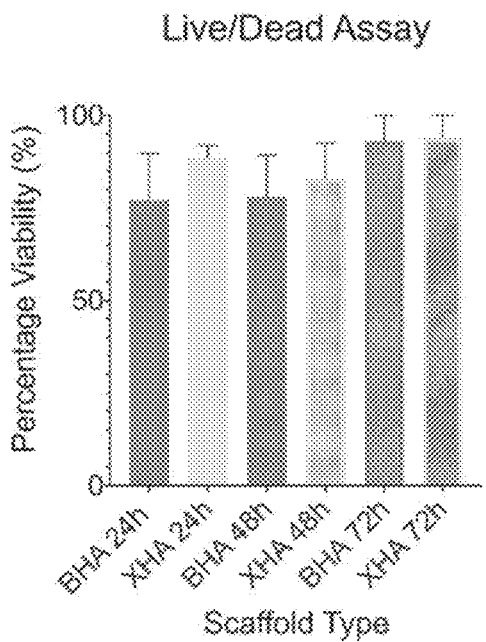
Figure 43: Live/Dead® assay to assess the cell viability of the seeded Saos-2 cells on BHA & XHA scaffolds at 24, 48 and 72h. (n=3, results analysed using one-way ANOVA, $P<0.05$), error bars are presented as ± SE of the mean)

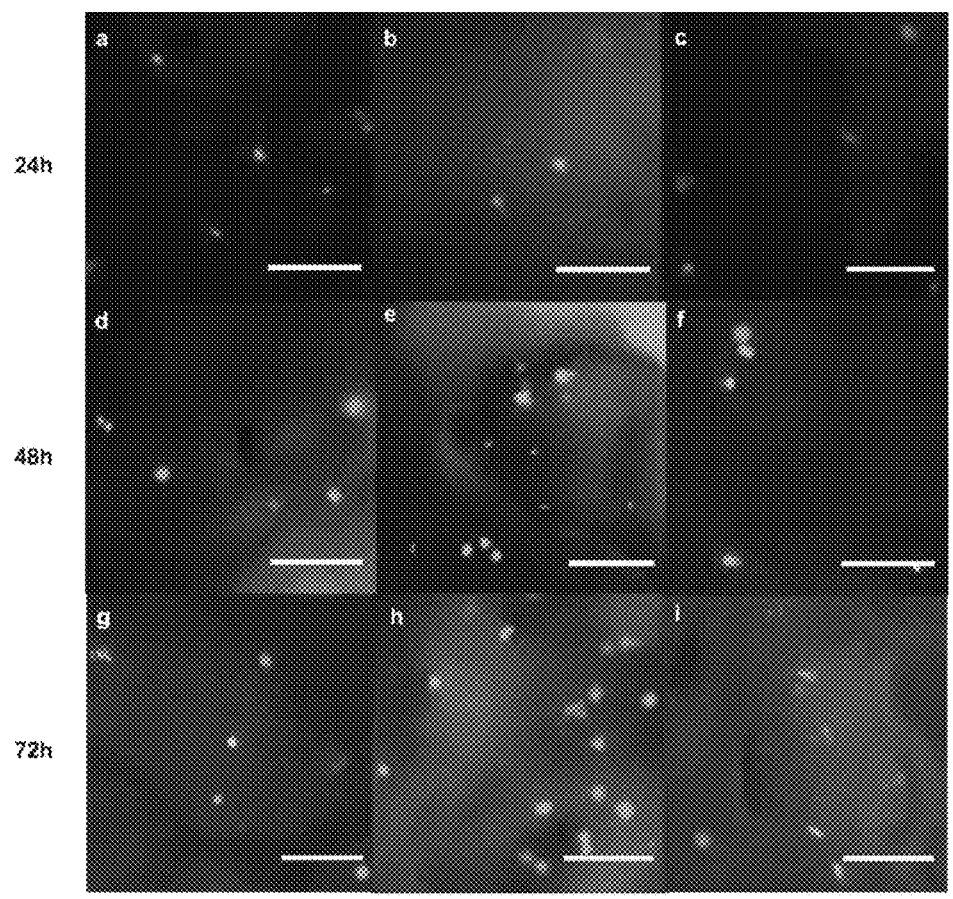
Figure 44: Fluorescent images showing cell viability of Saos-2 cells seeded on BHA at 24 h (a-c), 48 h (d-f) and 72 h (g-i). Green = live cells (calcein), Red = dead cells (ethidium homodimer-1). Bar = 50 μm

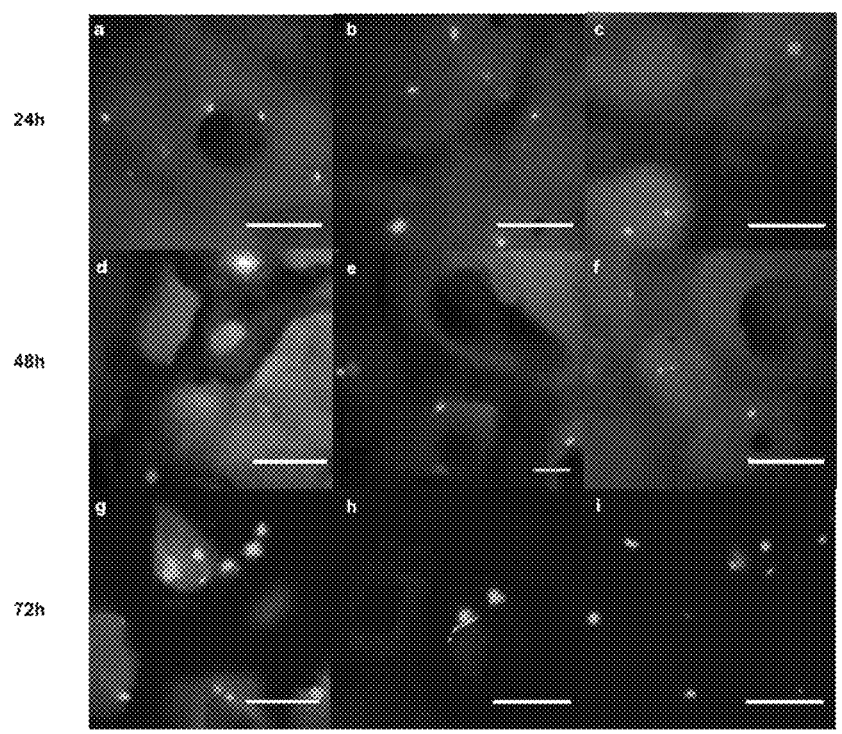
Figure 45: Fluorescent images showing cell viability of Saos-2 cells seeded on XHA at 24 h (a-c), 48 h (d-f) and 72 h (g-i). Green = live cells (calcein), Red = dead cells (ethidium homodimer-1). Bar = 50 μm

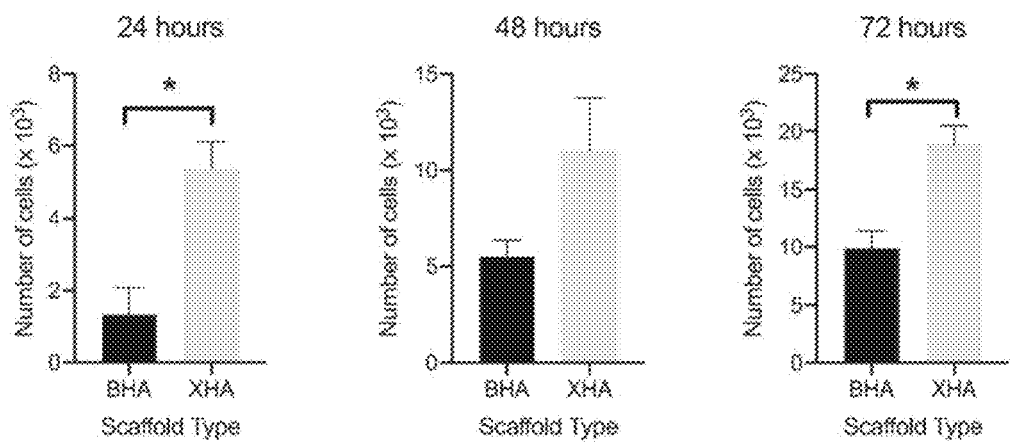
Figure 46: Graphical comparison of Saos-2 cell proliferation in BHA & XHA scaffolds at A) 24 h, B) 48 h and C) 72 h (n=3, *- (unpaired t-test, P<0.05), error bars are presented as ± SE of the mean)
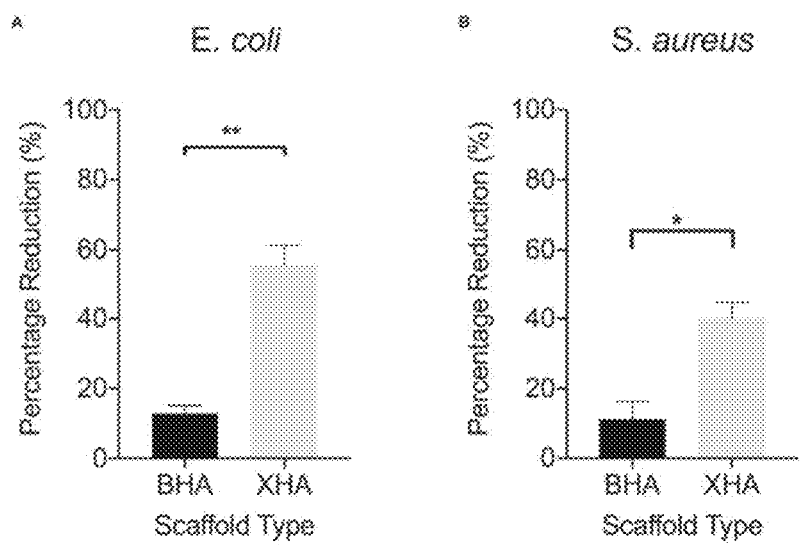
Figure 47: Antibacterial activity of BHA and XHA scaffolds against A) E. coli and B) S. aureus. (n=3, *- (t-test, P<0.05), **- (t-test, P<0.01), error bars are presented as ± SE of the mean

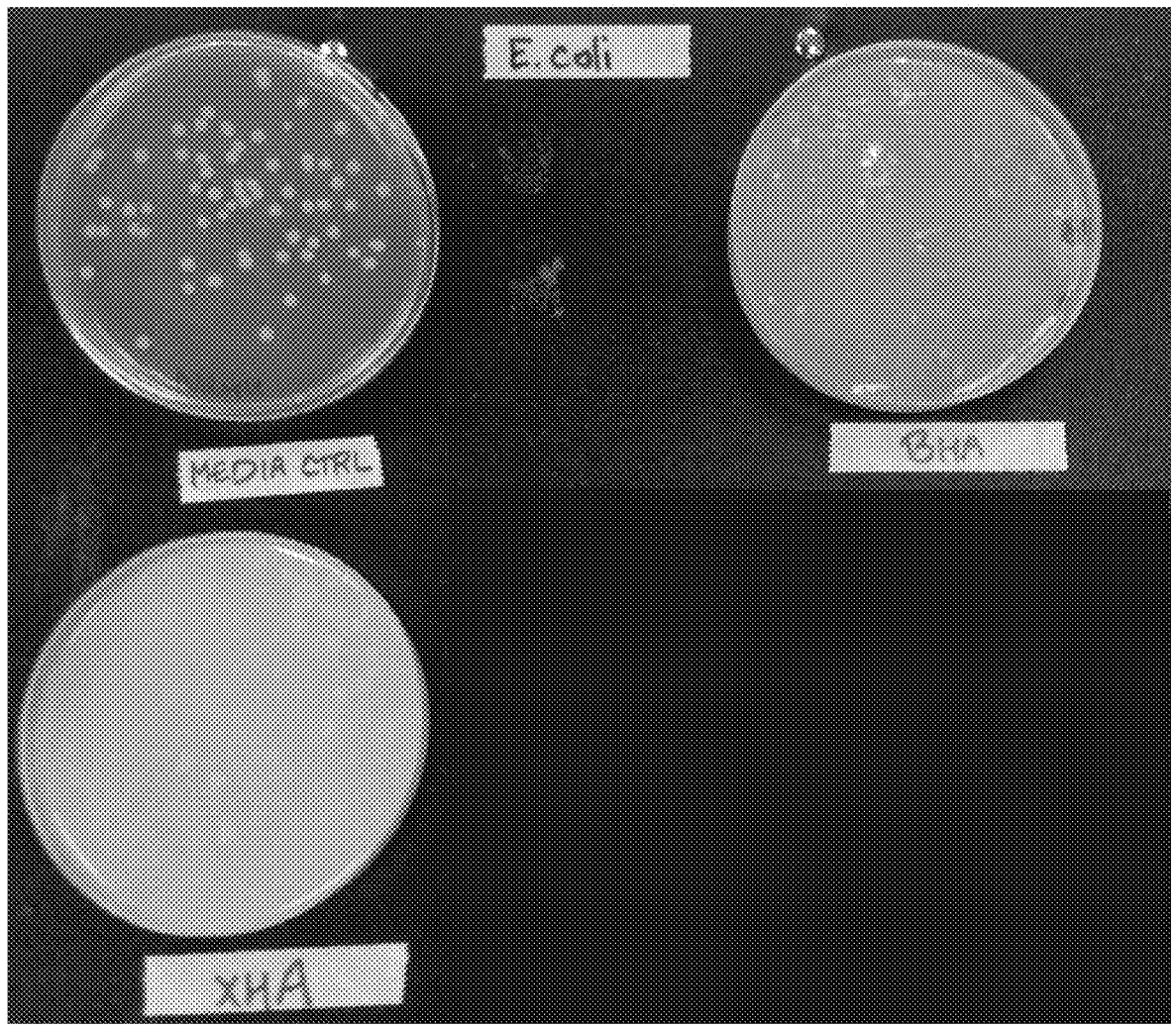
Figure 48: Antibacterial activity of BHA and XHA against E. *coli* compared against a A) MH agar control

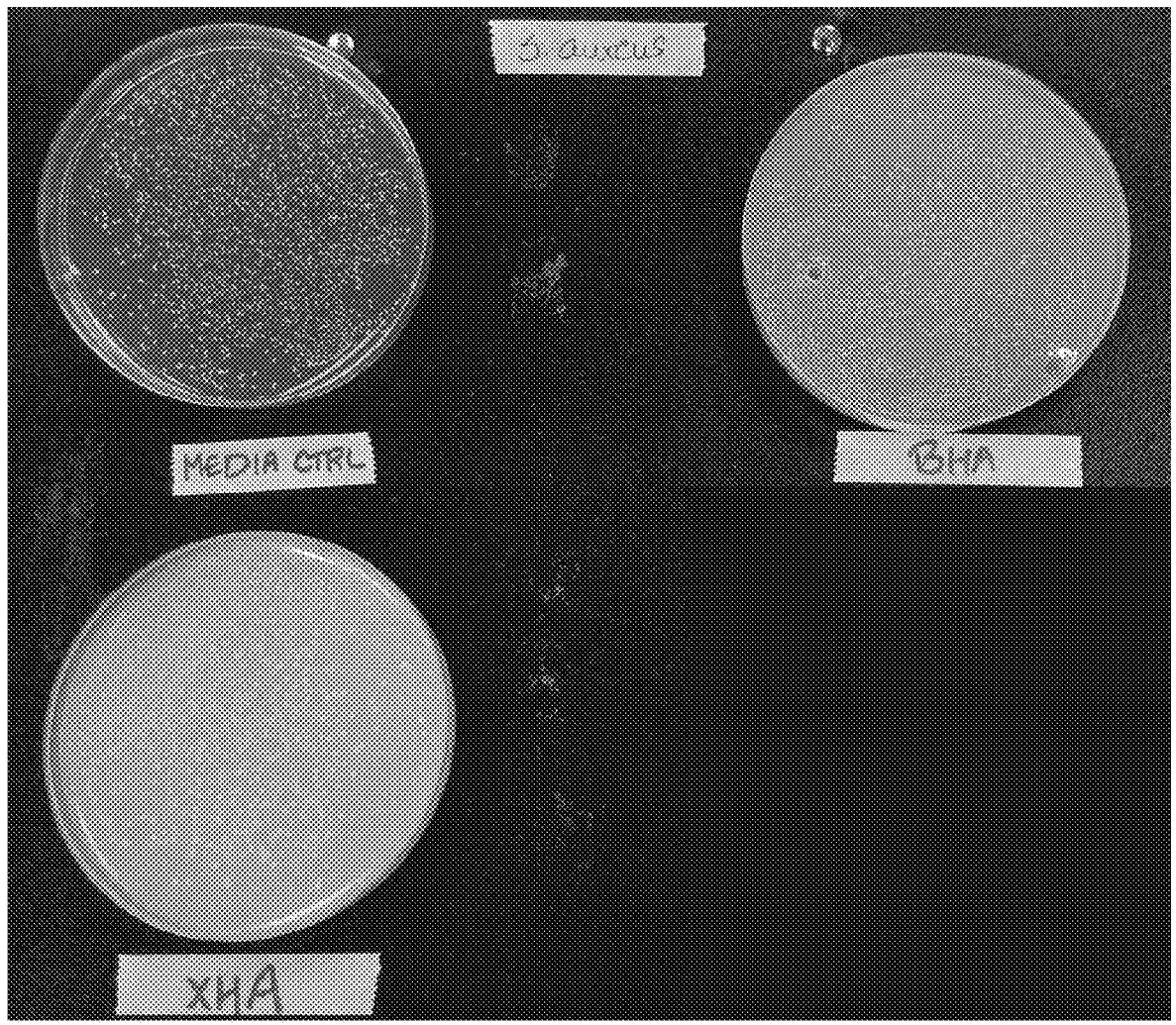
Figure 49: Antibacterial activity of BHA and XHA against S. *aureus* compared against a A) MH agar control

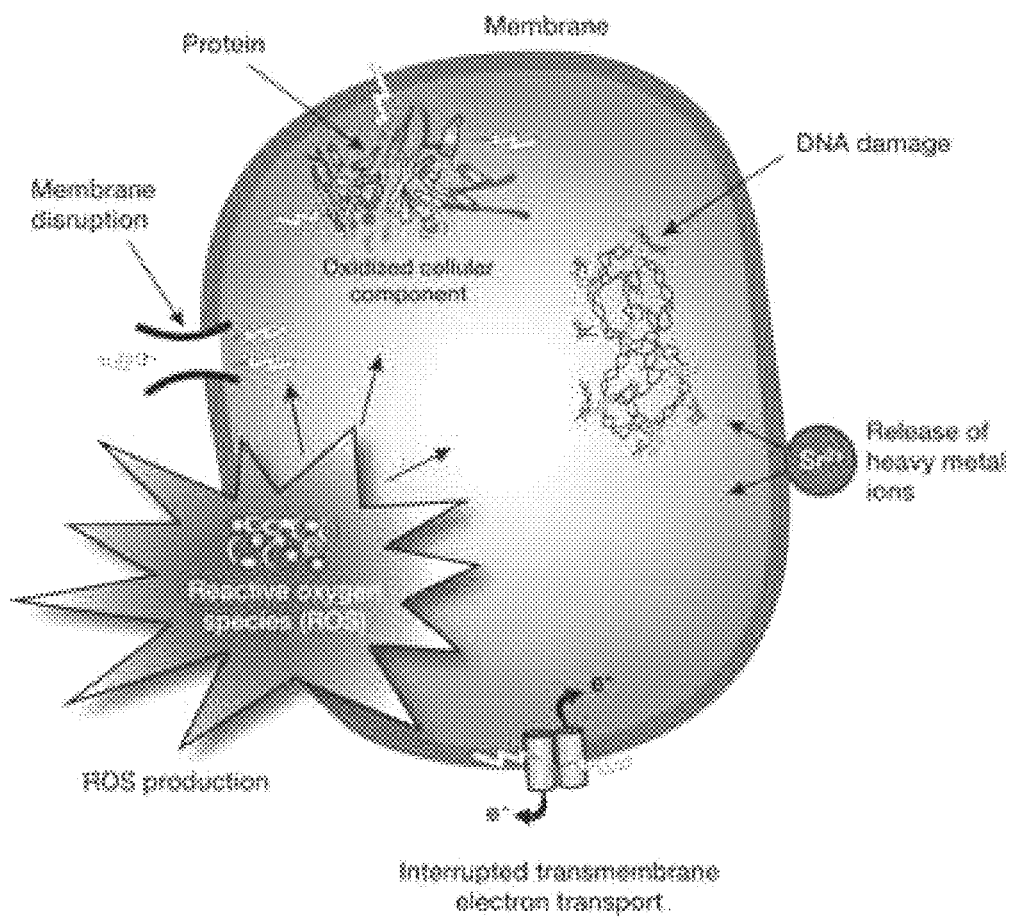
Figure 50: Antibacterial effect of metal ions. Adapted and modified from (Hajipour et al., 2012)

id="1" />

ION-SUBSTITUTED BOVINE HYDROXYAPATITE FOR BONE REGENERATION

CROSS REFERENCE TO RELATED APPLICATIONS

This application is a national stage application, filed under 35 U.S.C. § 371, of International Patent Application No. PCT/IN2021/050501, filed on May 24, 2021, which claims the benefit of Indian Application No. 20201102180:5, filed May 25, 2020, the contents of which are incorporated by reference herein in their entirety.

TECHNICAL FIELD

The present invention relates to biomaterials for bone regeneration, in general, and in particular, to an ion-substituted bovine hydroxyapatite, useful for bone regeneration purposes. The said modified hydroxyapatite is useful in preparing bone grafts that has increased strength and biocompatibility, which reduces healing time, and have a minimal reaction in the body after surgery.

The present invention also relates to the process of preparing an ion-substituted bovine hydroxyapatite.

The present invention further relates to a scaffold containing the ion-substituted bovine-derived hydroxyapatite in accordance with the present invention.

BACKGROUND

Bone grafts are materials used to artificially repair bony defects in the body. The uses of bone grafts range from treatment of bullet injuries, fractures, tumors to cosmetic surgery, dental surgeries for implants and beyond. Hydroxyapatite (HA), a bone graft, that forms the inorganic component of bones and teeth, has been a popular choice of bone substitute due to its bioactivity, biocompatibility and osteoconductivity, These bone grafts are traditionally either naturally derived, i.e., originated from human or animal, by treating extracted bone to various disinfection procedures and processing, or synthetically developed. While naturally derived grafts are more expensive and require a lot more processing to be safe for human usage, they are generally more effective, work faster and are needed in lesser quantities as a consequence of the same.

Some reasons for the popularity of synthetic grafts are that it does not automatically contain any animal diseases because they are made in labs, are economical and can be modified, such as by adding of silica to artificial bone grafts to make the bone stronger, heal faster etc. ACTIFUSE, a commercial product, is synthetic hydroxyapatite which contains substituted silicon in the hydroxyapatite. The interconnected porous network in ACTIFUSE is achieved by the use of porogens.

Synthetic hydroxyapaptite bone grafts have been described in various prior arts, for example, as biphasic calcium phosphate hydroxyapatite bone substitute materials in EP2445543 and WO 2019/115704.

IN202021047886 discloses a bioresorbable bone implant of bioresorbable cellular magnesium alloy with hydroxyapaptite.

IN202041057139 discloses hydroxyapaptite nanoparticles prepared by incorporating extracts of *Terminalia arjuna* with hydroxyapatite powder.

Though extensive research works have been reported in prior arts on synthetic HA and doped synthetic HA, several disadvantages of synthetic grafts cannot be ignored; for example, they are less effective and weaker than the naturally derived grafts.

Biologically derived hydroxyapatite is of great interest since it is biocompatible and possess the correct bony architecture and porosity to allow tissue ingrowth. Bovine bone derived hydroxyapatite (BHA) generated wider interest due to its abundant availability as meat wastes and similarity in terms of morphology and mineral composition to the human bone. US2015/0098875 discloses process of extraction of hydroxyapatite granules from bovine bones. Another patent application WO 2015/162589 describes extraction of hydroxyapatite from bone bio-wastes. Ratnayake et al (Ratnayake, J. T. B., Gould, M. L., Shavandi, A., Mucalo, M., Dias, G. J., 2016. *Development and characterization of a xenograli material from New Zealand sourced bovine cancellous bone*, J. Biomed. Mater. Res. B. Appl. Biomater. 105, 1054-1062) developed an inexpensive and reproducible method to prepare HA from bovine bone using a subcritical-water based extraction process.

Endobon® is another commercially available granule that uses an inorganic, deproteinized, porous bone mineral manufactured from bovine bone.

Geistlich Bio-Oss® is another commercial product available in the market which is an inorganic, deproteinized, porous bone mineral manufactured from bovine bone. It is categorized as a carbonate apatite which is deficient in calcium and it is chemically and physically similar to human trabecular bone (FIG. 1). The approximate porosity of Bio-Oss® is stated to be between 70% to 80%.

Johnson et al., (Johnson, G. S., Mucalo, M. R., M. A., 2000, *The processing and characterization of animal-derived bone to yield materials with biomedical applications. Part 1: Modifiable porous implants from bovine condyle cancellous bone and characterization of bone materials as alunction of processing*. J. Mater. Sci. Mater. Med. 11, 427-441) reported processing methods where bovine bones were put through a series of defatting and deproteinization steps to produce xenograft hydroxyapatite material. Foster (Foster, D. L., 2001. *Studies on Calcium Phosphates Derived from New Zealand Animal Bone*, University of Waikato) reported sintering the bovine bones at 1000° C. for 3 hours to rid the bone of all organic matter. This high temperature sintering process in addition to improving the crystallinity of the HA, is also proven to deactivate prions, a class of mammalian proteins (PrP) that can mutate into an unfolded form PrPsc, that causes mad cow disease and other prion diseases in cattle. Studies have shown certain classes of prions can survive in temperatures as high as 600° C. for up to 15 mins but are deactivated at 1000° C. (Foster, 2001). However, the shortcomings of such methods include use of expensive and usually toxic chemicals to process the raw bones. The use of very high temperatures (1000° C.) for an extended period to rid the bones of organic matter means increased energy consumption—as a consequence, an increase in the production costs.

Studies conducted by Ratnayake et al., simplified the methodology developed by Johnson et al., and made suitable modifications to process cancellous bovine bones to produce highly crystalline HA. The study proposed an alternative way to the one used by Johnson et al. to deproteinize the bovine bone cubes. This was carried out using a method called subcritical water extraction where water at temperatures above boiling point (100° C.) and below its critical temperature (373° C.) in a pressure regulated environment and an atmosphere of nitrogen acts as solvent in leaching out residual fats, protein and other organic matter from the bones. The process also used a much lower sintering temperature of 650° C. to produce pure, highly crystalline HA that had the ideal porosity and biocompatibility. Whilst sintering rids unwanted organic material from the bone and create porosities ideal for cellular migration R. proliferation, the process also strips off all the collagen thereby destabilizing its entire hierarchical architecture. This led to a huge loss of the mechanical properties in the processed bone in comparison to that of the original. Apart from substitution of the synthetic HA lattice with single type of ions/materials, studies have been also reported for co-substitution of the synthetic HA lattice as a remedial method to address the negative effects of single ionic substitution, as any negative effect of one metal ion is neutralized by the beneficial effect of the other. Aina et al., 2007; Kolmas et al., 2011 (Aina, V., Perardi, A., Bergandi, L., Malavasi, Menabue, L., Morterra, C., Ghigo, D., 2007, *Cytotoxicity of zinc-containing bioactive glasses in contact with human osteoblasts*. Chem. Biol. Interact. 167, 207-218; Kolmas J., Jaklewicz, A., Zitna, A., Bucko, M., Paszkiewicz, Z., Lis, J., Slosarczyk, A., Kolodziejski, W., 2011. *Incorporation of carbonate and magnesium ions into synthetic hydroxyapatite: The effect on physicochemical properties.* J. Mol. Struct. 987, 40-50) reported the co-substitution of ions in synthetically prepared HA where two or more ionic groups were incorporated into the HA lattice in tandem. Gopi et al., (Gopi, D, Shinyjoy, E., Kavitha, L., 2014. *Synthesis and spectral characterization of silver/magnesium co-substituted hydroxyapatite for biomedical applications,* Spectrochim. Acta. A. Mol. Biomol. Spectrosc. 127, 286-91) demonstrated that synthetic hydroxyapatite co-substituted with silver and magnesium ions showed impressive antibacterial activity. They also noted that increased silver concentration led to increased cytotoxicity, but the effect was less when equal concentration of magnesium was introduced.

Further, there have been studies wherein specific substances have been incorporated in the BHA lattice to obtained the targeted properties in the bone scaffold. IN201931010903 describes a bone scaffold and its process of preparation using HA extracted from caprine bone biowaste reinforced with Poly Lactic-o-Glycolic acid (PLGA) polymer. However, these bovine hydroxyapatites, as reported in the prior arts, lacks the mechanical properties required for biomedical applications. Though several ionic substitutions have already been carried out on synthetic HA, to the best of our knowledge, the substitution of ions in biological HA, which still maintains the correct trabecular architecture (interconnected porous network), has not been reported.

Hence, there is a need to address the shortcomings of the prior arts in terms of the loss of mechanical strength, and provide bovine hydroxyapatite that can achieve an overall improvement in its physicochemical and biological properties.

SUMMARY

An aspect of the present invention provides an ion substituted bovine-derived hydroxyapatite, wherein said bovine-derived hydroxyapatite is ion-substituted with at least one type of ion selected from F, Si, Cl, carbonate, citrate, Na, K, Ag, Mn, Zn, Zr, Cu, Co, Fe, Au, B, Ba, Al, Bi, Mg or Sr, or combinations thereof. The product in accordance to the present invention is a naturally derived bone graft material that has been modified by ionic doping by using a novel process that augments the strength and biocompatibility of the bone graft, reduces healing time, and have a minimal reaction in the body after surgery.

Another aspect of the present invention provides a process of preparing the ion substituted bovine-derived hydroxyapatite wherein said process provides substitutions in natural bone while not disrupting the natural architecture.

In another aspect of the present invention, it provides a scaffold comprising the ion-substituted bovine-derived hydroxyapatite.

The ion-substituted bovine hydroxyapatite in accordance with the present invention, or the scaffold comprising it maintains the natural interconnected porous network of the HA lattice.

Further, the ion-substituted BHA and its process of preparation is cost effective as compared to prior art products, for example ACTIFUSE.

These and other features, aspects, and advantages of the present subject matter will become better understood with reference to the following description. This statement is provided to introduce a selection of concepts in a simplified form. This statement is not intended to identify key features or essential features of the subject matter, nor is it intended to be used to limit the scope of the subject matter.

BRIEF DESCRIPTION OF DRAWINGS

The patent or application file contains at least one drawing executed in color. Copies of this patent or patent application publication with color drawing(s) will be provided by the Office upon request and payment of the necessary fee.

The above and other features, aspects, and advantages of the subject matter will be better understood with regard to the following description, appended claims, and accompanying drawings where:

FIG. 30 illustrates FIG. 30: Graphical representation showing cell proliferation of Saos-2 cells after seeding onto the surface of the respective scaffolds. A). Bovine hydroxyapitate (BHA) vs bovine fluorapatite (BFA). B) Bovine hydroxyapatite (BHA) vs silicon substituted bovine hydroxyapatite (SiBHA) and C) Bovine fluorapatite (BFA) vs silicon substituted bovine hydroxyapatite (SIBHA) after 24 h, 48 h and 72 h.

FIG. 31 illustrates Graphical representation showing the ALP activity of Saos-2 cells after seeding onto the surface of the respective scaffolds. A). Bovine hydroxyapitate (BHA) vs bovine fluorapatite (BFA) B). Bovine hydroxyapatite (BHA) vs silicon substituted bovine hydroxyapatite (SiBHA) and C). Bovine fluorapatite (BFA) vs silicon substituted bovine hydroxyapatite (SIBHA) after 1, 3, 7 and 14 days.

FIG. 32 illustrates Immunohistochemical analysis of the specific bone protein, osteonectin, on the three scaffolds.

FIG. 33 illustrates IR spectra of BHA.

FIG. 34 illustrates IR spectra of XHA showing a highly condensed hydroxyl peak at 3570 cm−1.

FIG. 35 illustrates EDX spectra of BHA.

FIG. 36 illustrates EDX spectra of XHA.

FIG. 37 illustrates SEM image of BHA scaffold showing (A) open porosity (Bar=100 μm) and (B) hi-res SEM image of the solid pore-walls (Bar=1 μm).

FIG. 38 illustrates SEM image of XHA scaffold showing (A) open porosity (Bar=100 μm) and (B) hi-res SEM image of the solid pore-walls. (Bar=1 μm).

FIG. 39 illustrates XRD spectra of BHA (black) superimposed with the reference peaks of JCPDS card 00-09-0432 (green).

FIG. 40 illustrates XRD spectral comparison of BHA (black) & XHA (green) indicating peak-broadening & peak-shift to lower frequencies in XHA and a peak indicative of β-TCP phase at 2θ=30.9°.

FIG. 41 illustrates Chemical stability of BHA (n=3) shown as pH changes in SBF at different timepoints. Bars in graph reported as ± standard error of means.

FIG. 42 illustrates Chemical stability of XHA (n=3) shown as pH changes in SBF at different timepoints. Bars in graph reported as ± standard error of means.

FIG. 43 illustrates Live/Dead® assay to assess the cell viability of the seeded Saos-2 cells on BHA & XHA scaffolds at 24, 48 and 72 h. (n=3, results analysed using one-way ANOVA, P<0.05), error bars are presented as ±SE of the mean).

FIG. 44 illustrates Fluorescent images showing cell viability of Saos-2 cells seeded on BHA at 24 h (a-c), 48 h (d-f) and 72 h (g-i). Green=live cells (calcein), Red=dead cells (ethidium homodimer-1). Bar=50 μm.

FIG. 45 illustrates Fluorescent images showing cell viability of Saos-2 cells seeded on XHA at 24 h (a-c), 48 h (d-f) and 72 h (g-i). Green=live cells (calcein), Red=dead cells (ethidium homodimer-1). Bar=50 μm.

FIG. 46 illustrates Graphical comparison of Saos-2 cell proliferation in BHA & XHA scaffolds at A) 24 h, B) 48 h and C) 72 h (n=3, *—(unpaired t-test, P<0.05), error bars are presented as ±SE of the mean), FIG. 47 illustrates Antibacterial activity of BHA and XHA scaffolds against A) *E. coli* and B) *S. aureus*. (n=3, *—(t-test, P<0.05), **—(t-test, P<0.01), error bars are presented as ±SE of the mean.

FIG. 48 illustrates Antibacterial activity of BHA and XI-IA against *E. coli* compared against a A) MH agar control.

FIG. 49 illustrates Antibacterial activity of BHA and XHA against *S. aureus* compared against a A) MH agar control.

FIG. 50 illustrates Antibacterial effect of metal ions. Adapted and modified from (Hajipour et al., 2012).

DETAILED DESCRIPTION

Figure 1:
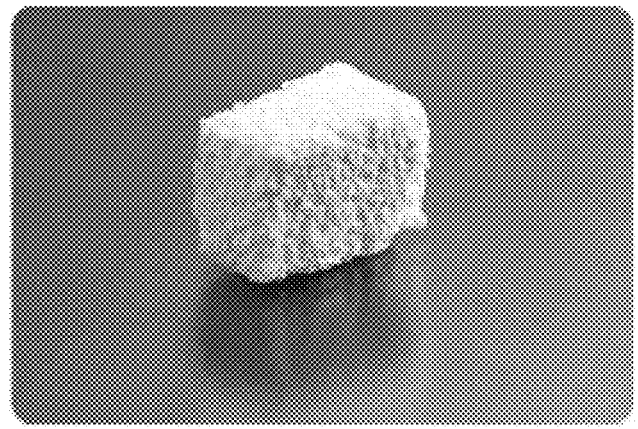
FIG. 1 illustrates Bio-Oss®, a commercial product available in the market.

An embodiment of the present invention provides an ion substituted bovine-derived hydroxyapatite, wherein said bovine-derived hydroxyapatite is ion-substituted with at least one type of ion, selected from F, Si, Cl, carbonate, citrate, Na, K, Ag, Mn, Zn, Zr, Cu, Co, Fe, Au, B, Ba, Al, Bi, Mg or Sr, or combinations thereof. The chemical composition of HA which is $(Ca_{10}(PO_4)_6(OH)_2)$, allows for the exchange of its calcium, phosphate and hydroxyl groups by several different anions and cations. This aspect was complemented by the characteristically smaller crystallite size of biological apatite that presents a large surface area and allow for extra absorption of ions to attain an organized structure in a short time. This technology can replace the use of autografts and allografts, and can be used as a bone graft to fill a critical size defect caused due to chronic disease, trauma and skeletal abnormalities. Furthermore, this technology could be used as a bone substitute for regenerative dentistry in applications such as bone augmentation.

In another embodiment of the present invention, it provides the ion substituted bovine-derived hydroxyapatite wherein said bovine-derived hydroxyapatite is from cancellous bovine bone. The said cancellous bovine bone is of, but not limited to, sheep, buffalo, ox, goat, chicken, duck, goose, pig, deer, alpaca, horse, turkey or ostrich.

The bovine bone waste biomaterial used in the present invention is sourced from New Zealand. There is a competitive advantage when bone sourced from the New Zealand meat industry is used in Biomedical applications. This is mainly due to the following factors such as Acquiring an "animal disease-free" status by the World Organization for Animal Health due to New Zealand's strict biosecurity controls, geographic isolation and quality control processes, free of "bovine spongiform encephalopathy" (BSE) or "mad cow disease" in ailments of New Zealand livestock. The disease is transmitted to humans by consuming meat affected by BSE, which leads to "variant Creutzfeldt-Jakob disease" (vCJD).

An embodiment of the present invention also provides the ion substituted bovine-derived. hydroxyapatite wherein said ion substituted bovine-derived hydroxyapatite has an average pore size of 180 µm to 600 µm.

Another embodiment provides the ion substituted bovine-derived hydroxyapatite wherein said ion-substituted bovine-derived hydroxyapatite has porosity in the range of 20% to 80%.

In another embodiment, it provides the ion-substituted bovine hydroxyapatite wherein said. ion substituted bovine-derived hydroxyapatite is ion substituted with fluoride ion.

Yet another embodiment provides the ion-substituted bovine hydroxyapatite wherein said ion substituted bovine-derived hydroxyapatite is ion substituted with silicate ion.

The bovine derived fluroapatite (BFA) and bovine derived silicon substituted hydroxyapatite (Si-BHA) retains bone topography or the interconnected porous network. The retained bone architecture increases angiogenesis and migration of osteogenic cells which is essential for bone formation. Fluoride ions stimulates osteoblast activity and it has been observed that there is increased alkaline phosphatase activity and cell proliferation on bone cells. Silicate substitutions in the bovine HA increases the solubility of hydroxyapatite, and therefore, it has a direct link on increasing its bioactivity. Additionally, Si-HA has shown a great potential as a coating material for future biomedical applications.

Another embodiment of the present invention provides an ion substituted hydroxyapatite wherein said bovine-derived hydroxyapatite is ion-substituted with fluoride ion, said fluoride substituted hydroxyapatite has porosity of 71.62%±1.28 and fluoride content is in the range of 0.1 wt % to 11 wt %. In a preferred embodiment, the fluoride content is in the range of 1 wt % to 2 wt %.

Yet another embodiment provides an ion substituted hydroxyapatite wherein said bovine-derived hydroxyapatite is ion-substituted with silicate ion, said silicon substituted hydroxyapatite has porosity of 70.54%±1.14 and silicon content is in the range of 0.1 wt % to 11 wt %. In a preferred embodiment, the silicon content is in the range of 0.8 wt % to 1 wt %.

An embodiment of the present invention also provides an ion substituted hydroxyapatite wherein said ion substituted bovine-derived hydroxyapatite is co-substituted with magnesium ion and strontium ion.

In another embodiment, it provides the ion substituted bovine-derived hydroxyapatite, wherein said bovine-derived hydroxyapatite is co-substituted with magnesium and strontium ions, said co-substituted hydroxyapatite has porosity of 63.1%±1.33%, magnesium content is in the range of 0.1wt % to 11 wt %, and strontium content is in the range of 0.1 wt % to 11 wt %.

In a more preferred embodiment, the invention provides the ion substituted bovine-derived hydroxyapatite, wherein the Mg content is 0.9 wt % to 1.5 wt % and the Sr content is 1.5 wt % to 2.7 wt %.

Another embodiment of the present invention provides an ion substituted bovine-derived hydroxyapatite which is ion-substituted with at least one type of ion, selected from Si, Cl, carbonate, citrate, Na, K, Ag, Mn, Zn, Zr, Cu, Co, Fe, Au, B, Ba, Al, Bi, Mg or Sr, or combinations thereof, and wherein said hydroxyapatite is crystalline.

Yet another embodiment of the present invention provides a scaffold comprising the bovine-derived hydroxyapatite in accordance with the present invention, or as described in the embodiments herein. The ion-substituted BHA scaffold is categorized as a biocompatible and osteoconductive material since it allows ingrowth of vascular tissue and attachment of Mesenchymal stem cells into the scaffold and degrades with time without eliciting an immune response.

An embodiment further provides a process of preparing ion substituted bovine-derived hydroxyapatite which is ion-substituted with at least one type of ion, selected from Si, Cl, carbonate, citrate, Na, K, Ag, Mn, Zn, Zr, Cu, Co, Fe, Au, B, Ba, Al, Bi, Mg or Sr, or combinations thereof, said process comprising:

mixing stoichiometric amounts in the range of 0.01 gmol$^{-1}$ to 10 gmol$^{-1}$ of a phosphate precursor and an ion precursor in de-ionized water at a temperature in the range of 70° C. to 90° C. to obtain phosphate-ion precursor solution;

adding of a solution of a stoichiometric amount in the range of 0.01 gmol$^{-1}$ to 10 gmol$^{-1}$ of calcium precursor in de-ionized water to the phosphate-ion precursor solution;

placing bovine-derived hydroxyapatite into the reaction mixture at a pH value in the range of 9.0 to 12.0, and stirred at 70-90° C. for 1-8 hours to obtain the ion-substituted bovine-derived hydroxyapatite; and heating the ion-substituted bovine-derived hydroxyapatite at a temperature in the range of 300° C. to 1200° C. for 1 to 8 hours.

The required pH range in the process can be regulated by any base, or by any means known to a person skilled in the art. In a preferred embodiment, the pH value in the range of 9.0 to 12.0 in the preparation of ion substituted bovine-derived hydroxyapatite which is ion-substituted with at least one type of ion, selected from F, Si, Cl, carbonate, citrate, Na, K, Ag, Mn, Zn, Zr, Cu, Co, Fe, Au, B, Ba, Al, Bi, Mg or Sr, or combinations thereof, is regulated using 20 ml to 80 ml preferably 40 ml to 70 ml, and more preferably 60 ml of ammonium hydroxide solution.

Yet another embodiment provides a process of preparing fluoride substituted bovine-derived hydroxyapatite, said process comprising:

mixing stoichiometric amounts in the range of 0.01 gmol$^{-1}$ to 10 gmol$^{-1}$ of ammonium hydrogen phosphate and ammonium fluoride in de-ionized water at a temperature in the range of 83° C. to 88° C., preferably 85° C., to obtain phosphate-fluoride precursor solution;

adding of a solution of a stoichiometric amount in the range of 0.01 gmol$^{-1}$ to 10 gmol$^{-1}$ of calcium nitrate tetra hydrate in de-ionized water to the phosphate-fluoride 2.0 precursor solution;

placing bovine-derived hydroxyapatite into the reaction mixture at a pH value of 10.0 to 11.0, preferably 10.5, adjusted using 40-70 ml preferably 60 ml of ammonium hydroxide solution and stirred at a temperature range of 83° C. to 88° C., preferably 85° C., for 3 to 6 hours, preferably 4 hours, to obtain the fluoride-substituted bovine-derived hydroxyapatite; and heating the fluoride-substituted bovine-derived hydroxyapatite at a temperature of 550° C. to 650° C., preferably 600° C., for about 3-6 hours, preferably 4 hours.

In the process in accordance with the present invention for the preparation of the fluoride substituted bovine-derived hydroxyapatite the Calcium/Phosphate molar ratio is in the range of 1.5 to 2.0, preferably 1.67 and the Phosphate/Fluoride molar ratio is in the range of 2.5- 3.5, preferably 3.

Another embodiment of the present invention provides silicon substituted bovine-derived hydroxyapatite, said process comprising:

mixing stoichiometric amounts in the range of 0.01gmol$^{-1}$ to 10 gmol$^{-1}$ of ammonium hydrogen phosphate and silicon tetraacetate in de-ionized water at a temperature of in the range of 83° C. to 88° C., preferably 85° C., to obtain phosphate-silicon precursor solution;

adding of a solution of stoichiometric amount in the range of 0.01 gmol$^{-1}$ to 10 gmol$^{-1}$ calcium nitrate tetra hydrate in de-ionized water to the phosphate-silicon precursor solution;

placing bovine-derived hydroxyapatite into the reaction mixture at a pH value of 10.0 to 11.0, preferably 10.5, adjusted using 40-70 ml preferably 60 ml of ammonium hydroxide solution and stirred at a temperature in the range of 83° C. to 88° C., preferably 85° C., for 3 to 6 hours to obtain the silicon-substituted bovine-derived hydroxyapatite; and heating the silicon-substituted bovine-derived hydroxyapatite at a temperature in the range of 550° C. to 650° C., preferably 600° C., for 3 to 6 hours, preferably 4 hours.

In the process in accordance with the present invention for the preparation of the silicon substituted bovine-derived hydroxyapatite, the Calcium/Phosphate molar ratio is in the range of 1.5 to 2.0, preferably 1.73 and the Calcium/(Phosphate+Silicon) molar ratio is in the range of 1.0 to 2.0, preferably 1.67.

In an embodiment, it provides a process for preparing magnesium-strontium co-substituted bovine-derived hydroxyapatite, said process comprising:

mixing stoichiometric amounts in the range of 0.01 gmol$^{-1}$ to 10 gmol$^{-1}$ of ammonium hydrogen phosphate and equimolar quantities of magnesium chloride hexahydrate and strontium nitrate in de-ionized water at a temperature in the range of 83° C. to 88° C., preferably 85° C. to obtain phosphate-magnesium-strontium precursor solution;

adding of a solution of stoichiometric amount in the range of 0.01 gmol$^{-1}$ to 10 gmol$^{-1}$ of calcium nitrate tetra hydrate in de-ionized water to the phosphate-magnesium-strontium precursor solution;

placing bovine-derived hydroxyapatite into the reaction mixture at a pH value of 10.0 to 11.0, preferably 10.5, adjusted using 40 ml to 70 ml preferably 60ml of ammonium hydroxide solution stirred at a temperature range of 83° C. to 88° C., preferably 85° C. for 3 to 6 hours, preferably 4 hours to obtain the magnesium-strontium co-substituted bovine-derived hydroxyapatite; and heating the magnesium-strontium co-substituted bovine-derived hydroxyapatite at a temperature in the range of 550° C. to 650° C., preferably 600° C. for about 3 to 6 hours, preferably 4 hours.

In the process in accordance with the present invention for the preparation of the magnesium-strontium co-substituted bovine-derived hydroxyapatite, the Calcium/Phosphate molar ratio is in the range of 1.5 to 2.0, preferably 1.67 and (Calcium+Magnesium+Strontium/Phosphate molar ratio is in the range of 1.5 to 2.0, preferably 1.67.

EXAMPLES

The disclosure will now be illustrated with working examples, which is intended to illustrate the working of the invention and not intended to take restrictively to imply any limitations on the scope of the present invention. Other embodiments are also possible.

The chemical, physical, structural and thermal properties of the developed bone grafts were characterized. Fourier transform infrared (FTIR) spectroscopy confirmed removal of organic matter from the bone matrix after subcritical water extraction and sintering at 650° C. with the presence of carbonate ($CO_3^{2-}$), phosphate ($PO_4^{3-}$) and hydroxyl ($OH^-$) functional groups. FTIR spectroscopy further confirmed that both fluoride and silicate ions were substituted into the hydroxyapatite lattice.

X-ray diffraction studies confirmed the crystalline nature of the three materials. Energy dispersive X-ray analysis showed that the main inorganic phases contained calcium and phosphorus as the major elements with trace amounts of sodium, magnesium, potassium, zinc and strontium.

Scanning electron microscopy showed the three materials had retained their natural macro porous architecture.

Thermo gravimetric analysis showed that the three materials were stable up to 1000° C. losing only ~2% of their weight. Meanwhile, the BHA, BFA and SiBHA scaffolds showed excellent chemical and structural stability in simulated body fluid (SBF) after 28 days of incubation.

Mechanical testing on the three materials were carried out by compression testing on an Instron materials testing instrument. The fluoride and silicate substituted bovine hydroxyapatite samples (BFA and SiBHA) showed an improvement in Young's modulus and compressive strength compared to bovine hydroxyapatite (BRA).

Further, the biocompatibility of the three materials were tested using Saos-2 cell culture testing. In-vitro studies showed the three materials were biocompatible, supporting proliferative growth of Saos-2 osteoblast cells. The three materials exhibited osteo-inductive features which suggested that these scaffolds constitute a good substrate for Saos-2 cell differentiation leading to extra cellular bone matrix formation.

Materials and Methods

Prior to all the experiments, glass wares were rinsed with detergents, hot water and de-ionised water followed by drying in a domestic oven at 37° C.-100° C., preferably at 60° C. for 24 hours. A magnetic stirrer was used for continuous stirring and heating the solution. The pH meter (SCHOTT instruments, Germany) was calibrated with buffer solution at pH 4, 7 and 10 to monitor the pH during the sol-gel synthesis process.

The Sol Gel Method

The sol gel method is a wet chemical method used to produce a wide range of forms such as powders, coatings, fibers, organic/inorganic hybrids, thin films and monoliths, "Sol" is a dispersion of colloidal particles in a liquid where the colloidal particles can be in the range of 1-1000 nm. A sol differs from a solution since it contains a two-phase system (solid-liquid) whereas a solution contains a single-phase system (Floch, H. G., Belleville, P. F., Priotton, J.-J., Pegon, P. M., Dijonneau, C. S., Guerain, J., 1995. *Sol-gel optical coatings for lasers:* Part 1. Am. Ceram. Soc. Bull. 74, 60-63). A "gel" is an interconnected polymeric network formed by the assembly of the sol (Aurobind, S. V., Amirthalingam, K. P., Gomathi, H., 2006. *Sol-gel based surface modification of electrodes for electro analysis*. Adv. Colloid Interface Sci. 121, 1-7). The sol-gel process possesses several advantages such as (Ben-Nissan, B., Choi, A. H., 2006. *Sol-gel production of bioactive nanocoatings for medical applications. Part 1: an introduction*. Nanomedicine 1, 311-319.; Sopyan, I., Singh, R., Hamdi, M., 2008. *Synthesis of nano sized hydroxyapatite powder using technique and its conversion to dense and porous bodies*. Indian J. Chem.—Sect. A Inorganic, Phys. Theor. Anal. Chem. 47, 1626).
  homogenous molecular mixing of the Ca and P precursors which improves the chemical homogeneity of the resulting particles
  Produces particles of nano scale and high purity
  Flexibility in using different chemical routes (alkoxide or aqueous based)
  Low synthesis temperature, During the sol gel procedure, the calcium precursor and the phosphorous precursor are converted through hydrolysis and condensation reactions which eventually leads to the formation of an amorphous gel (Ben-Nissan, B., Choi, A. H., 2006. *Sol-gel production of bioactive nanocoatings for medical applications. Part 1: an introduction*. Nanomedicine 1, 311-319.; Bezzi, G., Celotti, G., Landi, E., La Torretta, T. M., Sopyan, I., Tampieri, A., 2003. *A novel sol-gel technique for hydroxyapatite preparation*. Mater. Chem, Phys. 78, 816-824).

Sol-gel processing methods can be categorized as aqueous based (presence of water) and alcohol based. In the present invention, an aqueous based method was used. Calcium nitrate-tetrahydrate and ammonium hydrogen phosphate were used as the calcium and phosphorous precursors respectively. Aqueous ammonia was used as the gelling agent. Calcium precursors such as calcium acetate, calcium hydroxide, calcium chloride and calcium nitrate were used in previous studies as the source of calcium in the HA sol-gel process while phosphate precursors have been triethyl phosphite (TEP), triethyl phosphate, phosphoric pentoxide and ammonium hydrogen phosphate (Bezzi, G., Celotti, G., Landi, E., La Torretta, T. M., Sopyan, I., Tampieri, A., 2003. *A novel sol-gel technique for hydroxyapatite preparation*. Mater. Chem. Phys. 78, 816-824; Floch, H. G., Belleville, P. F., Priotton, J.-J., Pegon, P. M., Dijonneau, C. S., Guerain, J., 1995. *Sol-gel optical coatings for lasers: Part 1*. Am. Ceram. Soc. Bull. 74, 60-63.; Jillavenkatesa, A., Condrate, R. A., 1998. *Sol-gel processing of hydroxyapatite*. J. Mater, Sci. 33, 4111-4119. Sopyan, I., Singh, R., Hamdi, M., 2008. *Synthesis of nano sized hydroxyapatite powder using sol-gel technique and its conversion to dense and porous bodies*. Indian J. Chem.—Sect. A Inorganic, Phys. Theor. Anal. Chem. 47, 1626; Vijayalakshmi, U., Rajeswari, S., 2006. *Preparation and characterization of microcrystalline hydroxyapatite using sol gel method*. Trends Biomater. Artif. Organs 19, 57-62). From the literature, calcium nitrate tetrahydrate and triethyl phosphite (TEP) have been the most promising Ca and P precursors. However, ammonium hydrogen phosphate was used as the P precursor in this study mainly because it requires a small volume of water (50 ml) and a shorter duration (15 min) for hydrolysis to occur. A previous study showed that a minimum amount of 100ml of water and 24 hours was required to hydrolyse TEP (Tredwin, C. J., 2009. *Sol-gel derived hydraoxyapatite, fluorhydroxy- apatite and fluorapatite coatings for titanium implants*. University College London). in addition, calcium nitrate and TEP can react together to form a combination of β-TCP and hydroxyapatite in the resulting HA sol gel (Kim, H. W., Kong, Y. M., Bae, C. J., Noh, Y. J., Kim, H E., 2004b. *Sol-gel derived fluor-hydroxyapatite biocoatings on zirconia substrate*. Biomaterials 25, 2919-2926). Therefore, both calcium nitrate tetra hydrate and ammonium hydrogen phosphate were chosen as the Ca and precursors respectively due to the low mixing time which was beneficial in the overall sol-gel synthesis process.

During the synthesis process a slow titration process (calcium precursor was added drop wise into the phosphate precursor) and diluted solutions were used to improve chemical homogeneity and avoid rapid precipitation which would hinder the molecular mixing of the reagents (Agrawal, K., Singh, G., Puri, D., Prakash, S., 2011. *Synthesis and Characterization of Hydroxyapatite Powder by Sol-Gel Method for Biomedical Application*, Journal of Minerals & Materials Characterization K. Engineering).

Aqueous ammonia (ammonium hydroxide) was added to maintain the pH value at 10.5 throughout the entire experiment. The addition of ammonium hydroxide can catalyze the reaction between calcium nitrate tetra hydrate and ammonium hydrogen phosphate which improves the gelation process. In addition, a reduction in the pH (pH<9) leads to the formation of calcium-deficient apatite structures (Jillavenkatesa, A., Condrate, R. A., 1998. *Sol-gel processing of hydroxyapatite*. J. Mater, Sci. 33, 4111-4119). The following reaction illustrates the formation of hydroxyapatite (Ben-Nissan, B., Choi, A. H., 2006. *Sol-gel production of bioactive nanocoatings for medical applications. Part I: an introduction*. Nanomedicine 1, 311-319.; Bezzi, G., Celotti, G., Landi, E., La Torretta, T. M., Sopyan, I., Tampieri, A., 2003. *A novel sol-gel technique for hydroxyapatite preparation*, Mater. Chem. Phys. 78, 816-824).

$$10Ca(NO_3)_2 \cdot 4H_2O + 6(NH4)_2HPO_4 + 8NH_4OH \rightarrow Ca_{10}(PO4)_6(OH)_2 + 20NH_4NO_3 + 6H_2O$$

The gelation is the process where dusters grow due to aggregation of particles until they collide, when the clusters are linked together it forms a giant cluster which is called a gel (Kim, H. W., Kim H. E., Knowles, J. C., 2004a. *Fluor-hydroxyapatite sol-gel coating on titanium substrate for hard tissue implants*. Biomaterials 25, 3351-3358).

Hydroxyl ions supplied from ammonia can deprotonate the ammonium hydrogen phosphate, this places ammonium hydrogen phosphate into a more reactive state which can react with $Ca^{2+}$ to form HA. However, without the addition of ammonium hydroxide the reaction would still occur but would take a longer time (Tredwin, C. J., 2009. *Sol-gel derived hydroxyapatite, fluorhydroxyapatite and fluorapatite coatings for titanium implants*. UCL (University College London).

Maintaining a pH value above 10 is critical since the pH value has a strong influence on the dissociation process of phosphoric acid ($H_3PO_4$) reagents. $H_3PO_4$ dissociates into $H_2PO_4^-$ and $HPO4^{2-}$ with the pKa values for the dissociation being 2.1 and 7.2 respectively (Cerozi, B. da S., Fitzsimmons K., 2016. *The effect of pH on phosphorus availability and speciation in an aquaponics nutrient solution*. Bioresour. Technol. 219, 778-781.; Schachtman, D. P., Reid, R. J., Ayling, S. M., 1998. *Phosphorus Uptake by Plants: From Soil to Cell*. Plant Physiol). These phosphate ions are present in a large number and would incorporate into the HA lattice resulting in HA crystals with calcium vacancies which reduces the thermal stability of HA. Several studies have demonstrated that HA forms at a higher pH value whereas at a lower pH, the formation of 2.0 calcium hydrogen phosphate (CaHPO$_4$) phases could occur (Liu, D. M., Troczynski, T., Tseng, 2001. *Water-based sol-gel synthesis of hydroxyapatite: process development*. Biomaterials 22, 1721-30.; Martin, R. I., Brown, P. W., 1995. *Mechanical properties of hydroxyapatite formed at physiological temperature*. J. Mater. Sci. Mater. Med. 6, 138-143).

The temperature was maintained at 85° C. throughout the experiment. A reaction conducted at a higher temperature delivers more energy into the system, thus increasing the rate of reaction and allowing the maturation of the hydroxyapatite phases. Liu et al found that raising the temperature shortens the reaction time for the formation of pure HA (Liu, D. M., Troczynski, T., Tseng, W. J., 2001. *Water-based sol gel synthesis of hydroxyapatite: process development*. Biomaterials 22, 1721-30). In addition, conducting the experiment at 85° C. would evaporate the excess solvents which is mainly water.

EXAMPLE 1

Fluoride ions and silicate ions were incorporated into the BHA scaffold using a modified sol gel process to produce two different scaffolds namely bovine fluorapatite (BFA) and silicon substituted bovine hydroxyapatite (SiBHA). A detailed description of the process is given below.

EXAMPLE 1.1

Preparation of Bovine Fluorapatite (BFA)

The following precursors were used to synthesise the sol-gel which contains fluoride ions (F sol-gel)
(i) Calcium precursor—AnalaR grade calcium nitrate tetra hydrate [Ca(NO$_3$)$_2$·4H2O], Sigma Aldrich NZ
(ii) Phosphorous precursor—AnalaR grade ammonium hydrogen phosphate [(NH4)$_2$HPO$_4$], Sigma Aldrich NZ
(iii) Fluoride precursor—AnalaR grade ammonium fluoride [NH4F], Sigma Aldrich NZ AnalaR grade ammonia solution was used to adjust the pH value. The [Calcium]/[Phosphate] and the [Phosphate]/[Fluoride] mole ratio was maintained at 1.677 and 3 respectively.

Figure 2:
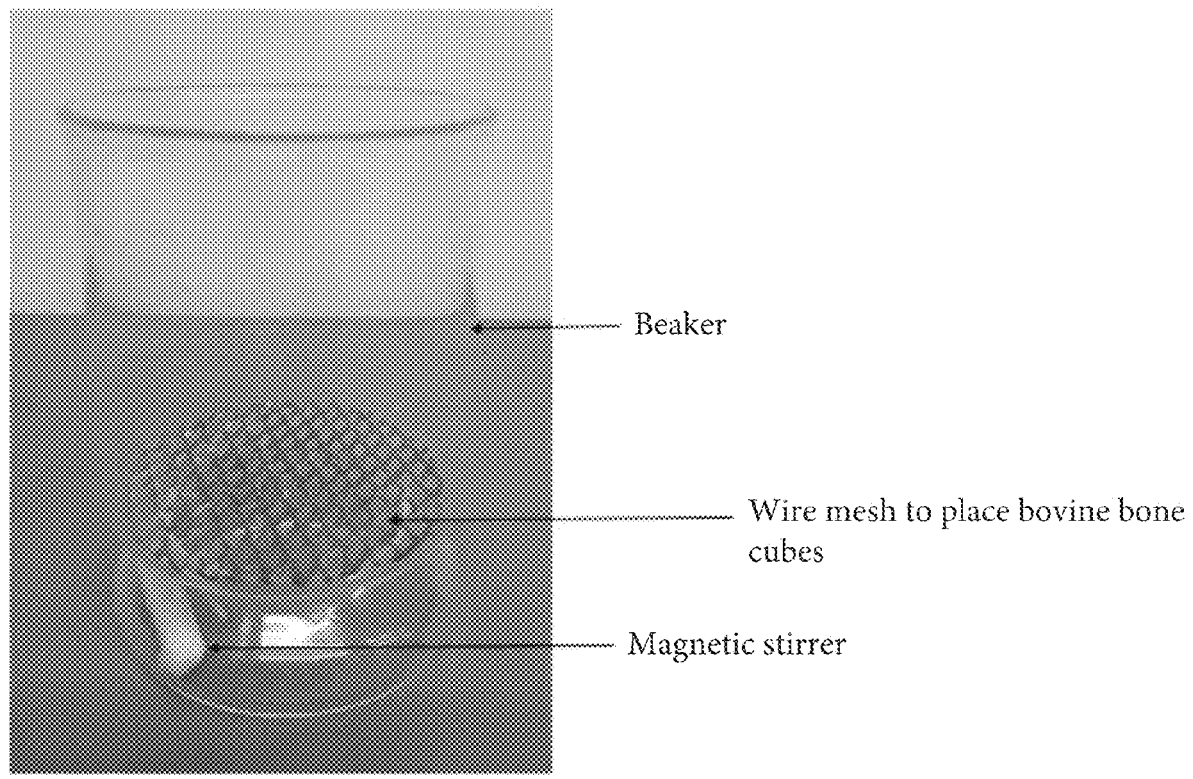
FIG. 2 illustrates the phosphate-fluoride containing solution transferred into a custom-made beaker.

0.1 gmol$^{-1}$ of ammonium hydrogen phosphate and 0.0334 gmol-1 ammonium fluoride were first dissolved in 50ml of de-ionized water and then stirred vigorously for 15 minutes under room temperature and pressure. The phosphate-fluoride containing solution was transferred into a custom-made beaker, as shown in FIG. 2, and the solution was stirred at about 85° C. throughout the entire experiment.

Figure 3:
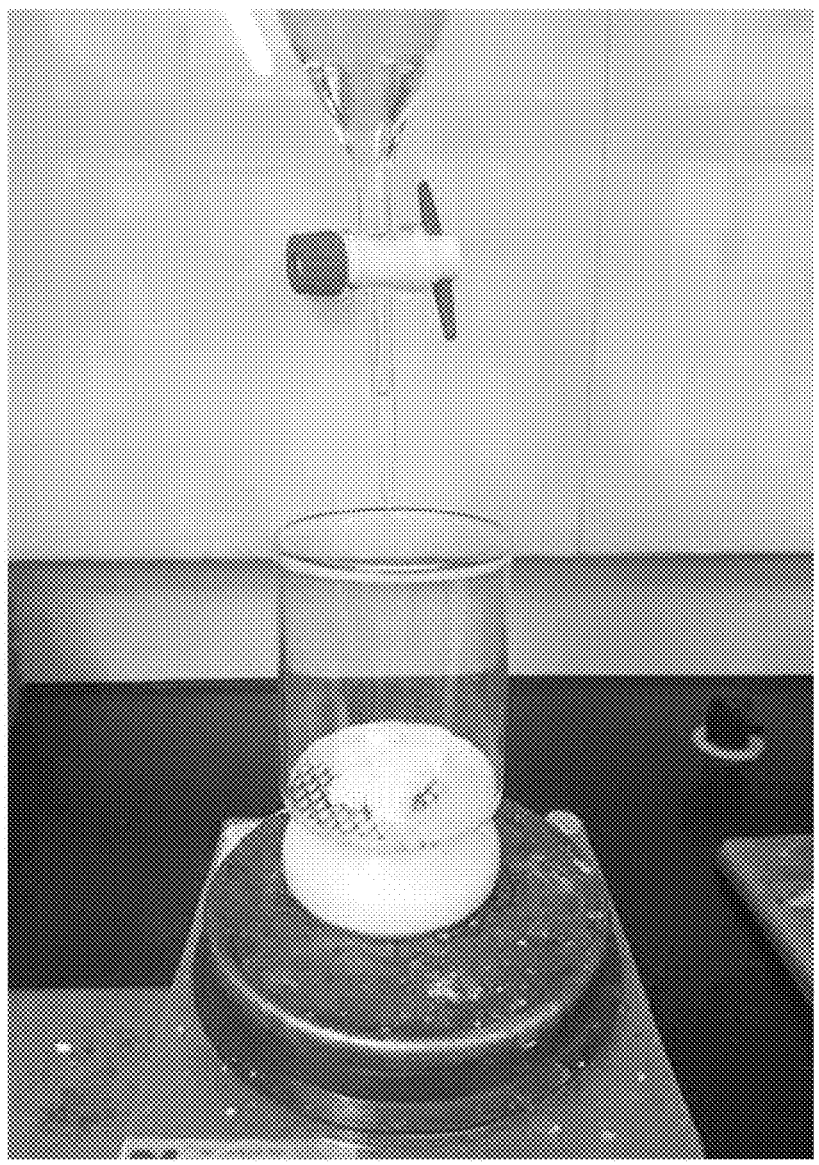
FIG. 3 illustrates placing of the BHA scaffolds on top of the wire mesh of the custom-made beaker as a white chalk colour appear in the solution.
Figure 4:
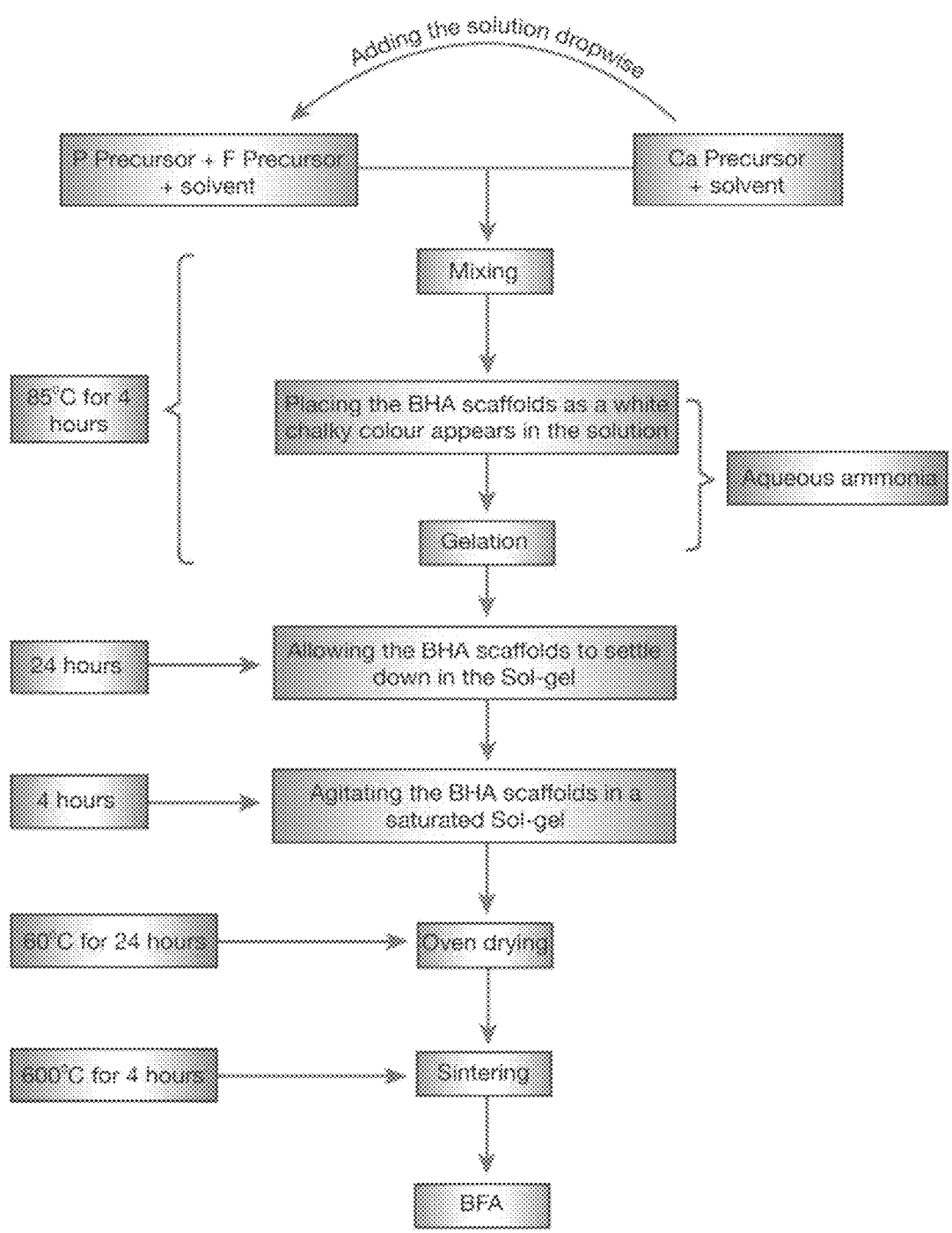
FIG. 4 illustrates Schematic flow chart of the sol-gel technique used to incorporate fluoride ions into the BHA scaffold.

In a separate beaker, a stoichiometric amount of 0.167 gmol$^{-1}$ calcium nitrate tetra hydrate was dissolved in de-ionized water with vigorous stirring for 30 minutes. While maintaining the PF solution at 85° C., the Ca(NO$_3$)$_2$·4H$_2$O solution was added drop wise into the [(NH$_4$)$_2$HPO$_4$+NH$_4$F] solution with the aid of a glass dropping-funnel. The temperature of the reaction mixture in the sol-gel reaction in the process in accordance with the present invention is between 70° C. to 90° C. The temperature used for the sol-gel process to prepare fluoride substituted bovine HA is preferably 85° C. As a white chalky colour appears in the solution, approximately 5-6 processed. bovine bone (BHA) cubes (12 mm×12 mm×12 mm) (size could vary) were placed immediately on top of the wire mesh in the custom-made beaker, as shown in FIG. 3. The remaining Ca(NO$_3$)$_2$·4H2O solution was added drop wise directly on to the processed bovine bones under mild stirring/agitating conditions. About 60 ml was added to the sol-gel reaction mix to maintain a pH value of 10.5 during the experiment the stirring of the combined solution was continued for further 4 hours as the gel formation occurred. The gel was allowed to settle at room temperature for an additional 24 hours. Afterwards, the bovine bone cubes were removed from the sol-gel and. the sol-gel was transferred to a separate beaker and was allowed to settle for 2 hours. The supernatant was discarded using a 20ml syringe and the BHA scaffolds were placed in the saturated F sol-gel. The sol gel which contained the BHA scaffolds were mildly agitated using an orbital shaker for a further 4 hours. Subsequently, the bovine bone cubes were removed from the sol-gel and dried in an oven for 24 hours at 60° C. Finally. the resulting BHA scaffolds were heat treated. in a hot air furnace at a temperature of 600° C. for 4 hours.

Table 1 depicts the preferred amount of the constituents for preparing the fluoride sol-gel.

TABLE 1

| Material | Ca (NO$_3$)$_2$·4H$_2$O | (NH$_4$)$_2$HPO$_4$ | NH$_4$F |
|---|---|---|---|
| RMM | 236.15 gmol$^{-1}$ | 132.056 gmol$^{-1}$ | 37 gmol$^{-1}$ |
| Number of moles | 0.167 | 0.1 | 0.0334 |
| Measured weight | 39.36 g | 13.2 g | 1.24 g |

Aqueous ammonia = 60 ml
De-ionised water = 100 ml

Fluoride ions replaces the hydroxyl group in the HA lattice to form fluoridated hydroxyapatite (FHA, Ca$_{10}$(PO$_4$)$_6$OH$_x$F$_{1-x}$). However, when the hydroxyl group in the hydroxyapatite lattice is completely replaced with fluoride ions, the formation of fluorapatite Ca$_{10}$(PO$_4$)$_6$F$_2$) occurs (Cheng, K., Han, G., Weng, W., Qu, H., Du, P., Shen, G., Yang, J., Ferreira, J. M. F., 2003. *Sol-gel derived fluoridated hydroxyapatite films*. Mater. Res. Bull. 38, 89-97.; Cheng, K., Zhang, S., Weng, W., 2006. *Sol-gel preparation of fluoridated hydroxyapatite in Ca(NO 3)2—PO(OH)3-x (OEt)x-HPF6 system*. J. Sol-Gel Sci. Technol, 38. 13-17.; Kim, H. W., Kong, Y. M., Bae, C. J., Noh, Y. J., Kim, H. E., 2004b. *Sol-gel derived fluor-hydroxyapatite biocoatings on zirconia substrate*. Biomaterials 25, 2919-2926). Pure fluorapatite (Ca$_{10}$(PO$_4$)$_6$F$_2$) possesses a greater chemical and structural stability than HA due to its highly ordered structure (Larsen, M. J., Jensen, S. J., 1989. *Solubility, unit cell dimensions and crystallinity of fluoridated human denial enamel*. Arch. Oral Biol. 34, 969-973.; Moreno, E. C., Kresak, M., Zahradnik, R. T., 1974. *Fluoridated hydroxyapatite solubility and caries formation*. Nature 247, 64-65).

EXAMPLE 1.2

Preparation of Silicon Substituted Bovine Hydroxyapatite

The sol-gel technique established above was used to incorporate silicate ions into the BHA scaffold. The following precursors were used to synthesize the sol-gel which contains silicate ions sol-gel).
(i) Calcium precursor—AnalaR grade calcium nitrate tetra hydrate [Ca (NO$_3$)$_2$·4H$_2$O], Sigma Aldrich NZ
(ii) Phosphorus precursor—AnalaR grade Ammonium hydrogen phosphate [(NH$_4$)$_2$HPO$_4$], Sigma Aldrich NZ
(iii) Silicate precursor—Anal R. grade Silicon tetraacetate [Si(CH$_3$COO)$_4$], Sigma Aldrich NZ AnalaR grade aqueous ammonia was used to adjust the pH value. The quantitates of reactants were calculated according to the protocol developed by Gibson et al assuming that silicate would substitute for phosphate (Gibson, I. R., Best, S. M., Bonfield, W., 1999. *Chemical characterization of silicon-substituted hydroxyapatite*, J Biomed Mater Res 44, 422-428). The starting mole ratio of [Ca]/[P] was adjusted to 1.73 where the mole ratio of [Ca]/[P+Si] was maintained at 1.67.

Controlled amounts of 0.0048 gmol$^{-1}$ $(NH_4)_2HPO_4$ and 0.002 gmol$^{-1}$ silicon tetraacetate [$Si(CH_3COO)_4$] were first dissolved in 50 ml of de-ionized water and stirred vigorously for 15 minutes at room temperature and pressure. The P—Si containing solution was transferred into a custom-made beaker while stirring the solution at 85° C. throughout the entire experimental process. In a separate beaker, 0.083 gmol$^{-1}$ of $Ca(NO_3)_2 \cdot 4H_2O$ was dissolved in 50 ml de-ionized water with vigorous stirring for 30 minutes. The Ca containing solution was added dropwise into the P—Si containing solution with the aid of a glass dropping-funnel. The 12 mm×12 mm×12 mm BHA cubes were placed on top of the wire mesh as a white chalky colour appeared in the solution and the remaining Ca containing solution was added slowly to the Si—P containing solution. 60 ml of aqueous ammonia was added to maintain the pH above 10. The stirring was continued for a further 4 hours until the gel formation occurred, and the gel was allowed to settle overnight. After the gel had settled, the bone cubes were removed, and the sol-gel was transferred into a separate beaker. The supernatant was discarded after allowing the gel to settle down for a further 2 hours. As described previously the bone cubes were mildly agitated in the Si—HA sol gel for 4 hours using an orbital shaker. Finally, the oven dried bone cubes were heat treated in a hot air furnace at 600° C. for 4 hours.

Table 2 depicts the preferred amount of the constituents for preparing the silicon sol-gel.

TABLE 2

| Material | $Ca(NO_3)_2 \cdot 4H_2O$ | $(NH_4)_2HPO_4$ | $Si(CH_3COO)_4$ |
|---|---|---|---|
| RMM | 236.15 gmol$^{-1}$ | 132.056 gmol$^{-1}$ | 264.26 gmol$^{-1}$ |
| Number of moles | 0.083 | 0.048 | 0.002 |
| Measured weight | 19.6 g | 6.33 g | 0.52852 g |

Aqueous ammonia = 60 ml
De-ionized water = 50 ml

The quantities of the reactants were calculated according to the protocol established by Gibson et al assuming that silicate ions would substitute fur phosphate ions in the HA lattice.

EXAMPLE 2

Characterization

The bovine hydroxyapatite (BHA), bovine fluorapatite (BFA) and silicon substituted bovine hydroxyapatite (SiBHA) were characterized in terms of its chemical, physical and thermal properties.
1) Chemical Properties
   Fourier Transform Infrared Spectroscopy (FTIR)
   Energy dispersive X-ray analysis (EDX analysis)
   Inductively coupled plasma-mass spectrometry (ICP-MS)
2) Physical Properties
   X-ray Diffraction (XRD)
   Scanning Electron Microscopy (SEM)
   Micro-CT analysis (μ-CT analysis)
3) Thermal Properties
   Thermogravimetric Analysis (TGA)

EXAMPLE 2.1

Fourier Transform Infra-Red Spectroscopy of Bovine Fluorapatite (BFA)

Figure 5:
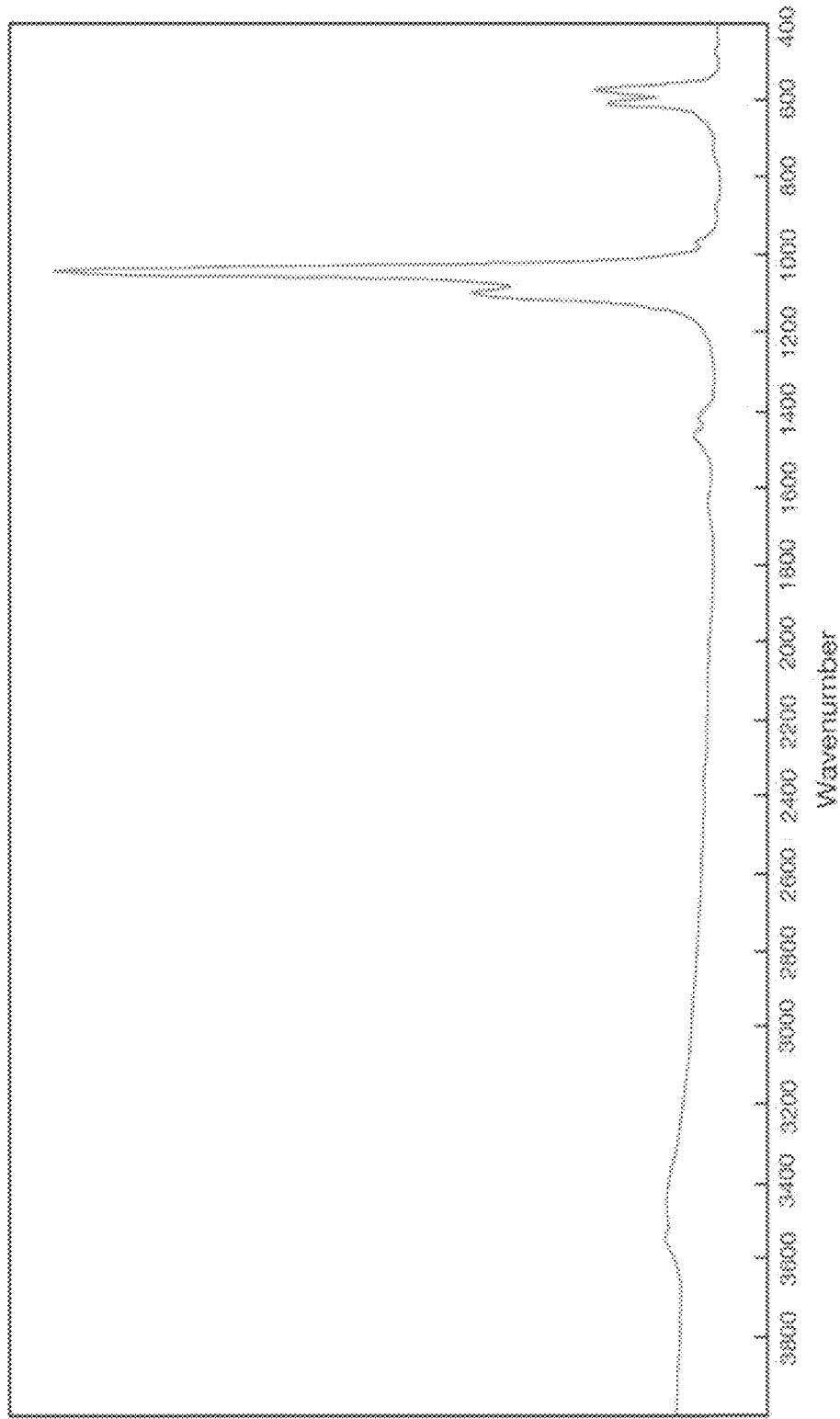
FIG. 5 illustrates the FTIR Spectra of BFA.
Figure 6:
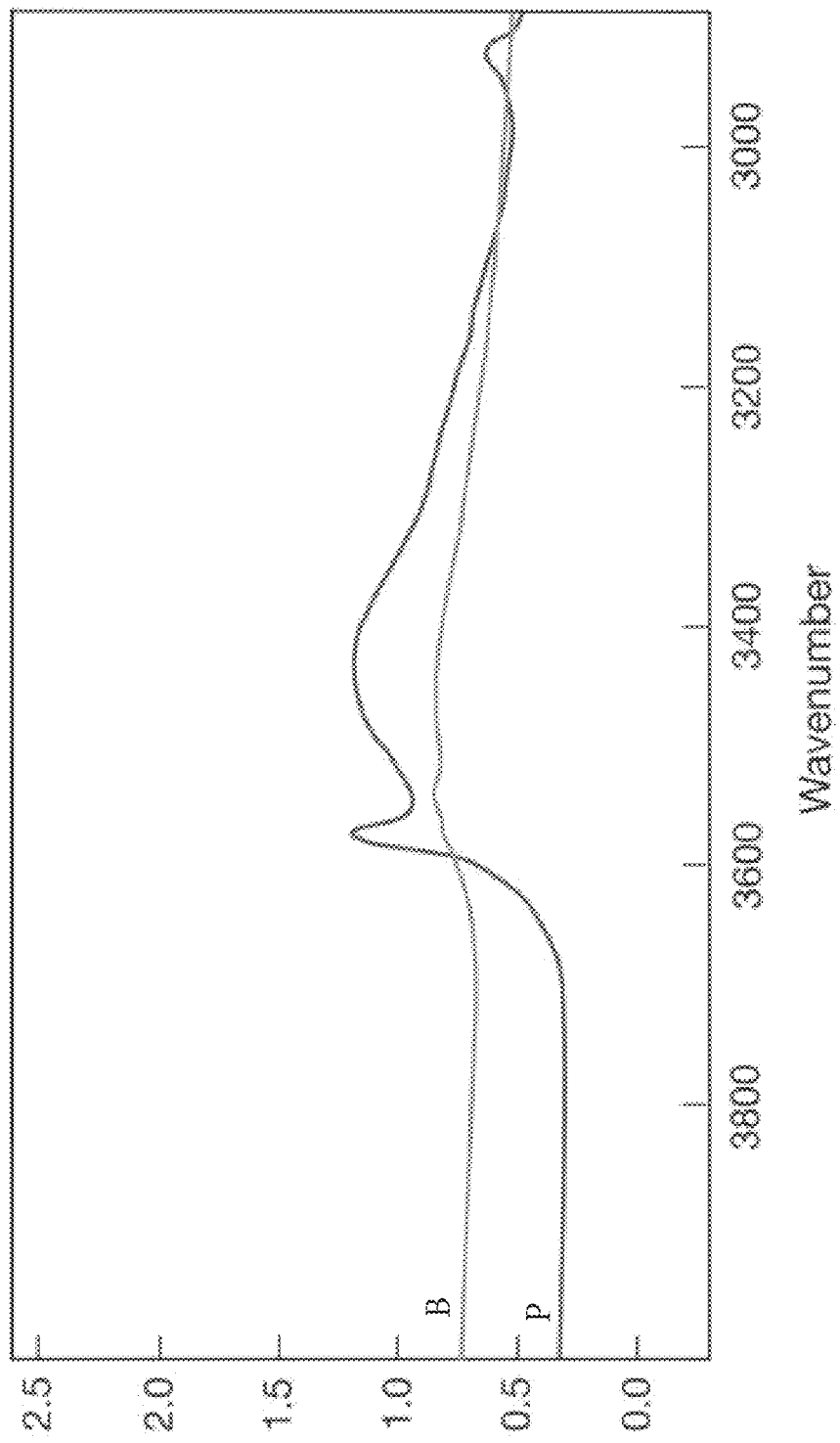
FIG. 6 illustrates the Superimposed FTIR spectra of BHA (P) and BFA (B). The BFA spectra showing the absence of the OH⁻ group at 3571 cm⁻¹.
Figure 7:
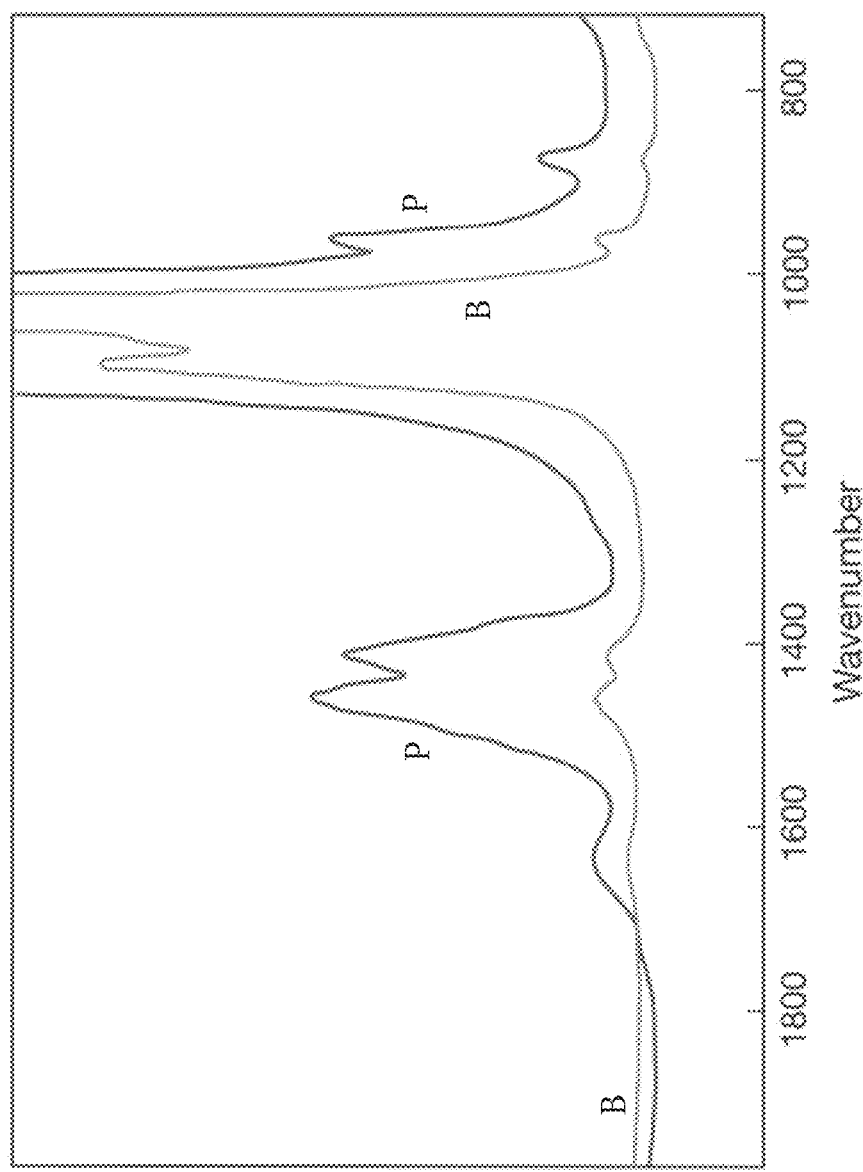
FIG. 7 illustrates Superimposed FTIR spectra of the carbonate peaks (1650-1473 $cm^{-1}$ and 873 $cm^{-1}$) of BHA (P) and BFA (B).

The FTIR spectra for BFA is presented in FIG. 5. The main Observation was that the hydroxyl peak observed at 3571 cm$^{-1}$ for BHA was absent for BFA (FIG. 6). A similar result was observed by Wei et al (Wei, M., Evans, J. H., Bostrom. T., Grondahl, L., 2003. *Synthesis and characterization of hydroxyapatite, fluoride-substituted hydroxyapatite and fluorapatite.* J. Mater. Sci. Mater. Med. 14, 311-320) for synthetic fluorapatite, whereas both Kim et al and Darroudi et al observed weak hydroxyl bands at 3572 cm$^{-1}$ and 3570 cm$^{-1}$ respectively for fluoride substituted hydroxyapatite (FHA) (Darroudi, M., Eshtiagh-Hosseini, H., Housaindokht, M. R., Youssefi, A., 2010. *Preparation and Characterization of Fluarohydroxyapatite Nanopowders by Nonalkoxide Sol-Gel Method*. Dig. J. Nanomater. Biostructures 5, 29-33.; Kim. H. W., Kim, H. E., Knowles, J. C., 2004a. *Fluor-hydroxyapatite sol-gel coating on titanium substrate for hard tissue implants*. Biomaterials 25, 3351-3358). This confirms that fluoride ions were mostly substituted for the hydroxyl group in the HA lattice resulting in an "A type" anionic substitution. The FTIR spectra showed the phosphate $v_3$, phosphate $v_1$, phosphate $v_4$ and phosphate $v_2$ vibrations at 1092 cm$^{-1}$ & 1040 cm$^{-1}$, 962 cm$^{-1}$, 633 cm$^{-1}$ & 566 cm$^{-1}$ and 473 cm$^{-1}$ respectively. The phosphate peaks were similar in wavenumber position to that found in BHA, though differed slightly in appearance which confirmed the formation of a stable fluoroapatite (FA) structure. Previous studies conducted by Wei et al reported similarly shaped phosphate peaks for FA (Wei, M., Evans, J. H., Bostrom, T., Grondahl, L., 2003. *Synthesis and characterization of hydroxyapatite, fluoride-substituted hydroxyapatite and fluorapatite.* J. Mater. Sci. Mater. Med. 14, 311-320). The carbonate $v_3$ and $v_2$ stretching modes stretching modes were still observed at 1455 cm$^{-1}$ -14180 cm$^{-1}$ in the BFA samples although the intensity was comparatively lower in contrast to those observed in BHA. In addition, the carbonate band at 873 cm$^{-1}$ was no longer Observed (FIG. 7). The lower carbonate content may be due to the further decomposition of carbonate because of heat treating the samples for the second time (600° C. for 4 hours).

EXAMPLE 2.2

Fourier Transform Infra-Red Spectroscopy of Silicon Substituted Bovine Hydroxyapatite (SiBHA)

Figure 8:
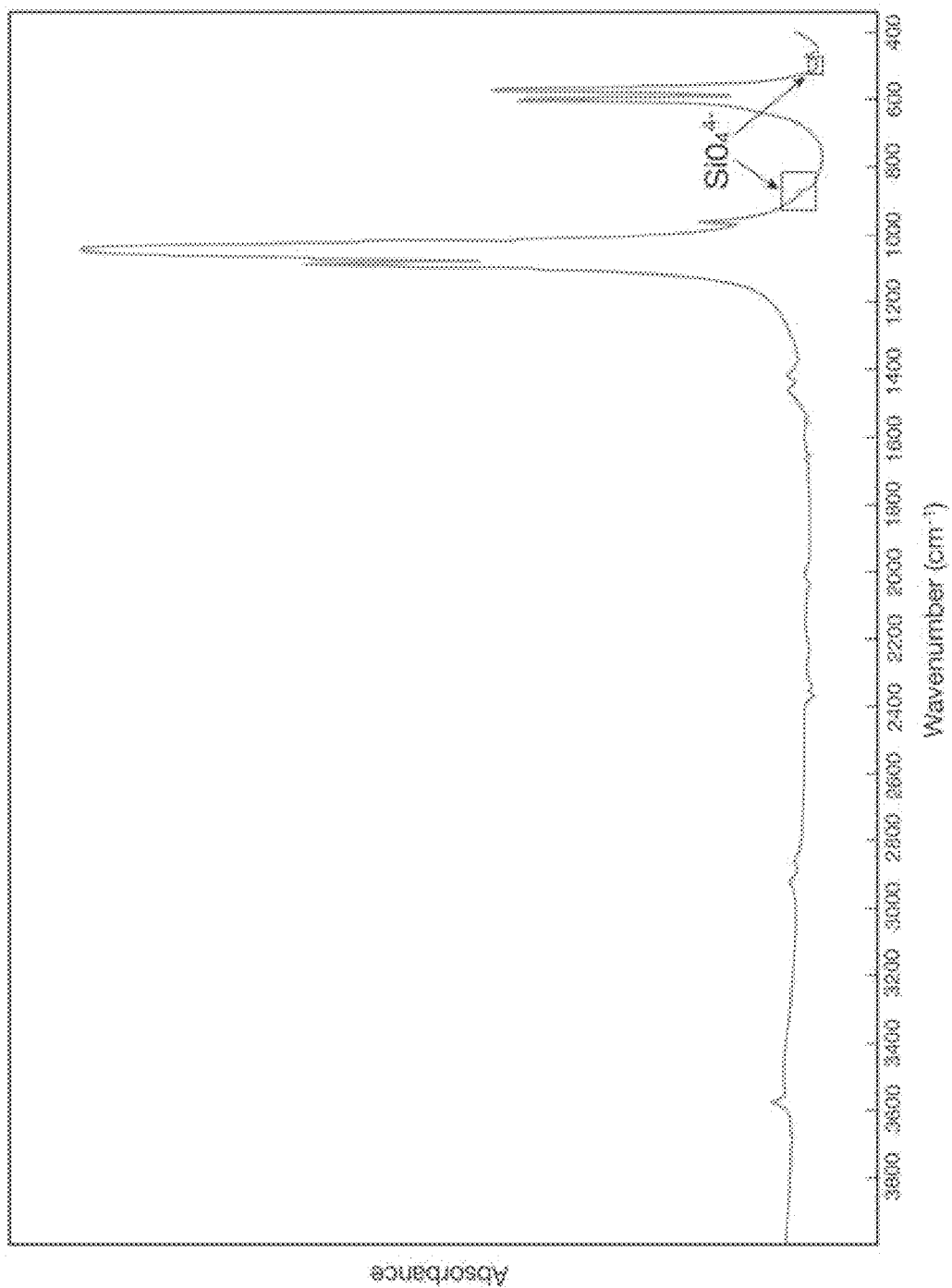
FIG. 8 illustrates FTIR spectra of silicon substituted bovine hydroxyapatite.

FTIR spectra was used to assess the effect of silicon substitution on the functional groups of hydroxyapatite. The FTIR spectra illustrated the characteristic peaks of HA such as the OH$^-$ band at 3571 cm$^{-1}$ and the phosphate bands at 1100-960 cm$^{-1}$ (1090 cm$^{-1}$, 1046 cm$^{-1}$ & 962 cm$^{-1}$), 660 cm$^{-1}$-520 cm$^{-1}$ (602 cm$^{-1}$, & 571 cm$^{-1}$) and 473 cm$^{-1}$ respectively. However, substituting silicate ions into HA changes the hydroxyl stretching bands, the peak at 634 cm$^{-1}$ did not appear in the SiBHA sample and the intensity of the hydroxyl peak at 3571 cm$^{-1}$ was considerably lower compared to BHA. This is mainly because substituting $SiO_4^{4-}$ into $PO_4^{3-}$ reduces the amount of hydroxyl groups required for charge balance (Aminian, A., Solati-Hashjin, M., Samadikuchaksaraei, A., Bakhshi, F., Gorjipour, F., Farzadi, A., Mortarzadeh, F., Schmücker, M., 2011. *Synthesis of silicon-substituted hydroxyapatite by a hydrothermal method with two different phosphorous sources*. Ceram. Int. 37, 1219-1229). Carbonate was retained in the hydroxyapatite structure, which was confirmed by the carbonate v3 and v2 stretching modes in the region 1455 $cm^{-1}$-1418$cm^{-1}$ although the intensity of these groups was considerably lower compared to BHA. However, the carbonate band which appeared at 873 $cm^{-1}$ was not found in SiBHA. This could be due to the decomposition of carbonate due to the second sintering step or as a result of $SiO_4^{4-}$ ions substituting for the phosphate groups since $CO_3^{2-}$ groups occupies the phosphate ions sites in the HA lattice (Aminian, A., Solati-Hashjin, M., Samadikuchaksaraei, A., Bakhshi., F., Gorjipour, F., Farzadi, A., Moztarzadeh, F., Schmücker, M., 2011. *Synthesis of silicon-substituted hydroxyapatite by a hydrothermal method with two different phosphorous sources*, Ceram. Int. 37, 1219 -1229.; Botelho, C. M., Lopes, M. A., Gibson, I. R., Best, S. M., Santos, J. D., 2002. *Structural analysis of Si-substituted hydroxyapatite: zeta potential and X-ray photoelectron spectroscopy*. J. Mater. Sci. Mater. Med. 13, 1123-1127.; Gibson, I. R., Best, S. M., Bonfield, W., 1999. *Chemical characterization of silicon-substituted hydroxyapatite*. J Biomed Mater Res 44, 422-428). Additionally, two low intensity bands appeared at 490 $cm^{-1}$ and 890 $cm^{-1}$ which did not appear in the BHA sample (FIG. 8). These two peaks attribute to the presence of silicate groups in the apatite structure (Aminian, A., Solati-Hashjin, M., Samadikuchaksaraei, A., Bakhshi, F., Gorjipour, F., Farzadi, A., Mortarzadeh, F., Schmücker, M., 2011. *Synthesis of silicon-substituted hydroxyapatite by a hydrothermal method with two different phosphorous sources*. Ceram. Int. 37, 1219-1229.; Botelho, C. M., Lopes, M. A., Gibson, I. R., Best, S. M., Santos, J. D., 2002. *Structural analysis of Si-substituted hydroxyapatite: zeta potential and X-ray photoelectron spectroscopy*. J. Mater. Sci. Mater. Med. 13, 1123-1127.; Tang, Q., Brooks, R., Rushton, N., Best, S., 2010. *Production and characterization of HA and SiHA coatings*. J Mater Sci Mater Med 21, 173-181).

EXAMPLE 2.3

Energy Dispersive X-Ray (EDX) and Inductively Coupled Plasma-Mass Spectrometry (ICP-MS) Analysis The EDX results revealed that the inorganic phases of BFA and SiBHA were mainly composed of calcium and phosphorus as the major constituents with trace amounts of sodium magnesium, potassium, zinc and strontium. These vital trace elements play an important role in bone metabolism promoting bone formation and suppressing bone resorption. For example, sodium ions play an essential role in bone mineralization, bone resorption and cell adhesion (Kannan, S., Ventura, J. M. G., Lemos, A. F., Barba, A., Ferreira, J. M. F., 2008 *Effect of sodium addition on the preparation of hydroxyapatites and biphasic ceramics*. Ceram. Int. 34, 7-13; Landi, E., Logroscino, G., Proietti, L., Tampieri, A., Sandri, M., Sprig, S., 2008. *Biomimetic Mg-substituted hydroxyapatite: from synthesis to in vivo behaviour*. J. Mater. Sci. Mater. Med. 19, 239-47) whereas, magnesium ions stimulate osteoblast proliferation during the early stages of osteogenesis (Matsunaga, K., Murata, H., 2009. *Formation Energies of Substitutional Sodium and Potassium in Hydroxyapatite*. Mater. Trans. 50, 1041-1045).

The fluoride content ranged between 1-2 wt % for the BFA sample when analysed using EDX and the [Ca]/[P] mole ratio for BEA varied between 1.67 and 1.79. However, when analysed using ICP-MS, the [Ca]/[P] mole ratio for BFA was 1.72 which is higher than the initial [Ca]/[P] ratio (1.67) used to synthesise the F-sol gel.

Figure 9:
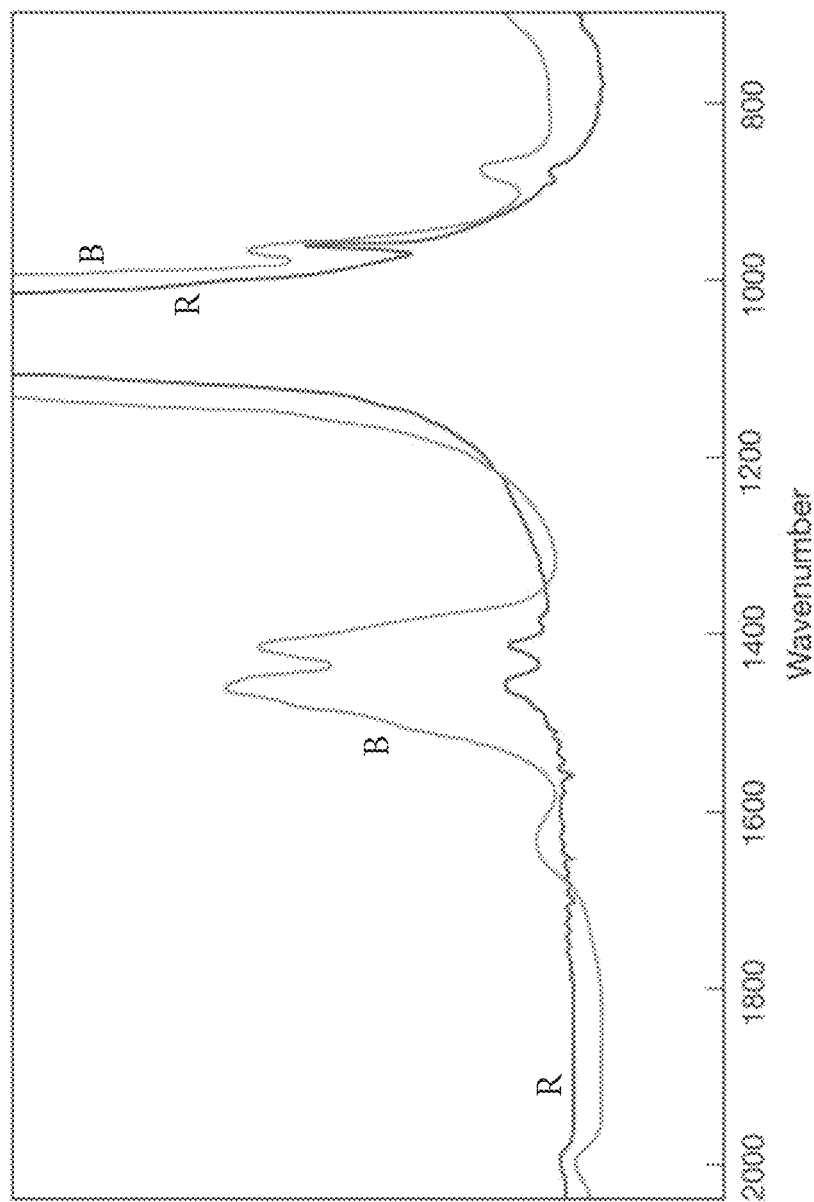
FIG. 9 illustrates Superimposed FUR spectra of the carbonate groups (1650-1473 $cm^{-1}$) of BHA.
Figure 10:
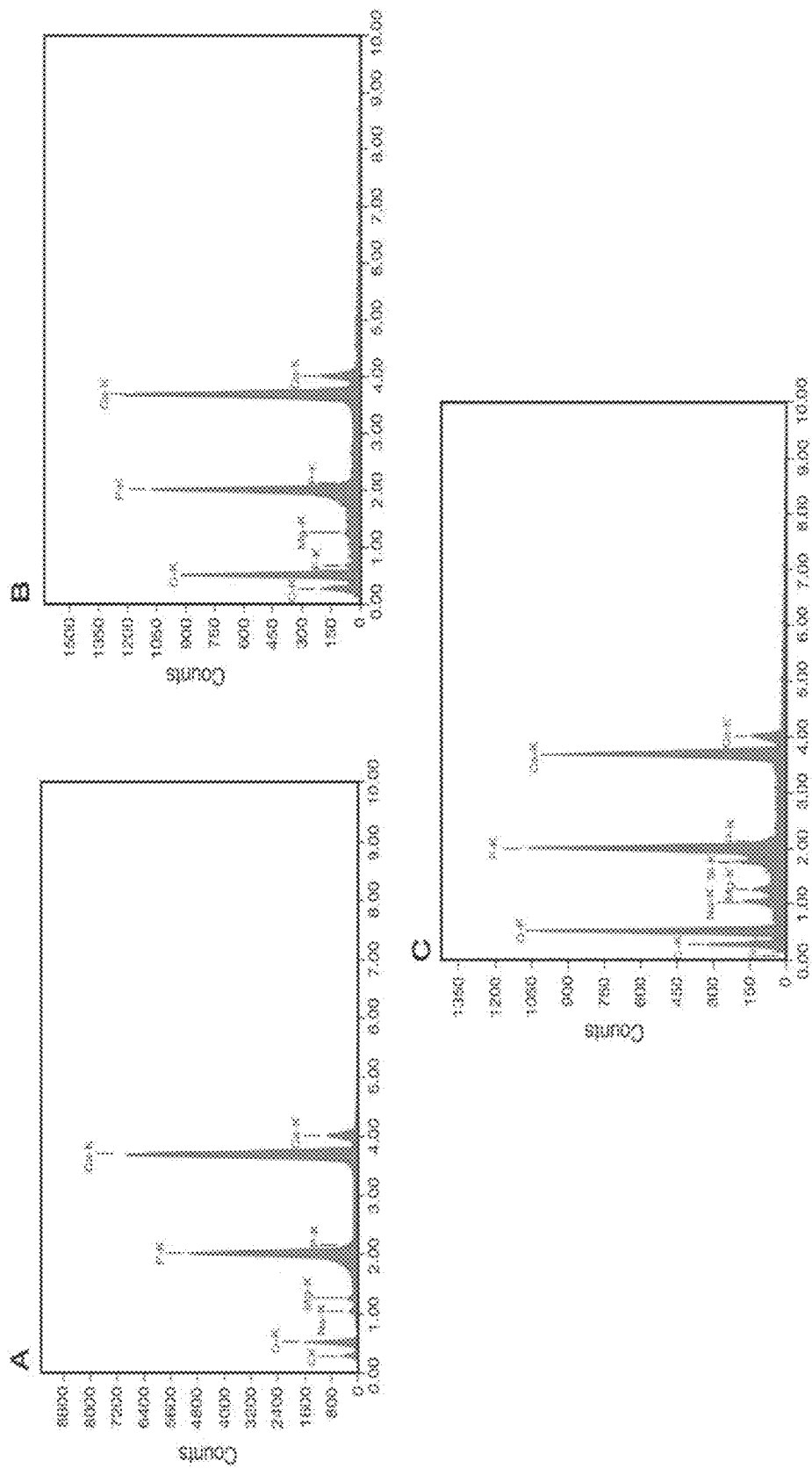
FIG. 10 illustrates EDX analysis of (A) bovine hydroxyapatite, of (B) bovine fluorapatite, of (C) silicon substituted bovine hydroxyapatite.
Figure 11:
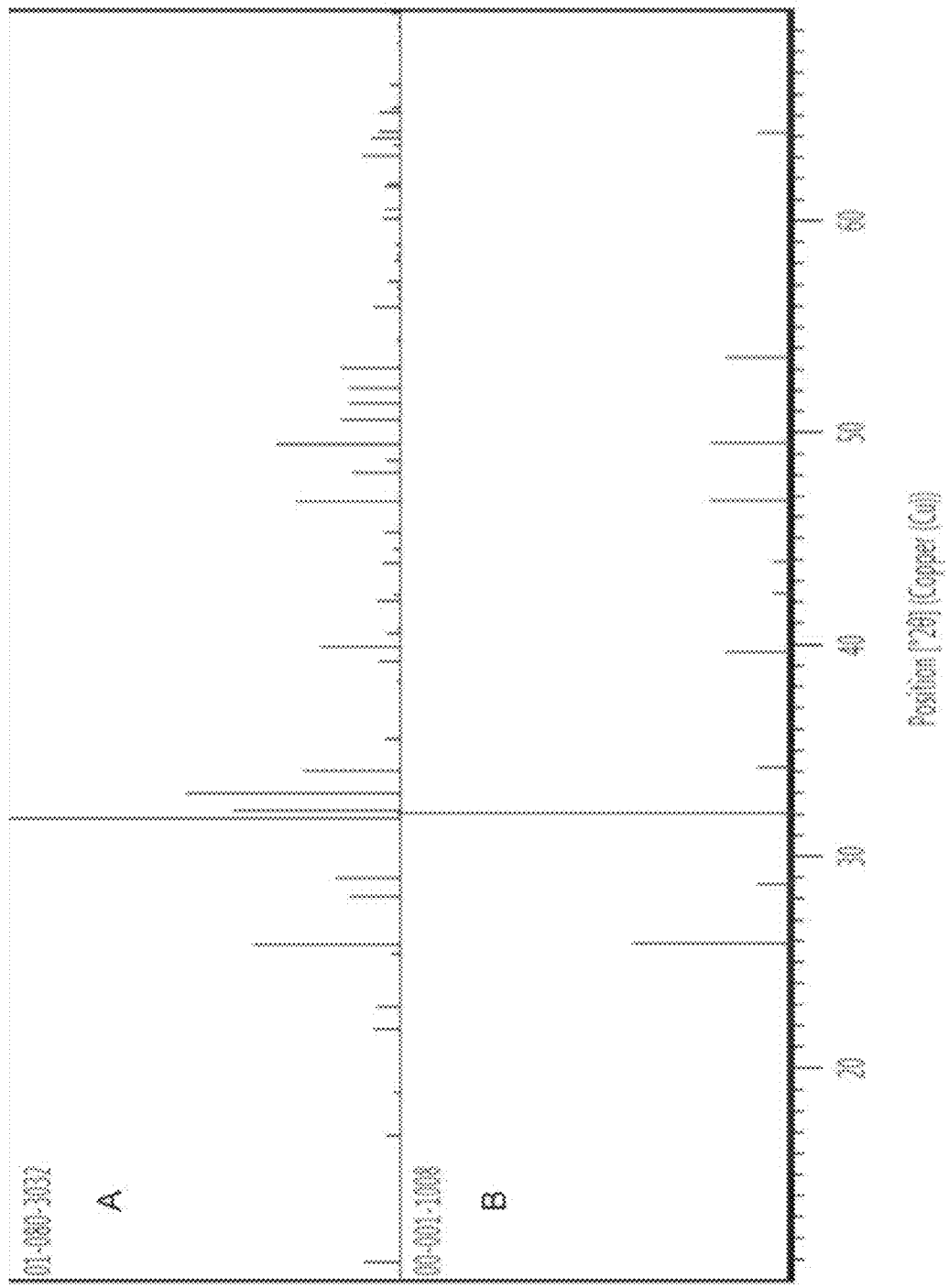
FIG. 11 illustrates in (A) FA pattern (JPDS pattern 01-080-3032), in (B) HA pattern (JPDS pattern 00-001-1008).
Figure 12:
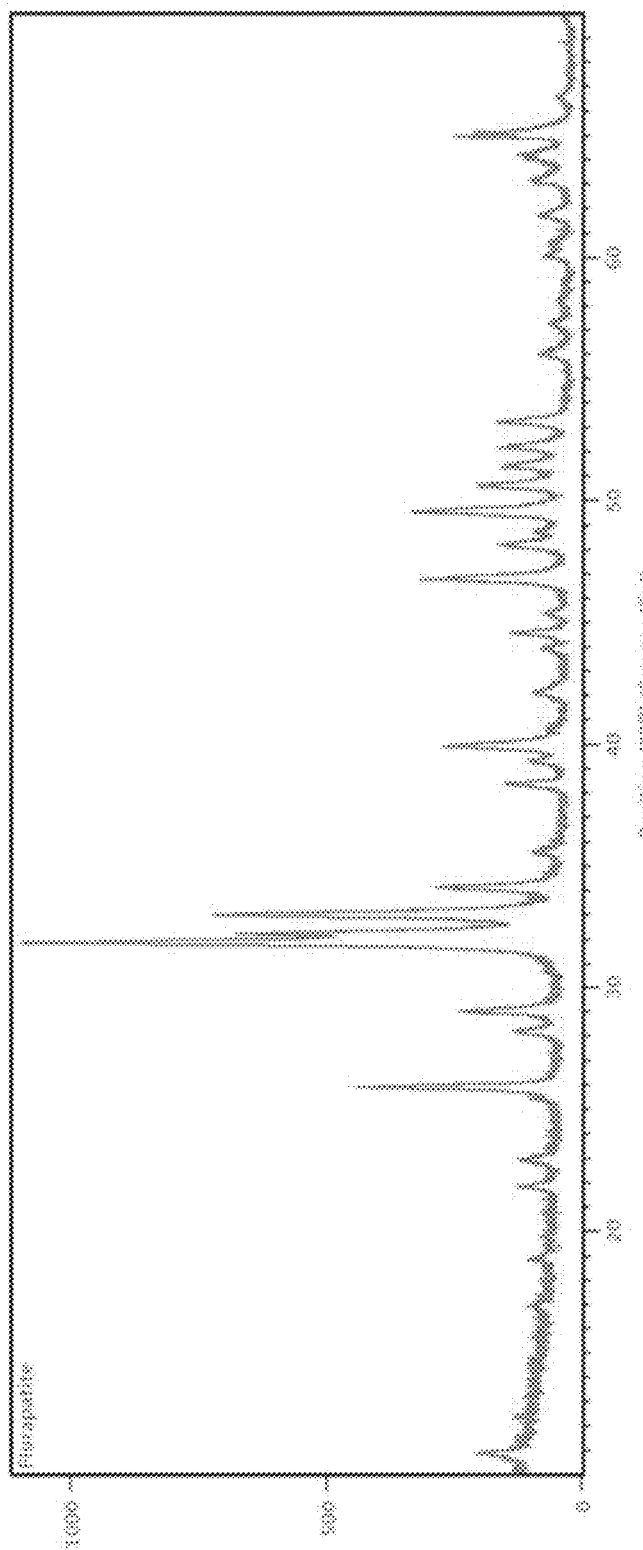
FIG. 12 illustrates XRD pattern of bovine fluorapatite (BFA.).

EDX analysis revealed that the Si content ranged from 0.8 — 1 wt % for the SiBHA sample. The [Ca]/[P] mole ratio for SiBHA varied between 1,63-1,74 when analysed using EDX whereas ICP-MS analysis showed that the [Ca]/[P] mole ratio was 1.70 which is slightly lower than the starting [Ca]/[P] mole ratio. Gibson et al also measured a similar value (1.72) for the [Ca]/[P] mole ratio when analysed using XRF analysis (Gibson, I. R., Best, S. M., Bonfield, W., 1999. *Chemical characterization of silicon-substituted hydroxyapatite*. J Biomed Mater Res 44, 422-428), However, both the BFA and SiBHA exhibited a slightly lower [Ca]/[P] mole ratio compared to BHA. This is mainly due to the dissociation of the carbonate groups which was further confirmed by the FTIR spectra (FIG. 7 and FIG. 9). Additionally, the results showed that toxic elements such as As, Cd and Pb were lower than the concentration limits suggested by ASTM standard. (F1185-03) for all the three different scaffolds. The following table 3 provides a comprehensive summary of the chemical composition and [Ca]/[P] ratio of each sample when analysed using ICP-MS analysis.

TABLE 3

Chemical composition of synthesized BHA, BFA and SiBHA determined by ICPMS and SEM-EDX analysis

| Element (mg/Kg) | BHA | BFA | SIBHA | Maximum limit (ASTM Standards] |
|---|---|---|---|---|
| Cd | <0.6 | <0.2 | <0.25 | 5 |
| Pb | 0.87 | <1.8 | <0.5 | 30 |
| As | — | — | <0.5 | |
| Mg | 7290 | 1430 | 2830 | |
| K | <620 | <316 | <250 | |
| Zn | <77 | 13.2 | 18.9 | |
| Sr | 498 | 295 | 281 | |
| Na | 4680 | 3030 | 3080 | |
| Si | NA | NA | 4340 | |
| Ca/P molar ratio ICP-MS | 1.74 | 1.72 | 1.70 | |
| Ca/P molar ratio (SEM-EDX) | 1.47-2.15 | 1.67-1.79 | 1.63-1.71 | |

EXAMPLE 2.4

Physical Characterization—X-Ray Diffraction

XRD diffractograms for each sample of the ion substituted hydroxyapatite of the present invention were matched with the diffraction patterns of pure hydroxyapatite (HA) (JPDS pattern 00-001-1008) and fluorapatite (FA) (JPDS pattern 01-080-3032) in the PANalytical)(Pert Highscore database.

EXAMPLE 2.4.1

Bovine Fluorapatite

Figure 13:
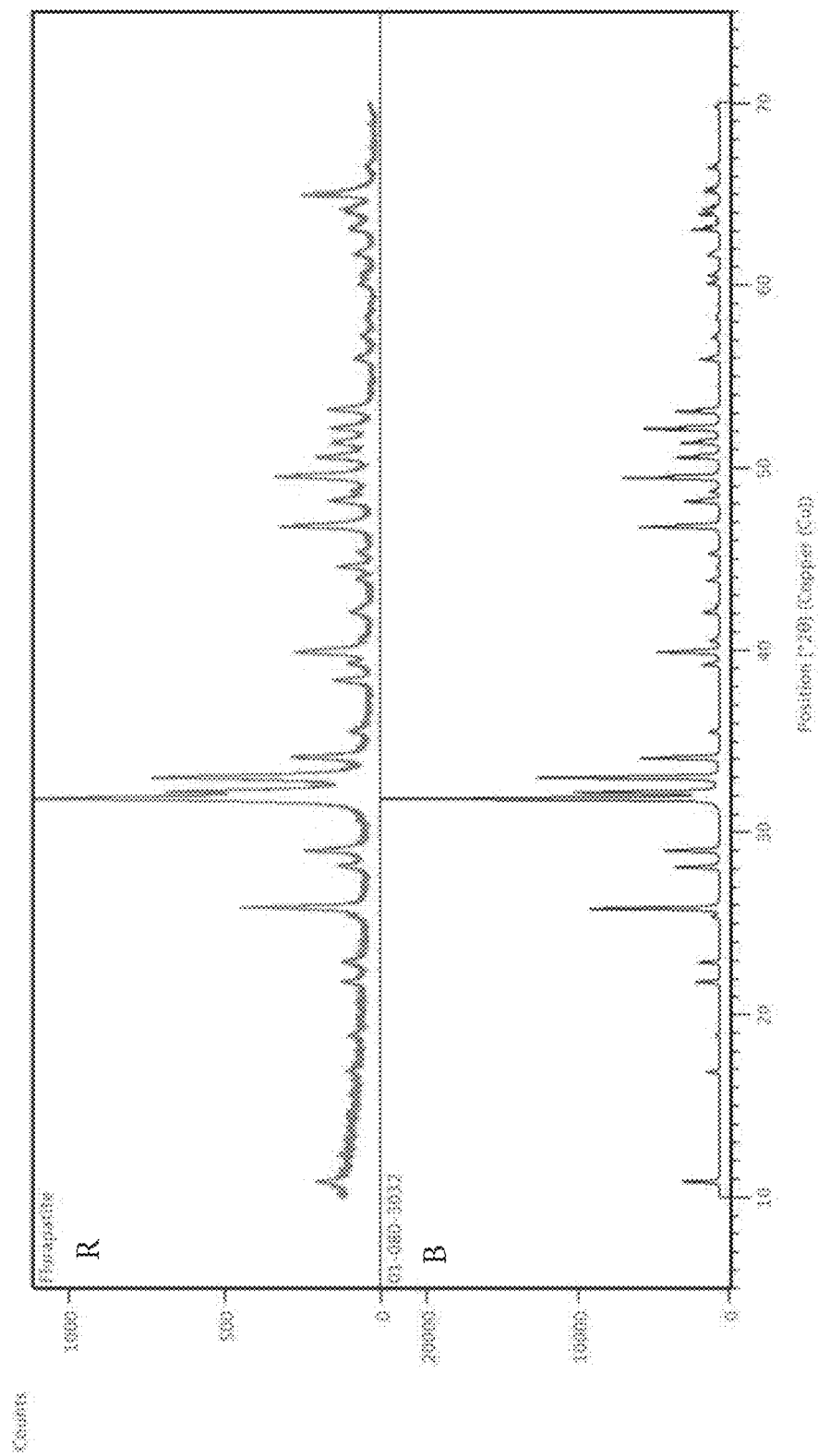
FIG. 13 illustrates Comparative X-Ray powder diffraction patterns for BFA (R) and FA (B) (JPDS pattern 01-080-303.

The XRD patterns for the BFA were consistent with pure FA XRD patterns (JPDS pattern 01-080-3032) (FIG. 13) and showed a well-defined crystallized structure. The preparation of the BFA scaffolds involved two heat treatment processes. After the two heat treatment processes, secondary phases such as beta-tricalcium phosphate (β-TCP) and CaO were not detected indicating the thermal stability and the phase purity of the prepared BFA scaffolds.

EXAMPLE 2.4.2

Silicon Substituted Bovine Hydroxyapatite

Figure 14:
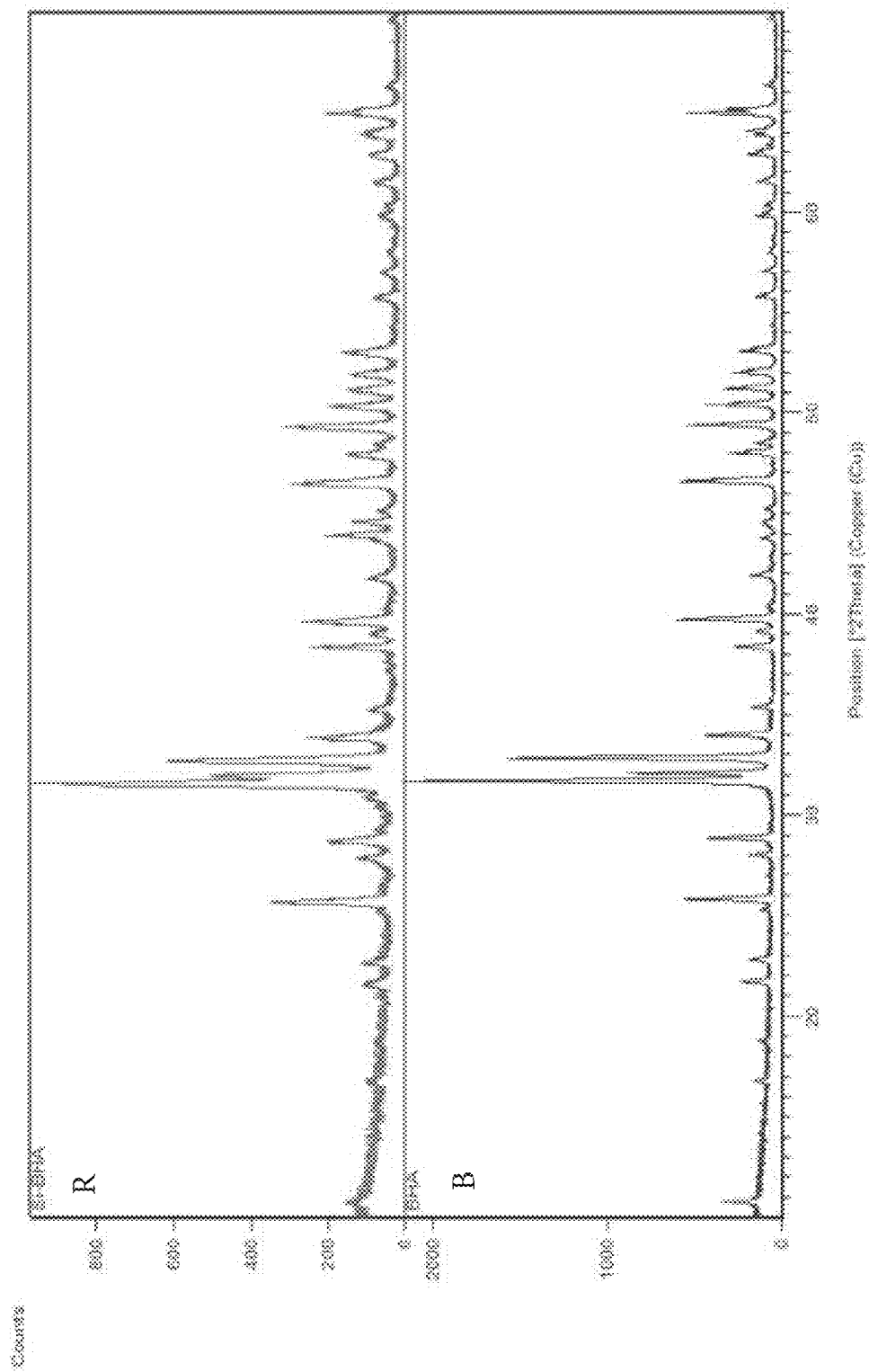
FIG. 14 illustrates Comparative X-Ray powder diffraction patterns for Si substituted hydroxyapatite (R) and bovine hydroxyapatite (B).
Figure 15:
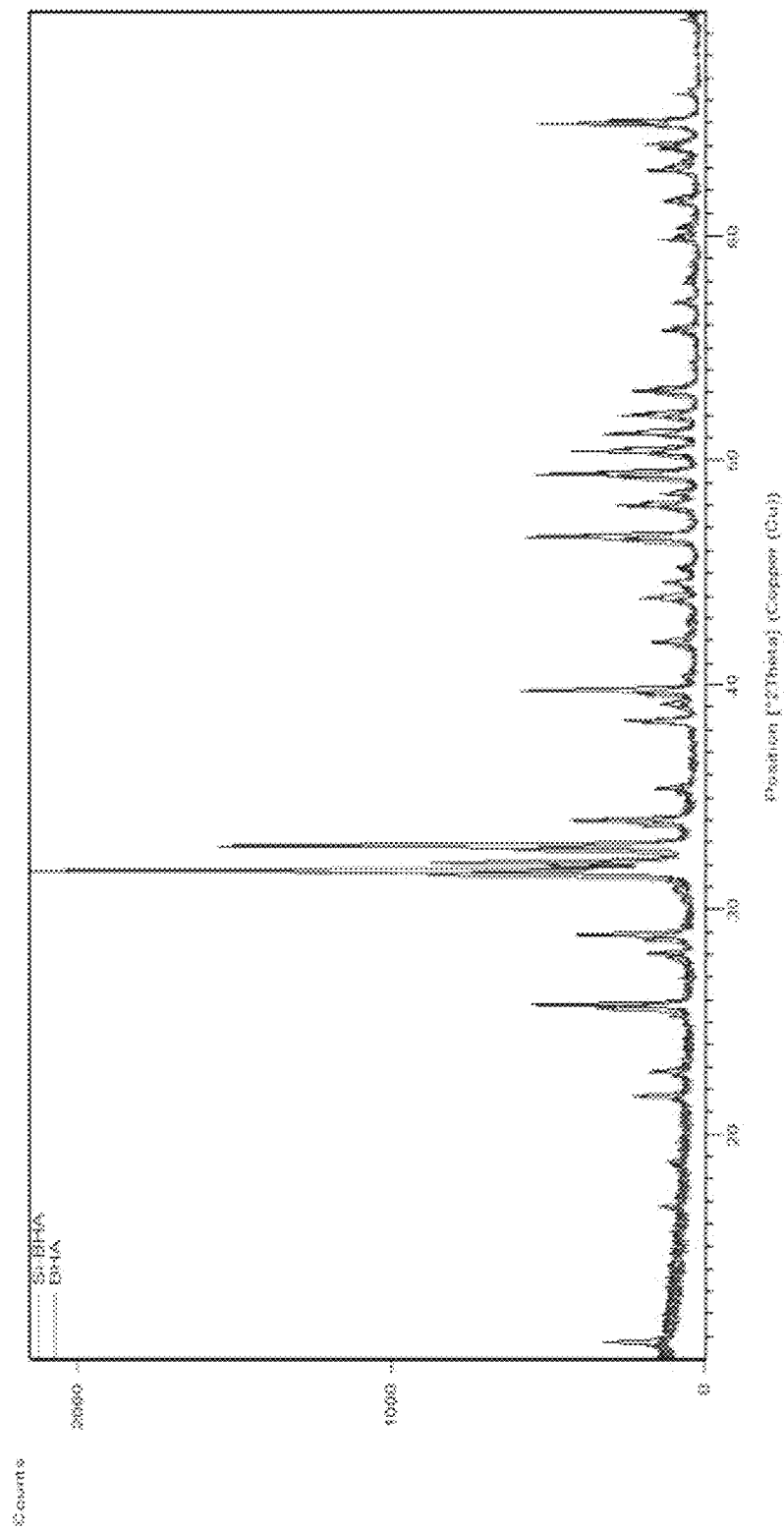
FIG. 15 illustrates Superimposed XRD patterns of BHA (blue) and SiBHA (red).
Figure 16:
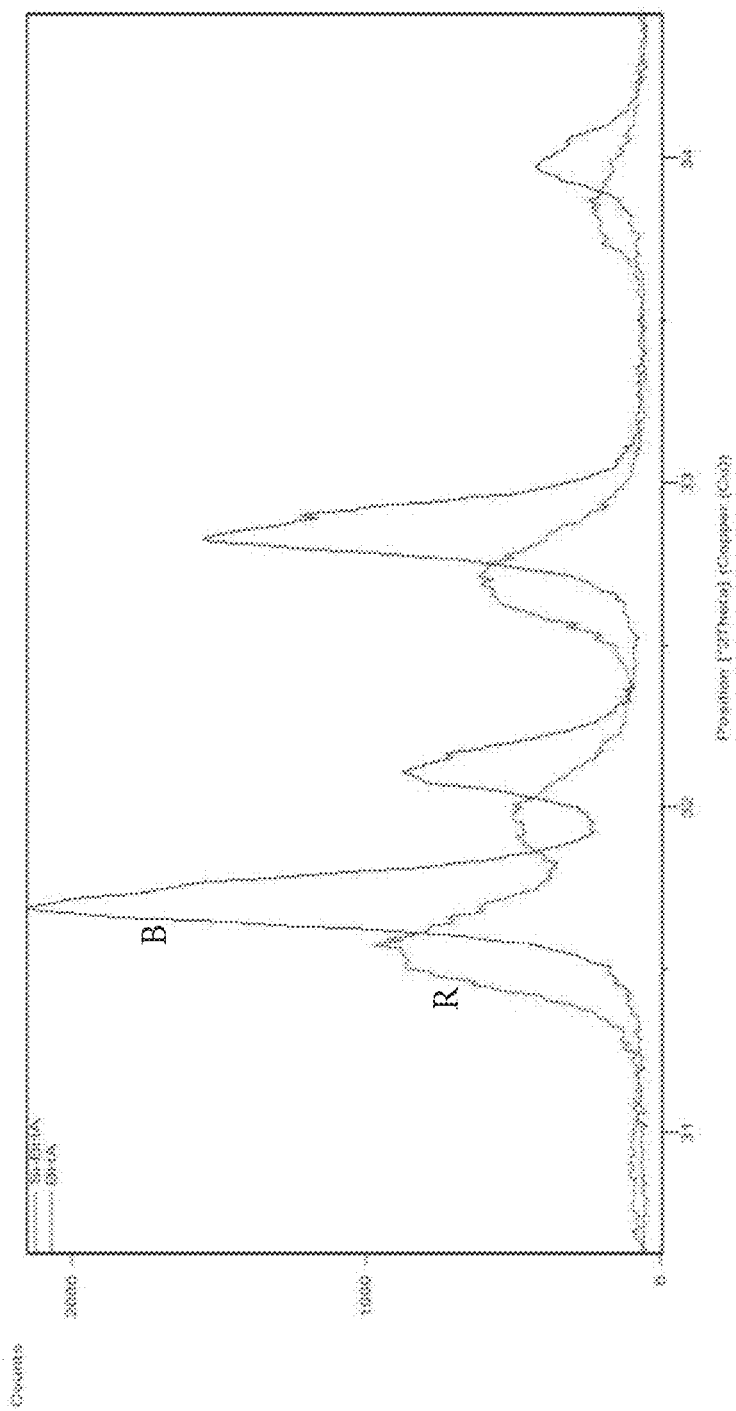
FIG. 16 illustrates Peak shift for SiBHA. SiBHA (R) and BHA (B).

The X-ray diffraction patterns for the SiBHA and BHA are shown in FIG. 14 and FIG. 15. The substitution of silicate ions into BHA did not affect the phase composition, as no secondary phases, such as tricalciurn phosphate (β-TCP), calcium oxide (CaO) and silicon oxide ($SiO_2$) were formed. Although the XRD patterns of SiBHA virtually corresponds to that of BHA, the diffraction peaks of SiBHA decreased in intensity and showed a broader spectrum (Aminian, A., Soiati-Hashjin, M., Samadikuchaksaraei, A., Bakhshi, F., Gojipour, F., Farzadi, A., Mortarzadeh, F., Schmücker, 2011. *Synthesis of silicon-substituted hydroxyapatite by a hydrothermal method th two different phosphorous sources*. Ceram. Int. 37, 1219-1229). In addition, the peaks of SiBHA showed a slight shift to a lower Bragg's angle compared to BHA, as shown in FIG. 16. These results indicated a loss in crystallinity for SiBHA in comparison to BHA. This mainly attributes to the substitution of a phosphate group ($PO_4^{3-}$) for a silicate group ($SiO_4^{4-}$) in the HA crystal structure. In addition, Si—O bonds (1.62 Å) have a greater length than P—O bonds (1.51 Å) and Si(IV) ions (0.042 nm) has a larger ionic radius than that of P(V) ions (0.035 nm) which causes a distortion in the phosphate tetrahedra in the HA lattice (Gibson, I. R., Best, S. M., Bonfield, W., 1999. *Chemical characterization of silicon-substituted hydroxyapatite*, J Biomed Mater Res 44, 422-428; Zou, S., Huang, J., Best, S., Bonfield, W., 2005. *Crystal imperfection studies of pure and silicon substituted hydroxyapatite using Raman and XRD*, in: Journal of Materials Science: Materials in Medicine. J Mater Sci Mater Med, pp. 1143-1148). These findings are in good agreement with data published by Thian et al, Tang et al and Botelho et al which suggest that silicate ions were incorporated into the HA lattice (Botelho, C. M., Lopes, M. A., Gibson, I. R., Best, S. M., Santos, J. D., 2002. *Structural analysis of Si-substituted hydroxyapatite: zeta potential and X-ray photoelectron spectroscopy*, J. Mater. Sci. Mater. Med. 13, 1123-1127.; Tang, X. L., Xiao, X. F., Liu, R. F., 2005. *Structural characterization of silicon-substituted hydroxyapatite synthesized by a hydrothermal method*. Mater, Lett. 59, 3841-3846.; Thian, E. S., Huang, J., Best, S. M., Barber, Z. H., Brooks, R. A., Rushton, N., Bonfield, W., 2006. *The response of osteoblasts to nanocrystalline silicon-substituted hydroxyapatite thin films*. Biomaterials 27, 2692-2698).

EXAMPLE 2.5

Scanning Electron Microscopy

Figure 17:
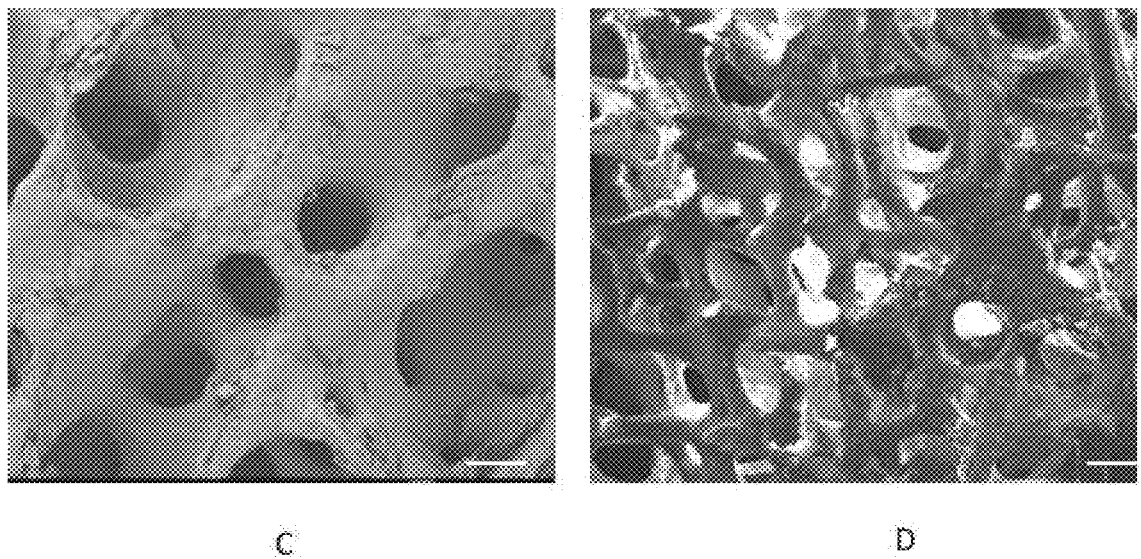
FIG. 17 illustrates Scanning electron micrograph of the BFA scaffold. (C) Outer surface (D) inner surface. Bar=100 μm.
Figure 18:
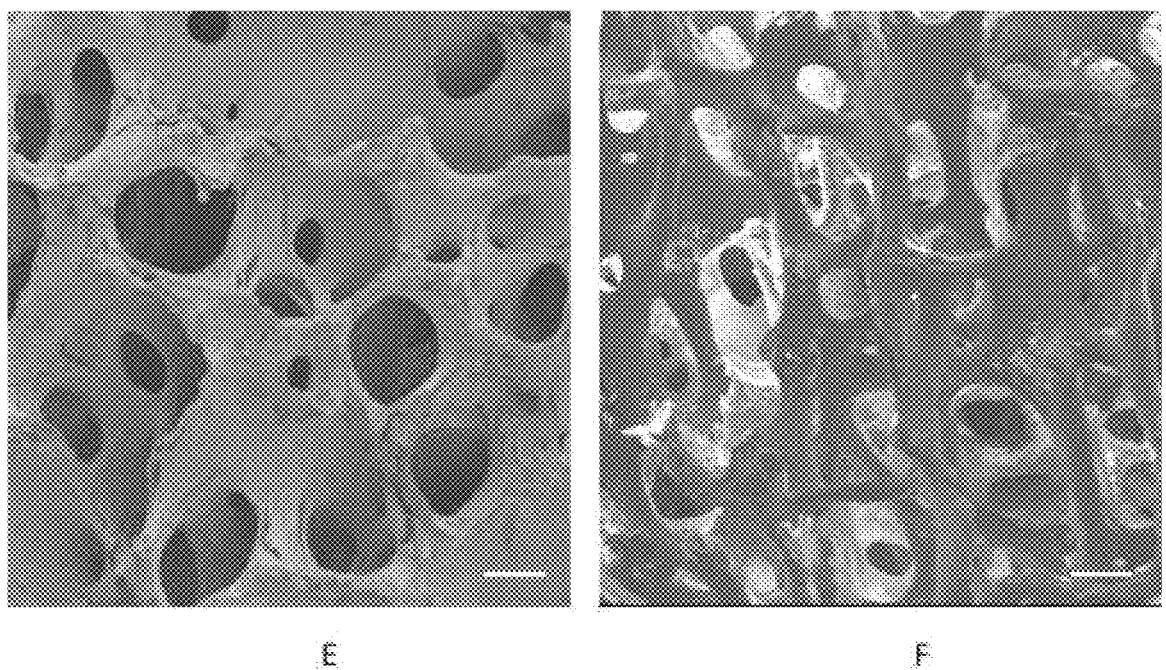
FIG. 18 illustrates Scanning electron micrograph of the SiBHA. scaffold, (E) Outer surface (F) inner surface. Bar=100 μm.

The SEM images (FIG. 17 to FIG. 18) was used to study the morphology and pore size of the RFA and SiBHA scaffolds.

SEM imaging confirmed a macroporous structure for both the BRA and SiBHA scaffolds with pores ranging in size from approximately ~200- 600μm which is well within the range (150 μm) required for optimum osteointegration. This porous structure is highly advantageous since it provides a substratum for increased angiogenesis and migration of osteogenic cells which is essential for bone formation through activities such as cell migration, cell proliferation, and cell differentiation. In contrast to the BHA scaffold, a smooth surface was not observed for the BFA and SiBHA scaffolds. This is mainly due to deposition of particles from the sol gel process.

EXAMPLE 2.6

Micro-CT analysis

Figure 19:
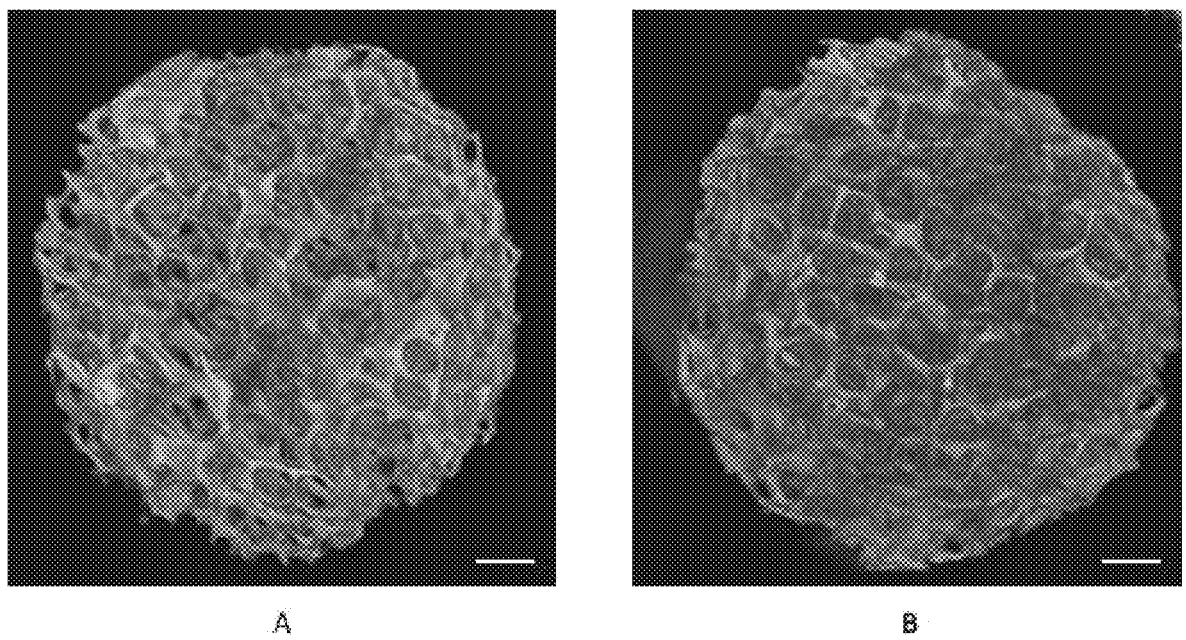
FIG. 19 illustrates 3D image of the BFA(A) and SiBHA (B) scaffold showing an interconnected porous architecture.

When analysed using the SkyScan software the total porosity for the BFA and SiBHA scaffold was 71.62%±1.28 and 70.54%±1,14 respectively. FIG. 19 shows the 3D structure of the BFA and SiBHA scaffold to be exhibiting an interconnected porous architecture.

Porosity is an important morphological feature for a scaffold as it plays a critical role in bone formation (facilitating migration, proliferation of osteoblasts enhancing vascularization) in-vivo and in-vitro. Additionally, a porous material improves mechanical interlocking between the implant and surrounding bone thus providing excellent mechanical stability (Karageorgiou, V., Kaplan, D., 2005. *Porosity of 3D biomaterial scaffolds and osteogenesis*. Biomaterials 26 5474-5491). Several studies have demonstrated that porosity is vital for bone regeneration. Kuboki et al showed that porous hydroxyapatite particles induced osteogenesis compared to solid particles when a rat ectopic model was used for BMP-2 delivery (Kuboki, Y., Takita, H., Kobayashi, D., Tsuruga, E., Inoue, M., Murata, M., Nagai, N., Dohi, Y., Ohgushi, H., 1998. *BMP-induced osteogenesis on the surface of hydroxyapatite with geometrically feasible and nonfeasible structures: Topology of osteogenesis*. J. Biomed. Mater. Res. 39, 190-199). In another study when porous HA cylinders were implanted into cancellous bone defects of New Zealand rabbits, the porosity of the HA implant enabled new bone in-growth through cell migration and penetration and therefore forming a strong bone with the periprosthetic bone (Damien, E., Hing, K., Saeed, S., Revell, P. A., 2003. *A preliminary study on the enhancement of the osteointegration of a novel synthetic hydroxyapatite scaffold in vivo*. J. Biomed. Mater. Res.—Part A 66, 241-246). The porosity result suggests that all the three scaffolds are suitable for bone tissue regeneration as human cancellous bone has a porosity of 70% or greater which allows the exchange of nutrients and waste. With respect to the SEM and μ-CT analysis incorporating fluoride and silicate ions through the sol gel process did not reduce the pore diameter and porosity of the BFA and SiBHA scaffolds.

EXAMPLE 2.7

Thermogravimetric Analysis

Figure 20:
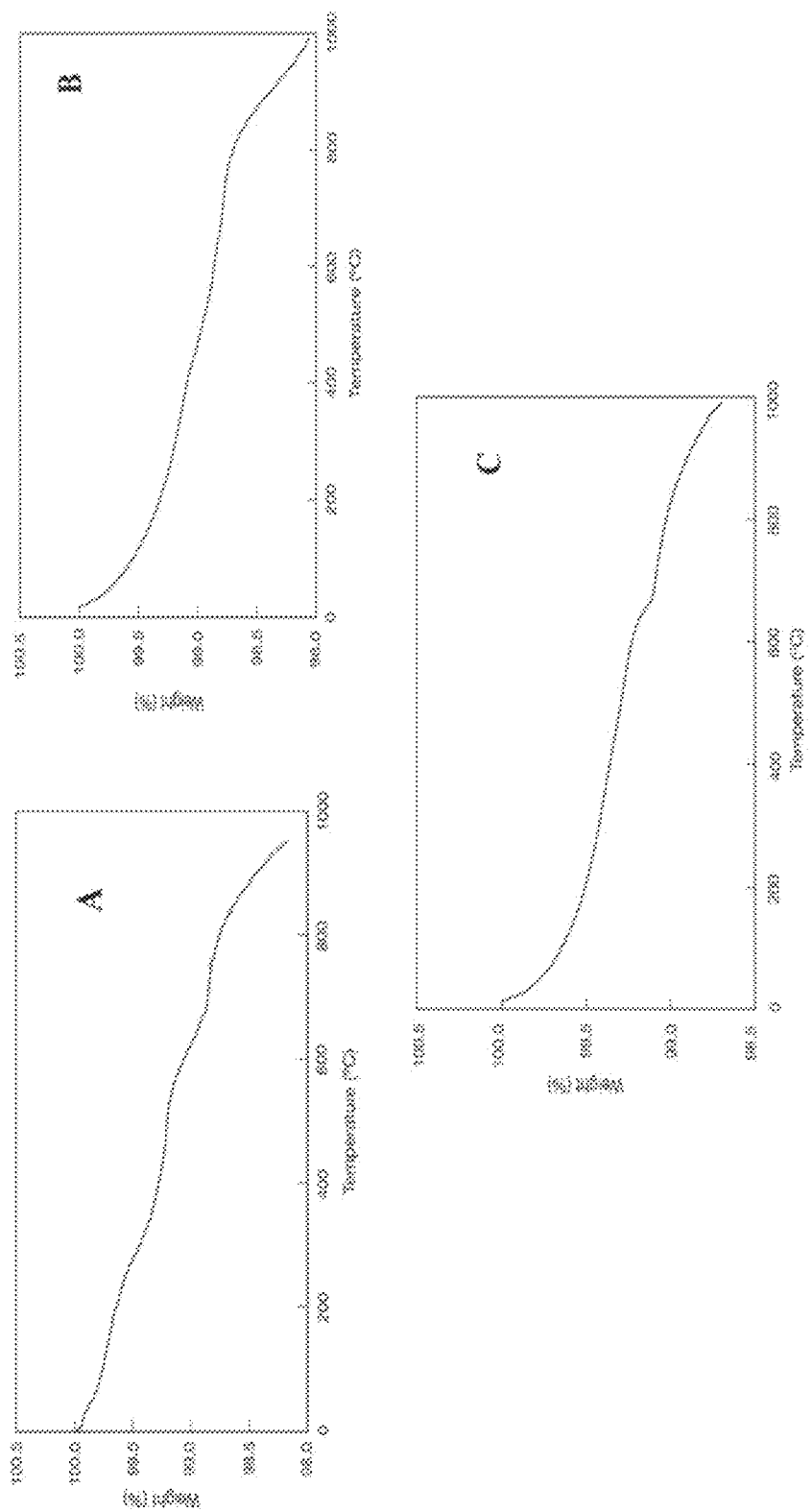
FIG. 20 illustrates Thermogravimetric trace of BHA(A), BFA(B) and SiBHA(C) showing the weight loss against temperature (0-1000° C.).

The thermal stability of the BFA and SiBHA were investigated (after the final sintering stage) by TGA. FIG. 20 shows a representative TGA trace of BHA, BFA and. SiBHA in terms of weight loss and temperature. The results from thermogravimetric analysis do not show a significant weight loss for BHA, indicating its thermal stability upon sintering. The initial weight loss (endothermic loss) from 50° C. to 200° C. corresponds mainly due to the evaporation of absorbed water. The weight loss that occurred between 250° C. and about 600° C. (exothermic loss) results due to the dissociation of trace carbonates (Saalfeld, U., Meenen, N. M., Jües, T. T., Saalfeld, H., 1994. *Solubility behaviour of synthetic hydroxyapatites in aqueous solution: Influence of*

*amorphous constituents on pH value*. Biomaterials 15, 905-908). A significant weight loss was not observed above 600° C. suggesting the thermal stability of BHA. The TGA curve for BEA. showed a similar pattern to that of BHA resulting only in a weight loss of 1.9 wt %. The initial weight loss (endothermic loss) from 50° C. to 200° C. is mainly due to the evaporation of absorbed water. The small weight loss (~0.3 wt %) that occurred between 250° C. and 600° C. (exothermic loss) results due to the thermal degradation of the remaining carbonate of BFA. However, BHA showed a slightly greater weight loss (~0.6 wt %) during this range. This was mainly because BHA had more carbonate groups intact. This is very clear from intensity of the FTIR spectra where the intensity of the carbonate groups for BFA was comparatively lower than that observed in the FTIR spectra of BHA (FIG. 7). A significant weight loss was not observed above 600° C. so confirming the thermal stability of BFA.

The TGA curve for SiBHA showed a similar pattern to that of BHA and BFA. The initial weight loss (endothermic loss) from 50° C. to 200° C. is mainly due to the evaporation of absorbed water. The small weight loss (~0.4 wt %) that occurred between 250° C. and 600° C. (exothermic loss) results due to the thermal decomposition of the remaining trace carbonates of SiBHA. As with the FTIR spectra of BFA, the FTIR spectra of SiBHA (FIG. 9) which showed that although the carbonate groups were intact the intensity of the carbonate peaks were considerably lower compared to that observed in BHA. This is mainly due to the fact that production of both BFA and SiBHA involved a second sintering stage at 600° C. during which more carbonate incorporated in the HA lattice might have decomposed. A significant weight loss was not observed above 600° C. suggesting the thermal stability upon sintering for SiBHA. Both BHA and BFA showed a weight loss of 1.8 wt % and 1.9% wt % respectively whereas SiBHA showed only a weight loss of 1.3 wt % which indicates that SiBHA has a thermal stability which is marginally greater than that of BHA.

EXAMPLE 2.8

Evaluation of the In Vitro Chemical Stability, Biodegradation and Mechanical Properties of Bovine Hydroxyapatite, Bovine Fluorapatite and Silicon Substituted Bovine Hydroxyapatite Section 1: Chemical Stability and Degradation Hydroxyapatite (HA) is known to be an excellent bioactive material which plays an important role in orthopaedics and dentistry. However, bioactive materials can stimulate an immune response in the surrounding tissues by complex mechanisms such as ion leaching and partial dissolution (Chen, Y., Miao, X., 2005. *Thermal and chemical stability of fluorohydroxyapatite ceramics with different fluorine contents*. Biomaterials 26, 1205-1210; Wong, L. H., Tio, B., Miao, X., 2002. *Functionally graded tricalcium phosphate; composites*, Mater. Sci. Eng. C 20, 111-115). In general, a scaffold should degrade with time as remnants could affect the mechanical properties of the reconstructed bone and may induce inflammation. Therefore, for clinical applications it is important to study the biostability and biodegradability of these materials in a realistic biological environment.

Materials & Methods

To assess the in-vitro chemical stability and degradation of the prepared scaffolds (BHA, BFA and SiBHA), simulated body fluid (SBF) solution was prepared according to the Kokubo protocol. The samples (n=3, size: 10 mm$^3$) were immersed in Falcon tubes containing 10 ml of SBF solution and were placed in an incubator at 37° C. for 1. 3. 5, 14, 21 and 28 days. After soaking the scaffolds, the pH value of the SBF solution at different time points was obtained by a pH meter. The pH of the SBF solution prior to soaking the scaffolds (day 0) was recorded as being 7.4. After different periods of immersion, the samples were withdrawn from the SBF solution, gently rinsed with distilled water and dried at 60° C. for 48 hours. The degradation of the scaffolds was measured by calculating the weight loss of each sample. The rate of weight loss was calculated over predetermined time intervals according to the following formula $$W_L = (W_0 - W_1)/W_0 \times 100\%$$

where $W_0$ and $W_1$ denote the weights of sample before and after immersion respectively. A Vernier calliper was used to measure the dimensions of the scaffold before and after immersion in SBF solution.

EXAMPLE 2.8.1

Bovine Fluorapatite (BFA)

Figure 21:
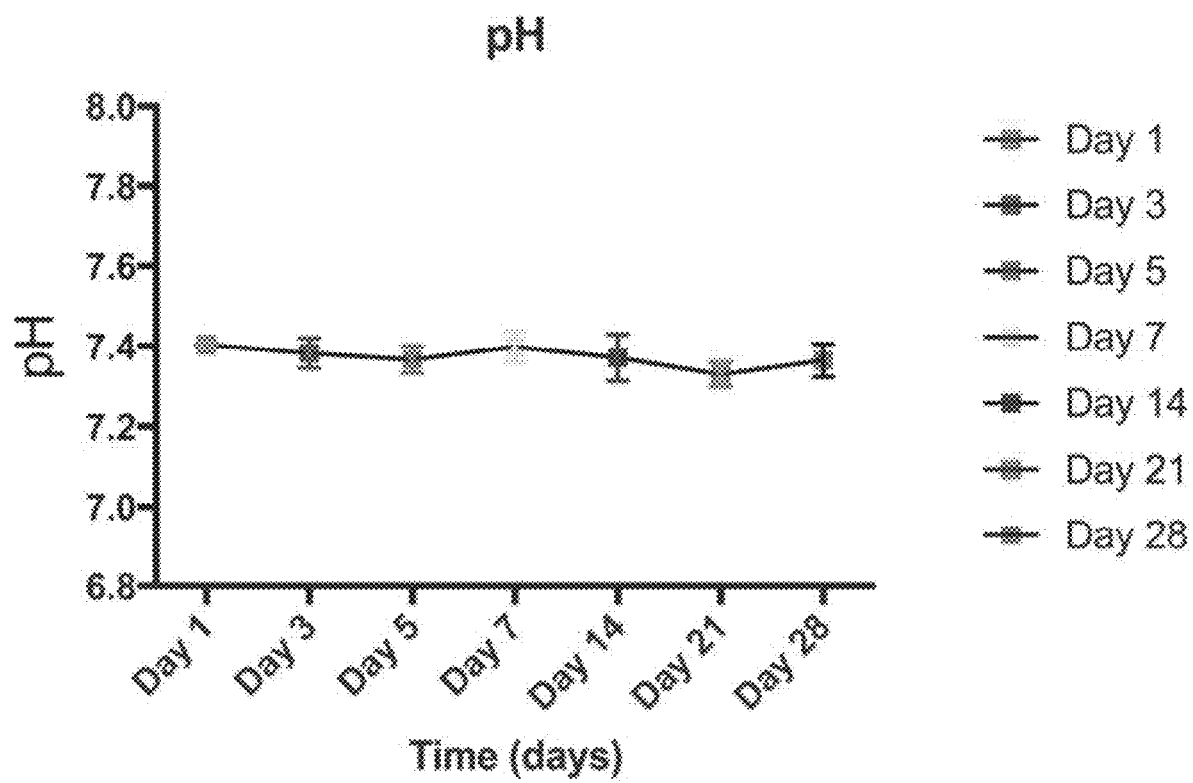
FIG. 21 illustrates Change in pH of SBF solution for each time point after immersing the BFA scaffolds (n=3).
Figure 22:
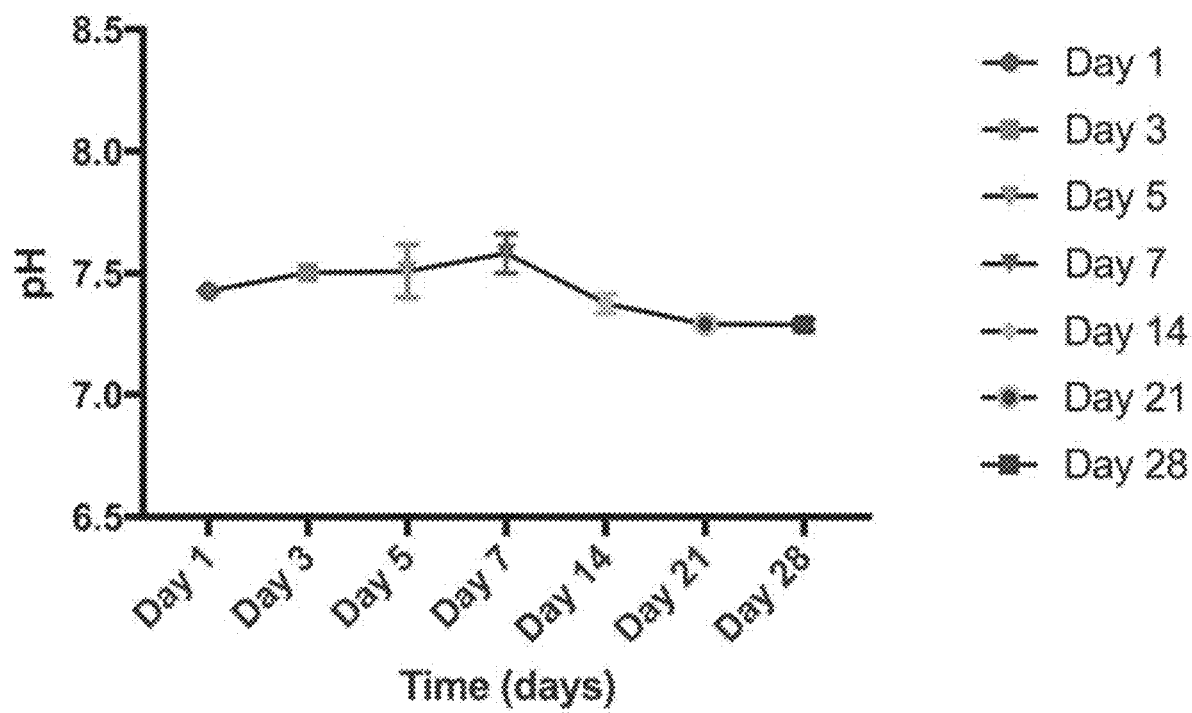
FIG. 22 Change in pH of SBF solution for each time point after immersing the SiBHA scaffolds (n=3).

FIG. 21 shows that for the BFA scaffolds, the pH of the SBF solution fluctuated between 7.3-7.4 for the 28-day incubation period. When analysed using a 1-way ANOVA with Tukey's multiple comparison test no statistically significant difference in pH was observed, thereby highlighting the chemical stability of the BFA scaffold (ANOVA, P=0.4126).

EXAMPLE 2.8.2

Silicon Substituted Bovine Hydroxyapatite (SiBHA)

The graphical representation of the change in the pH for the SiBHA showed a similar trend to that of BHA. Examination of FIG. 21 showed that there was a noticeable change in the pH value over the observed time period (28 days). The pH of the SBF solution increased up to day 7, reaching a value of 7.65. After 14 days the pH value dropped to 7.32 and remained consistent up to 28 days. When analysed using a one-way ANOVA with Tukey's multiple comparison test no statistically significant difference in pH over the 28-day period was found (ANOVA, P=0.2818).

The bovine derived FA scaffold (BFA) was more chemically stable than BHA. The pH value of the SBF solution which contained the BFA scaffolds fluctuated between 7.4-7.3 during the 28-day incubation period. Whereas, the pH value of the SBF solution which contained the BHA scaffolds exhibited a different fluctuation pattern. This is mainly due to the increased stability and consequent decreased solubility of the fluorapatite structure. Elliott et al stated that when a certain amount of fluoride ions (F-ion concentration higher than 50%) are substituted for the hydroxyl group in the hydroxyapatite lattice, the fluoride ions can remove the disorder of the crystal structure of HA. This is achieved by the alternating arrangement of fluoride ions between each pair of hydroxyl ions (Elliott, J. C., 1994. *Structure and Chemistry of the Apatites and Other Calcium Orthophosphates*, Studies in Inorganic Chemistry). BFA contained carbonate groups which increases the solubility in spite of which they possessed a low solubility when compared to BHA (Sogo, Y., Ito, A., Fukasawa, K., Sakurai, T., Ichinose, N., 2004. *Zinc containing hydroxyapatite ceramics to promote osteoblastic cell activity*. Mater. Sci. Technol, 20, 1079-1083). A study conducted by Bang et al found that silicon substituted carbonate hydroxyapatite is more soluble in-vivo than both HA and carbonate HA. Several studies have stated that substituting silicate ions into HA increases the solubility of HA, this arises due to the decrease in the structural order of HA and consequently resulting in ion release (Boanini, E., Gazzano, M., Bigi, A, 2010. *Ionic substitutions in calcium phosphates synthesized at low temperature*. Acta Biomater 6, 1882-1894; Bang, L. T., Long, B. D., Othman, R., 2014. *Carbonate Hydroxyapatite and Silicon-Substituted Carbonate Hydroxyapatite: Synthesis, Mechanical Properties, and Solubility Evaluations*. Sci. World J. 1-9). In addition, the crystallinity has a significant effect on the solubility of HA (Gibson, I. R., Best, S. M., Bonfield, W., 1999. *Chemical characterization of silicon-substituted hydroxyapatite*. J Biomed Mater Res 44, 422-428.; Veiderma., M., Tõnsuaadu, K., Knubovets, R., Peld, M., 2005. *Impact of anionic substitutions on apatite structure and properties*, Journal of Organometallic Chemistry. pp. 2638-2643). The XRD analysis showed a poor crystalline structure for SiBHA in contrast to BHA. A study conducted by Bang et al found that when synthetic silicon substituted carbonate hydroxyapatite samples were soaked in SBF solution for 7 days, there was an increase in the $Ca^{2+}$, silicate ions release and value of the SBF solution with soaking time (Bang, L. T., Long, B. D., Othman, R., 2014. *Carbonate Hydroxyapatite and Silicon-Substituted Carbonate Hydroxyapatite: Synthesis, Mechanical Properties, and Solubility Evaluations*. Sci. World J. 1-9). A similar result was observed in this study where the pH of the SBF solution reached a value of 7.65 by day 7. This is mainly due to the release of Ca230 and silicate ions which indicates the dissolution behaviour of the SiBHA scaffold (Bang, L. T., Long, B. D., Othman, R., 2014. *Carbonate Hydroxyapatite and Silicon-Substituted Carbonate Hydroxyapatite: Synthesis, Mechanical Properties, and Solubility Evaluations*, Sci. World J. 1-9). This is highly advantageous since initial dissolution of an implant material plays a critical role in enhancing their bond to the host bone (Gu, Y. W., Khor, K. A., Cheang, P., 2004. *Bone-like apatite layer formation on hydroxyapatite prepared by spark plasma sintering (SPS)*. Biomaterials 25, 4127-4134; Jyoti, M. A., Thai, V. V., Min, Y. K., Lee, B. T., Song, H. Y., 2010. *In vitro bioactivity and biocompatibility of calcium phosphate cements using Hydroxy-propyl-methyl-Cellulose (HPMC)* Appl. Surf. Sci. 257, 1533-1539).

EXAMPLE 3

Biodegradation

EXAMPLE 3.1

Bovine Fluorapatite

The BFA scaffold remained in its original shape (no change in the dimensions of the scaffold) after soaking in SBF solution for 28 days losing only ~2% from its original weight. According to the graph (FIG. 15), it is evident that the BFA scaffold did not exhibit a significant weight loss up to day 5 although after day 7 there was a significant increase in the weight loss (ANOVA, P<0.0001).

EXAMPLE 3.2

Silicon Substituted Bovine Hydroxyapatite

Figure 23:
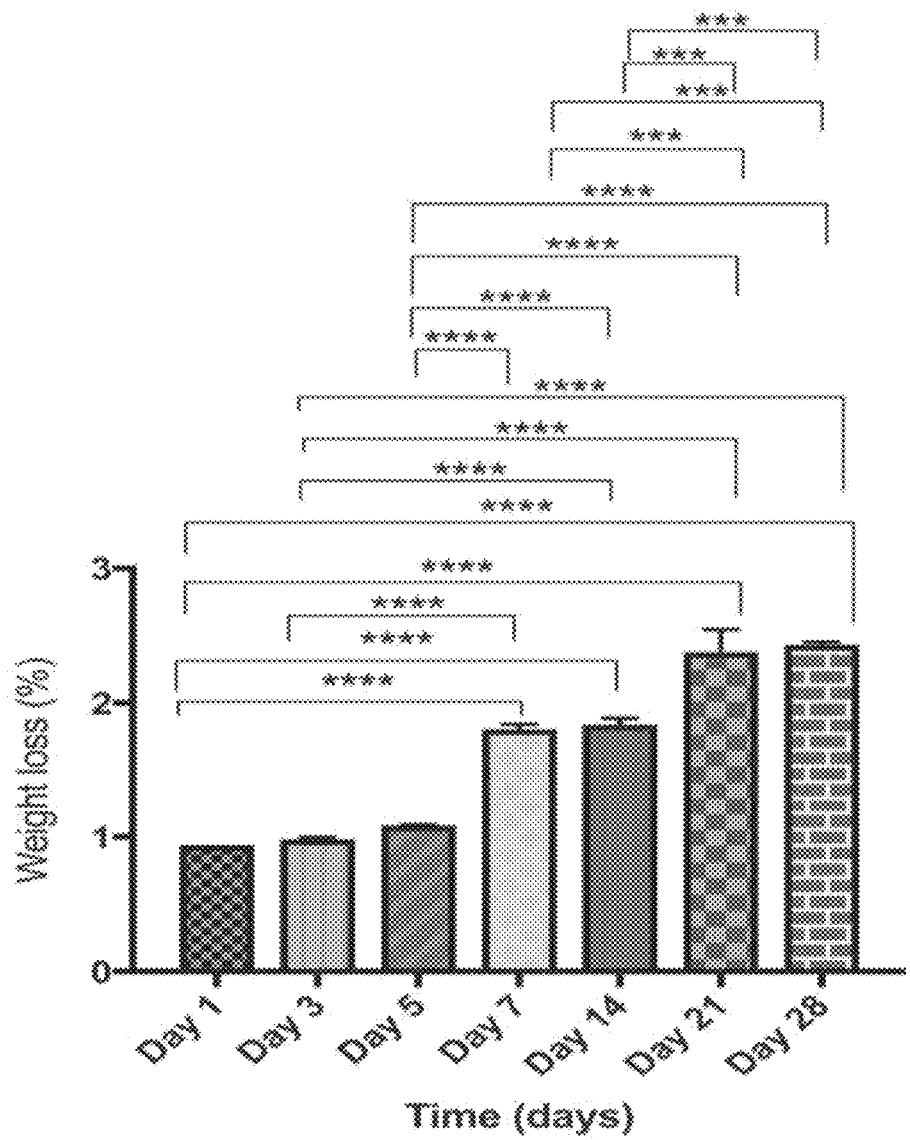
FIG. 23 illustrates the weight loss of the BFA scaffolds as a function of time in SBF solution.
Figure 24:
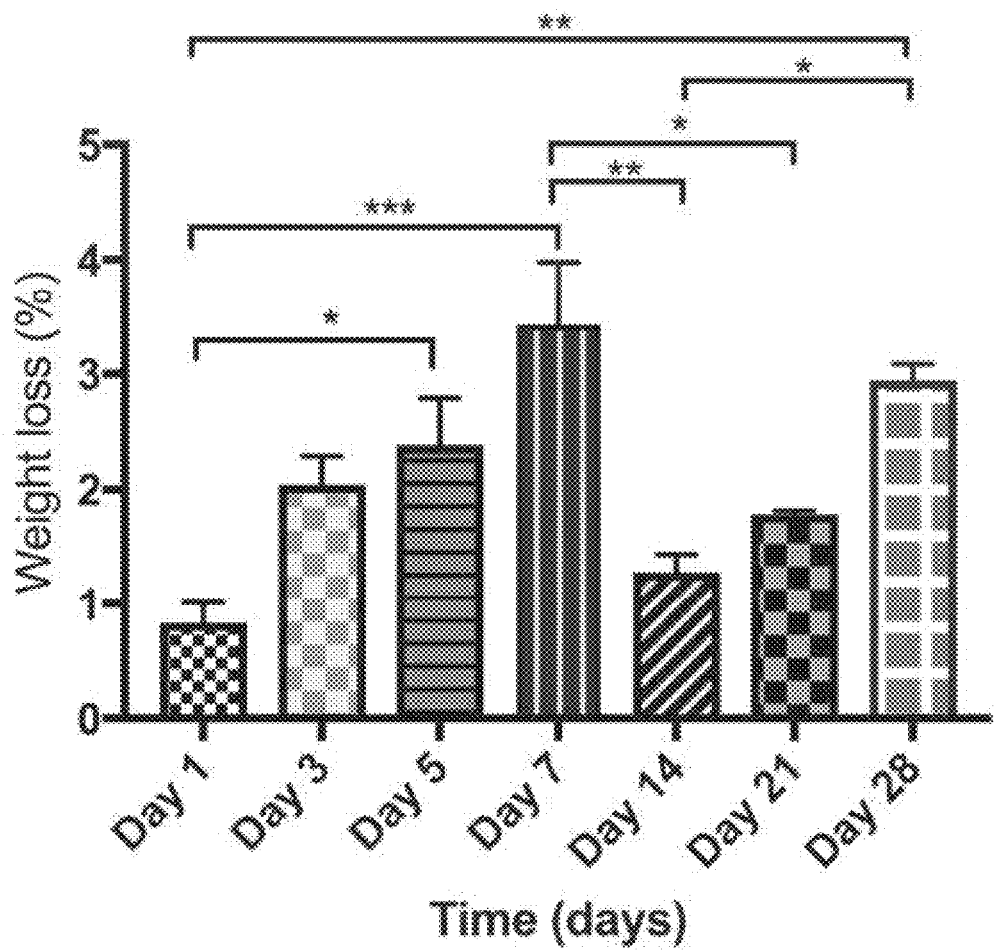
FIG. 24 illustrates the weight loss of the BHA scaffolds as a function of time in SBF solution.

The SiBHA scaffold retained its original shape change in the dimensions of the scaffold) and lost ~3% from its original weight after soaking in the SBF solution for 28 days, demonstrating its excellent structural stability. According to FIG. 23 it is clear that the weight loss increased significantly (ANOVA, P<0.001) up to day 7 and decreased significantly from day 7 to day 14 (ANOVA <0.01). However, after day 14, the weight loss increased gradually up to 28 days after soaking in SBF solution.

Biodegradation is essential for a biomaterial to determine its long-term biocompatibility. The degradation time of a bone scaffold should coincide with the remodelling process of the natural bone while maintaining its mechanical properties over that period. Once the scaffold is no longer needed, it should be able to get metabolized and removed from the body without leaving a trace.

The BFA scaffold retained its original shape in a macroscopic sense after soaking in SBF for 28 days, exhibiting a similar structural stability compared to the BHA scaffolds. According to the graph a significant weight loss was not observed for the first 5 days. This is mainly due to the highly-ordered structure which BFA possesses where the hydroxyl group is replaced with fluoride ions (FIG. 6). In addition, substituting fluoride ions decreases the solubility of the produced BFA due to the increase of crystallite size and increased crystallinity (Elliott, J. C., 1994 *Structure and Chemistry of the Apatites and Other Calcium Orthophosphates, Studies in Inorganic Chemistry*; Cheng, K., Han, G., Weng, W., Qu, H., Du, P., Shen, G., Yang, J., Ferreira, J. M. F., 2003. *Sol-gel derived hydroxyapatite films*. Mater. Res. Bull. 38, 89-97). Therefore, the leaching of Ca2+ and PO43− ions from the HA lattice is very limited. After day 7, there was an increase in the weight loss and the weight loss increased up to day 28 showing that the scaffold is degrading. There was a significant weight loss from day 1 up to day 28. This is highly advantageous since an ideal bone grafting scaffold should degrade with time at a controlled resorption rate creating space for new bone tissue to grow (Cheng, K., Han, G., Weng, W., Qu, H., Du, P., Shen, G., Yang, J., Ferreira, J. M. F., 2003. *Sol-gel derived fluoridated hydroxyapatite films*. Mater. Res. Bull. 38, 89-97).

The SiBHA scaffold was structurally stable during the 28-day incubation period. The initial weight loss up to day 7 attributed mainly due to the dissolution of the SiBHA scaffold where $Ca^{2+}$, $PO4^{3-}$ and silicate ions were released into the SBF solution. This is highly beneficial in in-vivo since these ions occupy the spaces between the implant (scaffold) and existing bone. These ions precipitates into carbonated HA and accelerates the incorporation of the implant into the existing bone. Porter et al also reported that incorporating silicon into HA increases the dissolution rate of HA (Porter, A. E., Patel, N., Skepper, J. N., Best, S. M., Bonfield, W., 2003, *Comparison of in vivo dissolution processes in hydroxyapatite and silicon-substituted hydroxyapatite bioceramics*. Biomaterials 24, 4609-4620). However, LeGeros et al stated that certain physical properties (higher porosity and interconnected porous network) and chemical properties (presence of carbonate and trace elements) would increase the extent of biodegradation of a scaffold (LeGeros; R. Z., 1990. *Calcium phosphates in oral biology and medicine*. Monogr. Oral Sci, 15, 1-201; LeGeros, R. Z., Kijowska, R., Jia, W., LeGeros, J. P., 1988. *Fluoride-cation interactions in the formation and stability of apatites*. J. Fluor. Chem. 41, 53-64. LeGeros, R. Z., Parsons, J. R., Daculsi, G., Driessens, F., Lee, D., Liu, S. T., Metsger, S., Peterson, D., Walker, M., 1988. *Significance of the Porosity and Physical Chemistry of Calcium Phosphate Ceramics Biodegradation-Bioresorption*. Ann. N. Y. Acad. Sci. 523, 268-271). This is highly advantageous as the tested BHA, BFA and SiBHA scaffolds contained trace amounts of Na+, M2+ and $Zn^{2+}$ and carbonate groups which would increase the extent of degradation of the scaffolds. In addition, all the scaffolds had an interconnected porous network with a porosity greater than 70%.

EXAMPLE 4

Mechanical Properties

The strength of a scaffold is highly influenced by the internal architecture. Porous ceramic scaffolds produced to date have exhibited an elastic modulus in the range of 10-30 MPa (Cordell, J. M., Vogl, M. L., Wagoner Johnson, A. J., 2009. *The influence of micropore size on the mechanical properties of bulk hydroxyapatite and hydroxyapatite scaffolds*. J. Mech. Behav. Biomed. Mater. 2, 560-570). When using a porous scaffold for bone tissue engineering, the scaffold must retain sufficient mechanical properties once implanted in host tissue and should possess a stiffness similar to the host bone. A stiffness mismatch could cause stress shielding and fatigue fracture under cyclic loading (Moore, W. R., Graves, S. E. 2001. *Synthetic bone graft substitutes*. ANZ J. Surg. 71, 354-361). In this study, we substituted fluoride and silicate ions into BHA to improve its mechanical properties.

The mechanical properties of the three scaffolds were measured using an Instron compression tester. The analysis of the scaffolds was carried out on cubic samples with dimensions of ~10 mm×~10 mm×~10 mm.

Results

Figure 25:
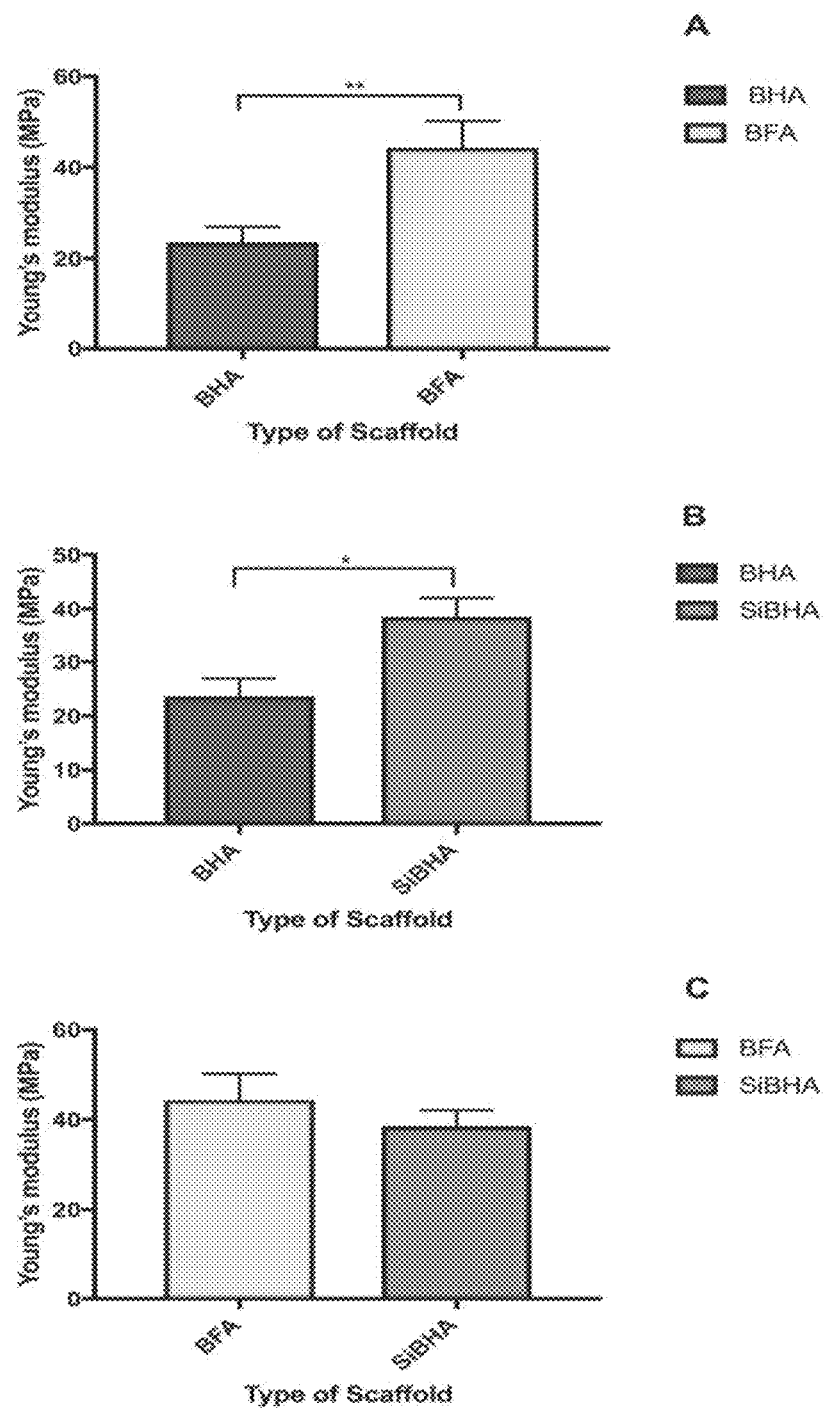
FIG. 25 illustrates Graphical representation of the Young's modulus (E) for each scaffold type.

As shown in FIG. 25:
A). Bovine hydroxyapitate (BHA) vs bovine fluorapatite (BFA), B) Bovine hydroxyapatite (BHA) vs silicon substituted bovine hydroxyapatite (SiBHA) and C) Bovine fluorapatite (BFA) vs silicon substituted bovine hydroxyapatite (SIBHA).
(n=15. Error bars represent±SE of the mean. * P<0.05, **P<0.01).

Figure 26:
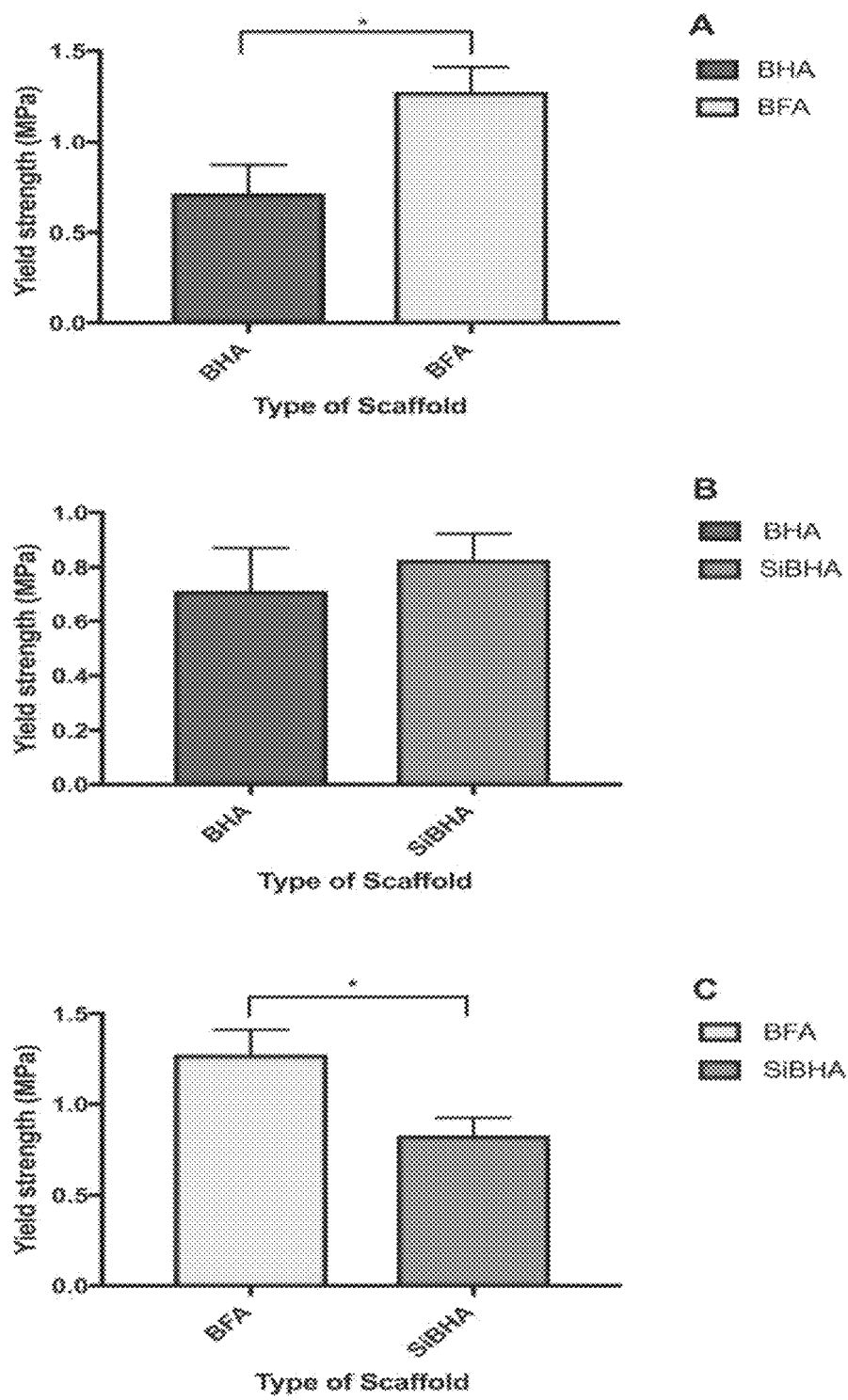
FIG. 26 illustrates the graphical representation of the yield strength for each scaffold type.

As shown in FIG. 26:
A). Bovine hydroxyapitate (BHA) vs bovine fluorapatite (BFA). B). Bovine hydroxyapatite (BHA) vs silicon substituted bovine hydroxyapatite (SiBHA) and C) Bovine fluorapatite (BFA) vs silicon substituted bovine hydroxyapatite (SIBHA).
(n=15, Bars represent mean±SEM, * P<0.05)

FIGS. 25 and 26 illustrates the mechanical properties of the three scaffold types. The BFA scaffold exhibited better mechanical properties (Young's modulus and yield strength) compared to the BHA and SiBHA scaffolds. There was a significant increase in the Young's modulus (t-test=0.0083) and yield strength (t-test=0.0229) for BFA when compared to BHA (FIGS. 26 and 26). A significant increase in the Young's modulus (t-test=0.0126) was observed for SiBHA scaffold when compared against BHA. Nevertheless, there was no significant difference in the yield strength between the two scaffolds. When the EWA and SiBHA scaffolds were analysed for the Young's modulus there was no significant difference. However, a significant increase in the yield strength was observed for the BFA. scaffold when compared against SiBHA (t-test=0.0232).

Bone is an anisotropic material and its properties depend mainly on its spatial architecture and composition (Cordell, J. M., Vogl, M. L., Wagoner Johnson, A. J., 2009. *The influence of micropore size on the mechanical properties of bulk hydroxyapatite and hydroxyapatite scaffolds*. J. Mech. Behav. Biomed. Mater. 2, 560-570; Orlovskii, V. P., Komlev, V. S., Barinov, S. M., 2002. *Hydroxyapatite and Hydroxyapatite-Based Ceramics*. Inorg. Mater. 38, 973-984). The scaffolds being tested are derived from the bovine femoral condyle portion and consists of cancellous bone. The organic matrix is completely removed through a variety of defatting and deproteinization steps, leaving behind the mineral portion intact. Although the resulting bone is strong, it has a brittle nature which limits its use as a xenograft in areas subjected to mechanical loading. The main hypothesis of this study is that the incorporation of fluoride and silicate ions would improve the mechanical properties of BHA.

The Young's modulus and yield strength for the BHA scaffold was obtained at 23.61 MPa and 0.71 MPa respectively. These values are higher than the values described in previous studies. According to the results the BEA and SiBHA scaffolds exhibited better mechanical properties than BHA. Moreover, the BFA scaffold showed a higher Young's modulus and yield strength compared to SiBHA (Table 4).

TABLE 4

Summary of the mechanical properties of the three scaffolds

| Material | Young's Modulus (MPa) | Yield strength (MPa) |
| --- | --- | --- |
| BHA | 23.61 | 0.71 |
| BFA | 44.42 | 1.275 |
| SiBHA | 38.51 | 0.827 |

The subcritical water extraction (SCWE) process used to remove majority of the collagen would have substantially reduced the mechanical properties of BHA. The SCWE process involved heating the bone cubes at a high temperature and pressure which resulted in a fragile structure. However, after sintering, the bone cubes became harder although the mechanical properties were significantly lower compared to BFA and BHA. The sol-gel process which was used to incorporate fluoride and silicate ions into BHA had a significant effect on improving the mechanical properties of BHA. The preparation of BEA and SiBHA involved a second a sintering stage. Heat treating the samples at a high temperature delivers high energy into the system which increases the crystallinity and the relative density of the sample, thus improving the mechanical properties (Tahmasebifar, A., Evis, Z., 2013. *Structural and mechanical characteristics of hydroxyapatite and tri-calcium phosphates doped with Al3+ and F-ions*. J. Ceram. Process, Res. 14, 549-556). It is well known that a highly porous scaffold has lower mechanical properties (elastic modulus, yield strength and fracture resistance) (Cordell, J. M., Vogl, M. L., Wagoner Johnson, A. J., 2009. *The influence of micropore size on the mechanical properties of hulk hydroxyapatite and hydroxyapatite scaffolds*. J. Mech. Behav. Biomed. Mater. 2, 560-570; Hing, K. A Best, S. M., Bonfield, W., 1999. *Characterization of porous hydroxyapatite*. J. Mater. Sci. Mater. Med. 10, 135-45). The sol-gel process reduced the pore size and porosity of resulting BFA and SiBHA scaffolds due to deposition of nanoparticles which was a decisive factor in improving the mechanical properties. The results for mechanical properties are in accordance with the porosity result where the BHA scaffold which had the highest porosity showing a lower Young's modulus and yield strength compared to BFA and SiBHA. This study clearly shows that the mechanical properties of BHA was improved by the incorporation of fluoride and silicate ions.

EXAMPLE 5

Biological Properties of Bovine Hydroxyapatite, Bovine Fluorapatite and Silicon Substituted Bovine Hydroxyapatite: An In Vitro Study The cellular behaviour of the bovine hydroxyapatite BHA fluoride substituted bovine hydroxyapatite (BFA) and silicon substituted bovine hydroxyapatite (SiBHA) scaffolds was evaluated by in vitro cell culture technique.

Cell Viability/Cytotoxicity Assay

Figure 27:
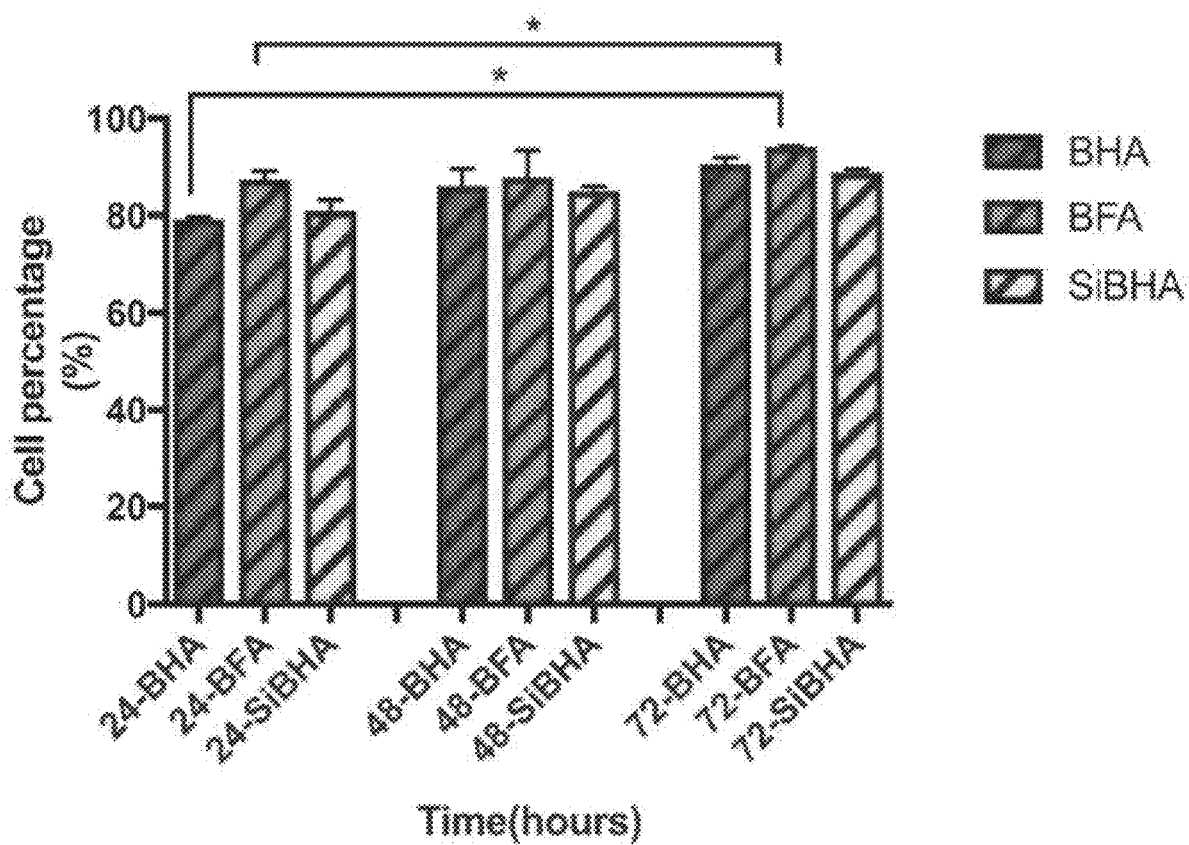
FIG. 27 illustrates the cell viability assay for 24 h, 48 h and 72 h after seeding Saos-2 cells onto the BHA, BFA and SiBHA scaffolds.

The cell viability of the three materials were assessed using the LIVE/DEAD cell cytotoxicity assay. The viability for Saos-2 cells cultured on the three types of scaffolds (BHA, BFA, SiBHA) at 24, 48 and 72 hours is presented in FIG. 27 (P=0.014). After 24 hours, a trend was identified in which all the three materials exhibited a similar viability, with a slightly increased viability measured for BFA. However, no significant differences were seen in Saos-2 cell viability between BHA, BRA and Si-BHA (FIG. 27).

After 48 hours, no significant differences were observed in Saos-2 cell viability between the three types of scaffolds. However, the cell viability for each material increased from 24 hours in which BFA exhibited the highest cell viability in comparison to the levels seen with BHA and SiBHA.

After 72 hours, there was a slight increase in the cell viability for all the three materials. A similar trend was observed as seen in 24 hours and 48 hours where BFA exhibited the highest cell viability followed by Si-BHA and BHA which showed the lowest cell viability among the three scaffolds. No statistically significant differences were observed for 72 hours between the three types of scaffolds.

Figure 28:
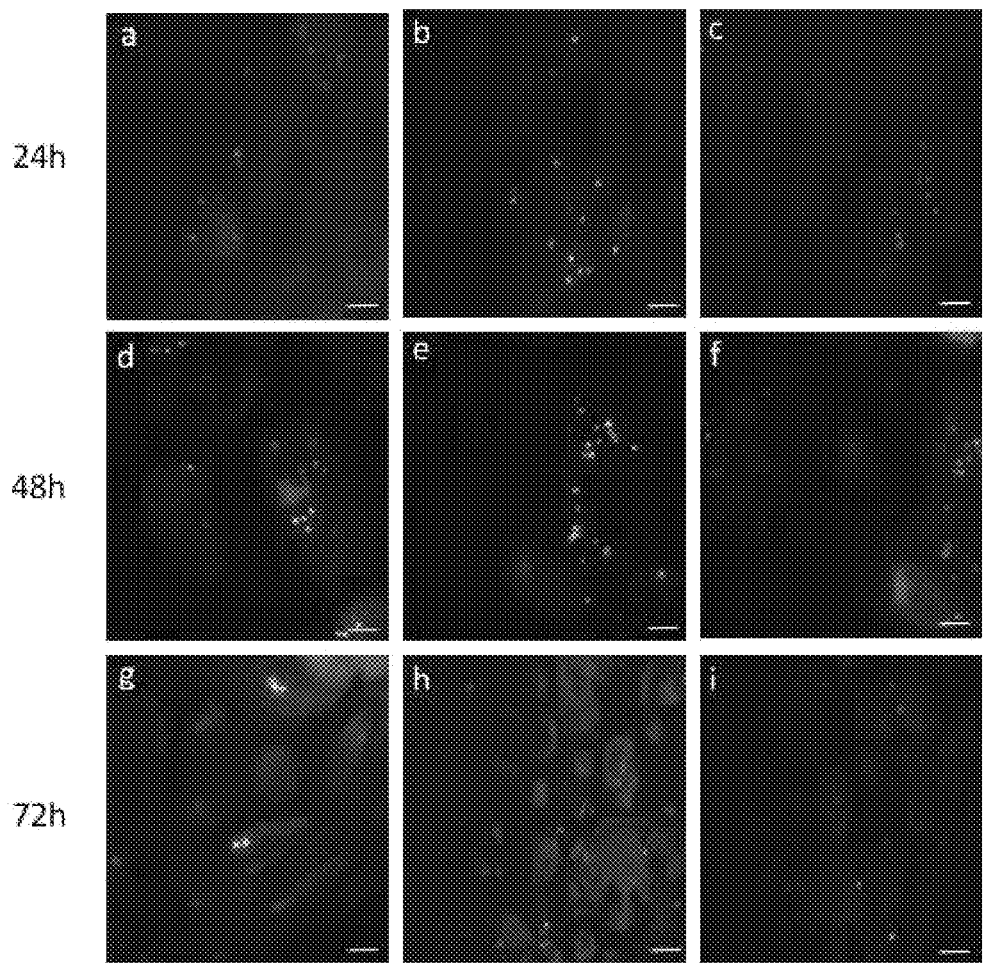
FIG. 28 illustrates Fluorescent images of the BFA scaffolds seeded with Saos-2 cells after undergoing the LIVE/DEAD viability assay after the desired time points.
Figure 29:
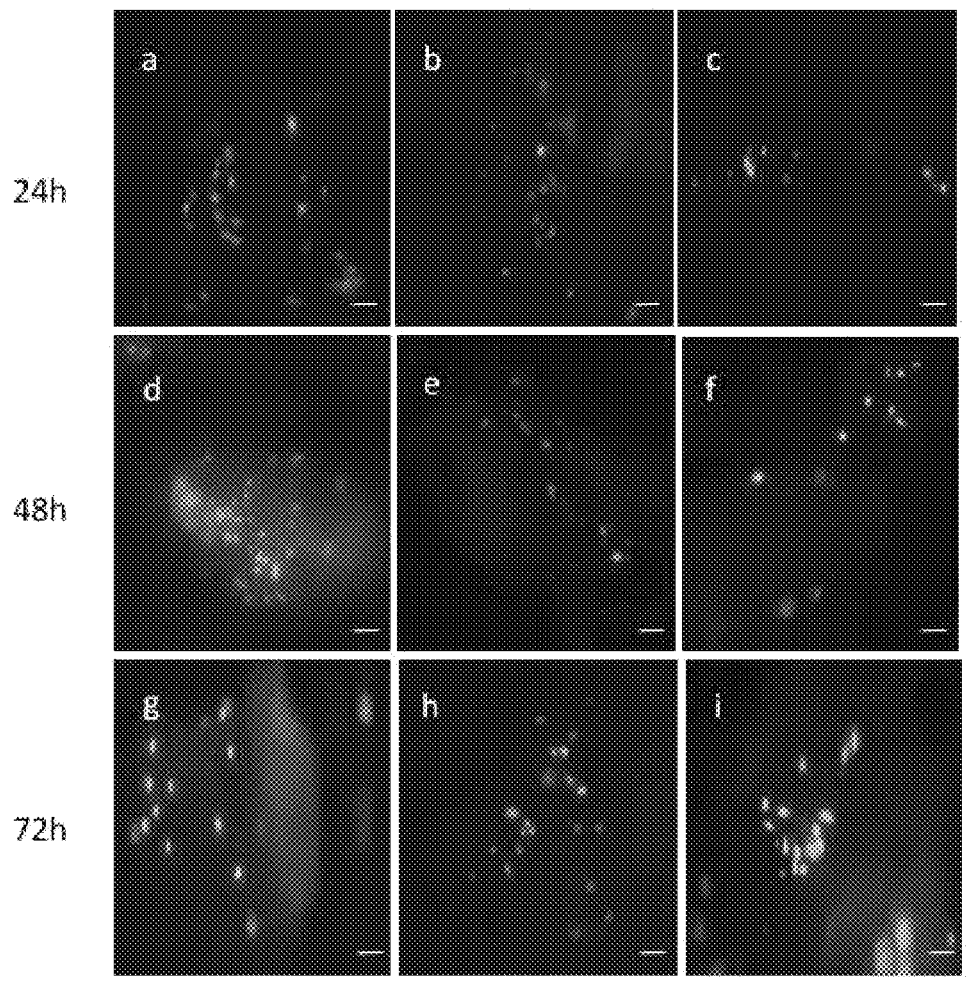
FIG. 29 illustrates Fluorescent images of the SiBHA scaffolds seeded with Saos-2 cells after undergoing the LIVE/DEAD viability assay after the desired time points.

Representative fluorescence images of Saos-2 cells cultured on the BFA and SiBHA materials for each time point are presented in FIGS. 28 and 29 respectively.

Cell Proliferation Assay

The cell proliferation of the BHA, BFA and SiBHA scaffolds were determined using the MTS assay. FIG. 30A shows that the cells proliferated on both the BHA and RFA scaffolds, and the number of cells increased with time. The BFA scaffold exhibited a higher cell number in comparison to the BHA scaffold at each time point (P=0.0013). At 24 h, 48 h and 72 h no significant difference was observed between the two types of scaffolds. Independent of scaffold type, there was a statistically significant increase in cell proliferation from 24 h to 72 h.

A significant increase in cell number was seen when the BHA was compared to the SiBHA from 24 h to 72 h (FIG. 30B). No significant differences were seen between the two scaffolds at 24 h, 48 h and 72 h (P=0.007).

At each of the periods tested the cellular proliferation values were high for BFA compared to SiBHA (FIG. 30C). However, no significant differences were seen between the BFA and SiBHA materials at 24 h, 48 h and 72 h (P=0.0004). Furthermore, there was a general trend that where the cell number for both the scaffolds increased significantly between 24 h and 72 h. These results indicate that the cells were able to proliferate on all three types of scaffolds.

Alkaline Phosphatase Activity

The ALP activity was measured using the ALP assay kit according to the manufacturer's guidelines. It was clear that the ALP activity increased with time for all three scaffolds. An increased ALP activity was observed for the BFA and SiBHA scaffolds compared to the BHA scaffolds (FIG. 31A and FIG. 3B). Moreover, the ALP expression was higher on the BFA scaffold in comparison to the SiBHA scaffold (FIG. 31C), although there was no significant increase in the ALP expression at each time point. These results clearly show that along with the BHA scaffold both the BFA and SiBHA scaffolds supported the differentiation of Saos-2 cells.

Immunohistochemical Analysis

Immunohistochemistry results showed that the BHA, BFA and SiBHA scaffolds were immunopositive for osteonectin (FIG. 32) and the Saos-2 cells expressed specific fluorescence reactions when grown on the surface of the three scaffolds after 14 days. Immunohistochemical analysis of osteonectin revealed a strong expression for this marker after 14 days (FIG. 32) which shows that differentiated Saos-2 cells continued to produce bone specific proteins on all three substrates (BHA, BFA and SiBHA) indicating in-vitro osteogenic differentiation.

Positive staining (green) for osteonectin was observed in Saos-2 cells at day 14 on the surface of the BHA, BFA and SiBHA scaffolds. Nuclear staining/DAPI staining (blue) of the Saos-2 cells, Bar=100 μm.

An ideal bone tissue-engineering scaffold should remain osteoconductive and degrade with time as native bone tissue forms at the detect site. Several in-vitro studies have shown that bovine derived porous hydroxyapatite (BHA) scaffolds provided a substrate for cell attachment (Mucalo, M. R., Worth, A. J., 2008. *Biomedicals from Bone*. Chem. New Zeal. 72, 13-18; Murugan, R., Ramakrishna, S., Panduranga Rao, K., 2006. *Nanoporous hydroxy-carbonate apatite scaffold made of natural bone*. Mater. Lett. 60, 2844-2847; Ooi, C. Y., Hamdi, M., Ramesh, S., 2007. *Properties of hydroxyapatite produced by annealing of bovine bone*. Ceram. Int. 33, 1171-1177). Krishnamurithy et al (Krishnamurithy, G., Murali, M. R., Hamdi, M., Abbas, A. A., Raghavendran, H. B., Kamarul, T., 2014. *Characterization of bovine-derived porous hydroxyapatite scaffold and its potential to support osteogenic differentiation of human bone marrow derived mesenchymal stem cells*, Ceram. Int. 40, 771-777) showed that a BHA scaffold promoted the attachment, proliferation and differentiation of human bone marrow mesenchymal stem cells (hBMSCs). However, no such studies have been conducted on fluoride and silicate substituted bovine hydroxyapatite.

The BFA scaffold showed the highest cell viability at each time point although the SiBHA and BHA scaffolds showed a viability greater than 80% which suggests that all the materials were non-toxic allowing the cells to adhere and proliferate. Furthermore, dead cells were present in low numbers. This indicated that cells increased in viability over the culture period. In addition, the cells which penetrated deeper into the core of the scaffolds were alive. This is important as cell infiltration and distribution within the scaffold would greatly affect the cell/scaffold attachment. These cells extend filipodia to reach the interior pores and strengthens the attachment between the cells and scaffold surface (Oliveira, J. M., Silva, S. S., Malafaya, P. B., Rodrigues, M. T., Kotobuki, N., Hirose, M., Gomes, M. E., Mano, J. F., Ohgushi, H., Reis, R. L., 2009. *Macroporous hydroxyapatite scaffolds for bone tissue engineering applications: Physicochemical characterization and assessment of bone marrow stromal cell viability*. J. Biomed. Mater. Res. Part A 91A, 175-186; Teixeira, S., Ferraz, M. P., Monteiro, F. J., 2008. *Biocompatibility of highly macroporous ceramic scaffolds: cell adhesion and morphology studies*. J. Mater. Sci. Mater. Med. 19, 855-859.].

Cell proliferation is one of the prerequisites for a 3D scaffold for bone tissue engineering (Oliveira et al., Teixeira et al., 2008). The MTS assay showed that the cell numbers gradually increased with culture time for all three types of scaffolds suggesting that the scaffolds were non-toxic allowing cells to adhere, migrate and proliferate. According to the MTS assay, cell numbers were high for both the BFA and SiBHA scaffolds in comparison to the BHA scaffold (FIG. 30). Furthermore, the BFA scaffold exhibited a high cell number compared to the SiBHA scaffold for 48 h and 72 h (FIG. 30C). From the results, substituting fluoride and silicate ions into BHA had a stimulatory effect on cell proliferation. Previous studies have shown that fluoride ions stimulate osteoblast activity with respect to cell differentiation and proliferation. This is evident by the in vitro studies conducted by several researchers who found that fluoride ions had a positive effect on stimulating cell proliferation when osteoblast cells were cultured on fluoride substituted hydroxyapatite discs (Farley, Wergedal, J., Baylink, D., 1983. *Fluoride directly stimulates proliferation and alkaline phosphatase activity of bone-forming cells*. Science (80). 222, 330-332; Kim, H. W., Kim, H. E., Knowles, J. C., 2004a. *Fluor-hydroxyapatite sol-gel coating on titanium substrate for hard tissue implants*. Biomaterials 25, 3351-3358). On the other hand, silicate substitutions increase solubility of HA due to the release of silicate ions. Therefore, it has a direct link on increasing its bioactivity. Both Gibson et al and Kim et al showed that osteoblast like cell activity was significantly enhanced on silicon substituted hydroxyapatite (Si-HA) when compared against synthetic HA (Gibson et al., 1999; Kim et al., 2003). In addition, the morphology of the scaffold is another crucial parameter for estimating the biological effect. The interconnected porous structure of the resulting scaffolds increases the surface area providing a substratum for migration of osteogenic cells which is essential for bone formation through activities such as cell migration, proliferation, and differentiation. These results are in concordance with the LIVE/DEAD assay where both the BFA and SiBHA showed a greater cell viability compared to BHA.

It was clear that the ALP activity increased with time for all three scaffolds. An increased ALP activity was observed for the BFA and SiBHA scaffolds compared to the BHA scaffolds (FIG. 31A and 31B). Moreover, the ALP expression was higher on the BFA scaffold in comparison to the SiBHA scaffold (FIG. 31C), although there was no significant increase in the ALP expression at each time point. These results clearly show that along with the BHA scaffold both the BFA and SiBHA scaffolds supported the differentiation of Saos-2 cells. It is likely that porosity of the three scaffolds contributed to the osteoblast response. The porosity of a material has a vital role in facilitating formation of cell clusters (cell aggregation) which is an important event leading to cell differentiation and the mineralization process (Gao, Y., Cao, W.-L., Wang, X.-Y., Gong, Y.-D., Tian, J.-M., Zhao, N.-M., Zhang, X.-F., 2006. *Characterization and osteoblast-like cell compatibility of porous scaffolds: bovine hydroxyapatite and novel hydroxyapatite artificial bone*. J. Mater. Sci. Mater. Med. 17, 815-823). However, several studies have proven that compositional factors of the material play a critical role on the differentiation of osteoblasts and in vitro studies have reported elevated. ALP activity and greater cell proliferation for BHA when compared to synthetic HA (Chen, Y., Huang, Z., Li, X., Li, S., Zhou, Z., Zhang, Y., Feng, Q. L., Yu, B., 2012. *In Vitro Biocompatibility and Osteoblast Differentiation of an Injectable Chitosan Nano-Hydroxyapatite/Collagen Scaffold*. J. Nanomater. 2012, 1-6; Krishnamurithy, G., Murali, M. R., Hamdi, M., Abbas, A. A., Raghavendran, H. B., Kamarul, T., 2014. *Characterization of bovine-derived porous hydroxyapatite scaffold and its potential to support osteogenic differentiation of human bone marrow derived mesenchymal stem cells*, Ceram. Int. 40, 771-777; Mauney, J. R., Jaquiéry, C., Volloch, V., Heberer, M., Martin, I., Kaplan, D. L., 2005. *In vitro and in vivo evaluation of differentially demineralized cancellous bone scaffolds combined with human bone marrow stromal cells for tissue engineering*. Biomaterials; Teixeira, S., Ferraz, M. P., Monteiro, F. J., 2008. *Biocompatibility of highly macroporous ceramic scaffolds: cell adhesion and morphology studies*. J. Mater. Sci. Mater. Med. 19, 855-859). This is mainly due to the fact that bovine hydroxyapatite (BHA) has a chemical composition similar to that of human bone with trace amounts of carbonate ($CO_3^{2-}$), sodium ($Na^+$), magnesium ($Mg^{2+}$), iron ($Fe^{2+}$) and chloride ($Cl^-$) which influences various biomechanical reactions linked with bone metabolism and osteointegration (Akram, M., Ahmed, Shakir, I., Ibrahim, W. A. W., Hussain, R., 2014. *Extracting hydroxyapatite and its precursors from natural resources*. J. Mater. Sci. 49, 1461-1475; Mucalo, M. R., Worth, A. J., 2008. Biomedicals from Bone. Chem. New Zeal. 72, 13-18). Fluoride ions stimulates osteoblast activity with respect to cell differentiation and proliferation. This was evident by the in-vitro studies conducted by Farley et al who observed an increased ALP activity on bone cells. Some researchers reported that incorporating fluoride ions into synthetic HA had a significant effect on the ALP level of osteoblastic cells (Chen, Y., Miao, X 2005. *Thermal and chemical stability of fluorohydroxyapatite ceramics with different fluorine contents*. Biomaterials 26, 1205-1210; Kim, H. W., Kim, H. E., Knowles, J. C., 2004a. *Fluor-hydroxyapatite sol-coating on titanium substrate for hard tissue implants*. Biomaterials 25, 3351-3358). Silicate ions accelerates the bone mineralisation process and recent in-vitro studies conducted by Reffitt et al, showed that physiological levels of Si (10-20 μm) in the form of orthosilic acid stimulated collagen I synthesis and enhanced osteoblastic cell differentiation in human osteoblast like cells (Reffitt, D. M., Ogston, N., Jugdaohsingh, R., Cheung, H. F., Evans, B. A., Thompson, R. P., Powell, J. J., Hampson, G. N., 2003. *Orthosilicic acid stimulates collagen type I synthesis and osteoblastic differentiation in human osteoblast-like cells in vitro*. Bone 32, 127-135). A study conducted by Botelho et al found that substituting 0.8 wt % silicate in HA resulted in a higher cell number and ALP production (Botelho, C. M., Lopes, M. A., Gibson, I. R., Best, S. M., Santos, J. D., 2002. *Structural analysis of Si-substituted hydroxyapatite: zeta potential and X-ray photoelectron spectroscopy*. J. Mater. Sci. Mater. Med. 13, 1123-1127). These findings are consistent with our results which showed an elevated ALP activity for BFA followed by SiBHA and BHA.

Osteonectin is a specific bone marker exclusively associated with the mineralization stage of bone formation (Calabrese, (1, Giuffrida, Raffaella, Fabbi, C., Figallo, E., Lo Furno, D., Gulino, R., Colarossi, C., Fullone, F., Giuffrida, Rosario, Parenti, R., Memeo, L., Forte, S., 2016. *Collagen-Hydroxyapatite Scaffolds Induce Human Adipose Derived Stem Cells Osteogenic Differentiation In Vitro*. PLoS One 11, e0151181). Immunohistochemical analysis of osteonectin revealed a strong expression for this marker after 14 days (FIG. 32) which shows that differentiated Saos-2 cells continued to produce bone specific proteins on all three substrates (BHA, BFA and SiBHA) indicating in-vitro osteogenic differentiation. Previous studies have reported that the osteo-inductive factors added to the growth medium supported the osteogenic differentiation process (Bellows, C. G., Aubin, J. E., Heersche, J. N. M., 1991. *Initiation and progression of mineralization of bone nodules formed in vitro: the role of alkaline phosphatase and organic phosphate*. Bone Miner. 14, 27-40; Chen, Y., Huang, Z., Li, X., Li, S., Zhou, Z., Zhang, Y., Feng, Q. L., Yu, B., 2012. *In Vitro Biocompatibility and Osteoblast Differentiation of an Injectable Chitosan Nano-Hydroxyapatite/Collagen Scaffold*. J. Nanomater. 2012, 1-6; Coelho, M. J., Fernandes, M. H., 2000 *Human bone cell cultures in biocompatibility testing. Part II: Effect of ascorbic acid, β-glycerophosphate and dexamethasone on osteoblastic differentiation*. Biomaterials 21, 1095-1102). However, there is no evidence in literature of any immunohistochemical analysis of porous bovine derived hydroxyapatite. The pore size of the scaffolds would have played a vital role in stimulating cell adhesion, proliferation and differentiation. The pore sizes of the three scaffolds are similar to that of cellular filopodia, which acts as an anchorage point for cells to facilitate cell adhesion and migration. In addition, the small pore size of the scaffolds would be a better fit for small adhesion proteins such as vitronectin which increases protein absorption (Gao et al., Krishnamurithy et al., 2014). These results clearly demonstrate the osteoinductive properties of the three scaffolds and provides evidence that the scaffolds constitute a good substrate for Saos-2 cell differentiation leading to extra cellular bone matrix formation.

EXAMPLE 6

Magnesium & Strontium Co-Substituted Bovine Hydroxyapatite

Co-substitution has been seen as a remedy to compensate or nullify the negative effects of ionic substitutions as the negative effect of one metal ion is neutralized by the beneficial effect of the other. For example, silver, which is known for its antibacterial activity, was found to show an increase in cytotoxicity levels with increase in its concentration beyond a threshold. This effect of silver could be diminished to an extent by adding a substituent ion such as zinc that is known to promote osteoblast mineralization.

We can be certain that co-substitutions in hydroxyapatite improve its performance as several studies have been performed on investigating the same. Na and Mg co-substituted HA powders prepared by Kannan et al. (Kaman, S., Ventura, J. M. G., Lemos, A. F., Barba, A., Ferreira, J. M. F., 2008. *Effect of sodium addition on the preparation of hydroxyapatites and biphasic ceramics*. Ceram. Int. 34, 7-13) were observed to be thermally stable at 1400° C. Gopi et al., (Gopi, D, Shinyjoy, E., Kavitha, L., 2014. *Synthesis and spectral characterization of silver/magnesium co-substituted hydroxyapatite for biomedical applications*. Spectrochim. Acta. A. Mol. Biomol. Spectrosc. 127, 286-91) demonstrated that synthetic hydroxyapatite co-substituted with silver and magnesium ions, showed impressive antibacterial activity. They also noted that silver concentration when increased led to increased cytotoxicity, but the effect subsided when equal concentration of magnesium was introduced, highlighting the benefit of a co-substituent.

Magnesium is the fourth most abundant trace element found in the body and makes up to 0.72% of the bone by weight. Magnesium ions are known to regulate bone mineral density levels and support osteoblast proliferation. A deficiency of Mg in the body has been linked with diminutive osteoblast activity, impaired bone growth and osteoporosis. Magnesium ions substitute into the Ca(II)sites of the HA lattice. The substitution of Mg ions into HA has shown to increase the solubility of HA. The smaller ionic radius of Mg (0.72 Å) compared to Ca (0.99 Å) causes a distortion in the HA lattice and hence has an inhibitory &Tea on the crystallinity of HA. Increasing Mg concentration in HA is known to decrease the phase purity and crystal size of HA by preferring the formation of a secondary β-TCP phase. Jiao and Wang noted an increase in bioactivity and drug-carrying properties when Mg-HA was coated on titanium substrates (Jiao, M.-J., Wang, X.-X., 2009. *Electrolytic deposition of magnesium-substituted hydroxyapatite crystals on titanium substrate*. Mater. Lett. 63, 2286-2289). Qi et al. observed that titanium alloys coated with Mg-HA showed good in vitro biocompatibility towards MG63 human osteosarcoma cells (Qi, G., Zhang, S., Khor, K. A., Lye, S. W., Zeng, X., Weng, W., Liu, C., Venkatraman, S. S., Ma, L. L., 2008. *Osteoblastic cell response on magnesium-incorporated apatite coatings*. Appl. Surf. Sci. 255, 304-307). Zhang et al. observed no adverse reactions from Mg alloys implanted in the host up to a period of 6 months in vivo (Zhang, F., Xu, L., Yu, G., Pan, F., Yang, K., 2009. *In vivo evaluation of biodegradable magnesium alloy bone implant in the first 6 months implantation*. J. Biomed. Mater. Res. A 90, 882-93).

Strontium ions are proven to stimulate bone formation and inhibit bone resorption. Strontium ranelate is used in the treatment of osteoporosis. Strontium ions display a strong affinity to the calcium ions of the natural hydroxyapatite present in the bones. Boanini et al., synthesised strontium substituted hydroxyapatite targeting osteopenia and observed that the substitution enhanced cell proliferation, collagen production and alkaline phosphatase activity proving their ability to support bone regeneration (Boanini, E., Torricelli, P., Fini, M Bigi, a, 2011. *Osteopenic bone cell response to strontium-substituted hydroxyapatite*. J. Mater. Sci. Mater. Med. 22, 2079-88). The antimicrobial activity of Sr-HA against gram positive and negative was studied by Ravi et al., in 2012. The authors noted while the Sr-HA showed good antibacterial activity against *E. coli* and *S. aureus*, the preparations were non-toxic towards human periodontal fibroblast cells, therefore highlighting their biocompatibility. Ravi et al. also noted that the incorporation of Sr ions increased the thermal stability and in vitro solubility of HA (Ravi, N. D., Balu, R., Sampath Kumar, T. S., 2012. *Strontium-Substituted Calcium Deficient Hydroxyapatite Nanoparticles: Synthesis, Characterization, and Antibacterial Properties*. J. Am. Ceram. Soc. 95, 2700-2708). Valiense et al. observed successful integration of Sr-HA containing scaffolds into the sinus of rabbits and attributed the improved biocompatibility, osteoconductivity and bioresorbability to the substitution Sr ions into HA (Valiense, H., Barreto, M., Resende, R. F., Alves, A. T., Rossi, A. M., Mavropoulos, E., Granjeiro, J. M., Calasans-Maia, M. D., 2016. *In vitro and in vivo evaluation of strontium-containing nanostructured carbonated hydroxyapatite/sodium alginate for sinus lift in rabbits*. J. Biomed. Mater. Res.—Part B Appl. Biomater. 104, 274-282). Aina et al carried out the co-substitution of magnesium and strontium ions in synthetic hydroxyapatite and observed positive results. They observed the presence of strontium in tandem with magnesium was helpful in reversing the instability caused by the substitution of magnesium into the HA lattice (Aina, V., Lusvardi, G., Annan, B., Gibson, I. R., Imrie, F. E., Malavasi, G., Menabue, L., Cerrato, G., Martra, G., 2012. *Magnesium- and strontium-co-substituted hydroxyapatite: the effects of doped-ions on the structure and chemico-physical properties*. J. Mater. Sci. Mater. Med. 23, 2867-79). Increasing the concentration of magnesium while substituting into synthetic HA caused the formation of the unwanted secondary phase β-TCP, which is much weaker than HA. However, the presence of strontium diminished the β-TCP formation, while preferring the formation of HA. The concept of ionic co-substitution into biological HA is novel.

Mg—Sr was chosen as the ideal choice of co-substituents owing to the above benefits and the result was a significant improvement in the physicochemical, mechanical, and biological properties of the bovine hydroxyapatite material.

EXAMPLE 6.1

Preparation of Magnesium & Strontium Co-Substituted Hydroxy Apatite (XHA)

The stock BHA scaffolds required for the procedure were prepared in accordance to Ratnayake et al (Ratnayake, J. T. B., Gould, M. L., Shavandi, A., Mucalo, M., Dias, G. J., 2016. *Development and characterization of a xenograft material from New Zealand sourced bovine cancellous bone*. J. Biomed. Mater. Res. B. Appl. Biomater. 105, 1054-1062).
Materials:
Calcium nitrate tetrahydrate, diammonium hydrogen phosphate, magnesium chloride hexahydrate, strontium nitrate and analaR grade ammonia solution were all purchased from Sigma (Sigma Aldrich, NZ).
Methodology:
The sol-gel method used in this study to produce Mg and Sr co-substituted hydroxyapatite scaffolds is an amalgamation of protocols proposed by Ratnayake and Kuriakose et al. Both Mg and Sr are cationic substituents and hence replace Ca ions in the hydroxyapatite (Kuriakose, T. A., Kalkura, S. N., Palanichamy, M., Arivuoli, D., Dierks, K., Bocelli, G., Betzel, C., 2004. *Synthesis of stoichiometric nano crystalline hydroxyapatite by ethanol-based sol-gel technique at low temperature*. J. Cryst. Growth 263, 517-523; Ratnayake, J. T. B., Mucalo, M., Dias, G. J., 2017. *Substituted hydroxyapatites for bone regeneration: A review of current trends*, J. Biomed. Mater. Res. Part B Appl. Biomater. 105, 1285-1299). Reactant concentrations are presented in the table below. The stoichiometric molar ratio of Ca/P in the bones in the human body is 1.67. The co-substitution was carried out keeping the ratio in mind so that (Ca+x)/P molar ratio equals 1.67 where x=(Mg+Sr). The molar concentrations for Mg—Sr co-substitution into BHA were based on a similar work on synthetic HA by Aina et al (Aina, V., Lusvardi, G., Annaz, B., Gibson, I. R., Imrie, F. E., Malavasi, G., Menabue, L., Cerrato, G., Martra, G., 2012. *Magnesium- and strontium-co-substituted hydroxyapatite: the effects of doped-ions on the structure and chemico-physical properties*. J. Mater. Sci. Mater. Med. 23, 2867-79). 14.17 g (0.06M) of $Ca(NO_3)_2 \cdot 4H_2O$ was dissolved in 50 mL of deionised water in a conical flask by vigorous stirring using a magnetic stirrer. Upon its dissolution, equimolar quantities of $MgCl_2 \cdot 6H_2O$ and $Sr(NO_3)_2$ amounting to 4.07 g (0.02M) and 4.23 g (0.02M) were added into the Ca precursor solution until dissolution. 7.92 g (0.06M) of $(NH_4)_2HPO_4$ was dissolved separately in a conical flask containing 50 mL of deionised water under constant stirring for 15 minutes. The phosphate precursor solution was then transferred to a custom-made beaker holding a wire mesh. The prepared BHA bone scaffold cubes 12 mm×12 mm×12 mm were placed on the wire mesh. The (Ca+x) precursor solution was then added dropwise to the beaker containing the phosphate precursor at the rate of 5 mL/min through a glass burette under constant stirring and the temperature maintained at 85° C. The addition of the (Ca+x) precursor led to the formation of a chalky white precipitate. The BHA bone cubes were added to the beaker and the pH of the solution was maintained above 10 throughout the process by adding approximately 60 mL of aqueous ammonia solution. The stirring was allowed to continue for a period of 4 hours while maintaining the experimental parameters until a gel formed the white gel along with the bone cubes immersed in it was allowed to settle for a period of 24 hours at room temperature, The contents of the custom beaker along with the bone cubes were transferred to another beaker which was allowed to stand for 2 hours. A 20 ml syringe was used to remove the supernatant of the saturated Mg—Sr sol gel and the bone cubes were placed in it. The beaker was then gently agitated for 4 hours in an orbital shaker after which the scaffolds were removed, and oven dried at 60° C. for 24 hours. The scaffolds where then transferred to a zirconia crucible and were sintered in a muffle furnace (McGregor) operating at 600° C. (at a heating rate of 10° C./min) for 4 hours at atmospheric pressure in the presence of ambient humidity. The prepared Mg—Sr co-substituted HA scaffolds were labelled 'XHA' and were characterized and compared against the BHA scaffolds.

TABLE 5

Constituents required to prepare Mg—Sr sol-gel

| MATERIAL | $Ca(NO_3)_2 \cdot 4H_2O$ | $(NH_4)_2HPO_4$ | $MgCl_2 \cdot 6H_2O$ | $Sr(NO_3)_2$ |
|---|---|---|---|---|
| Mol. Wt.(gmol$^{-1}$) | 236.15 | 132.06 | 203.3 | 211.63 |
| Number of Moles | 0.06 | 0.06 | 0.02 | 0.02 |
| Measured Weight (g) | 14.17 | 7.92 | 4.07 | 4.23 |

De-ionised water: 50 mL
Aqueous ammonia: 60 mL

EXAMPLE 7

Characterization

The prepared BHA and XHA scaffolds were characterized using the following technique to evaluate the physical, chemical, and biological properties.
1) Chemical Properties
   Fourier Transform Infrared Spectroscopy (FTIR)
   Energy dispersive X-ray analysis (EDX analysis)
   Inductively coupled plasma-mass spectrometry (ICP-MS)
2) Physical Properties
   Scanning Electron Microscopy (SEM)
   X-ray Diffraction (XRD)
3) In Vitro Biological Properties
   Chemical Stability
   Live/Dead Assay
   MTS Assay for Cell Proliferation
   Antibacterial Activity

EXAMPLE 7.1

IR Spectroscopy

Bovine Hydroxyapatite (BHA):
The IR spectra of BHA is presented in FIG. 33. The sintered BHA scaffolds presented sharp peaks indicative of the crystallinity of the HA phase in the samples. The narrow peak at 3571 cm$^{-1}$ was attributed to the stretching vibrations of the hydroxyl (—OH) groups of the HA. The characteristic phosphate bands of HA were identified at 1087-1021 cm$^{-1}$, 962 cm$^{-1}$, 629-562 cm$^{-1}$ and 473 cm$^{-1}$. The IR spectra of BHA scaffolds in the present study was identical to spectra of sintered BHA prepared by Ratnayake et as. The broad peaks observed between 1456-1412 cm$^{-1}$ was attributed to the residual carbonate present in the scaffolds (Ratnayake et al., 2016).

Mg—Sr Co-Substituted Bovine Hydroxyapatite (XHA):

IR spectroscopy was used to assess the chemical interactions caused by the effect of Mg—Sr co-substitution on the functional groups of HA in the XHA scaffolds shown in FIG. 34. The characteristic phosphate vibration peaks of HA appeared at 1086-1021 cm$^{-1}$, 961 cm$^{-1}$, 630-561 cm$^{-1}$ and 474 cm$^{-1}$. However, the phosphate peaks at 1086 cm$^{-1}$ and 630 cm$^{-1}$ were less resolved and of rather low intensity when compared to similar peaks of BHA scaffolds. A similar pattern was observed in the —OH peaks of HA at 3570 cm$^{-1}$ where the corresponding peak in XHA scaffolds was very weak, close to being completely resorbed. The reason for the reduction in intensity can be attributed to the effect of incorporation of Mg$^{2+}$ and Sr$^{2+}$ ions. Aina et al. observed that the ability of Mg and Sr to solubilize the HA phase affected the crystallinity of the Mg—Sr co-substituted HA samples. The authors also observed that increasing Mg concentrations caused the peaks at 3570 cm$^{-1}$ and 1090 cm$^{-1}$ to broaden and appear less well resolved pointing towards the formation of a tricalcium phosphate (TCP) phase. The above theory is validated by the results of the XRD analysis of XHA scaffolds (Error! Reference source not found.) which shows a peak demonstrating the formation of a β-TCP phase. As an added consequence of the co-substitution, the authors also observed the disappearance of the $v_4$ phosphate peak at 628 cm$^{-1}$. However, the low intensity peak observed 630 cm$^{-1}$ in the scaffolds of the present study shows that the crystallinity of the samples was not lost entirely as a consequence of the Mg—Sr co-substitution.

EXAMPLE 7.2

Energy Dispersive X-Ray Analysis (EDX)

The EDX analysis of the XHA scaffolds (FIG. 36) identified and estimated the elemental composition of the inorganic phase in the bone scaffolds. The results of the analysis are presented in Table 5. The results were used to measure the Ca/P mole ratio for each of the samples and (Ca+x)/P mole ratio for XHA, where x stands for the sum of number of moles of (Mg$^{2+}$+Sr$^{2+}$) ions.

The XHA scaffolds are calcium deficient hydroxyapatites where the Ca$^{2+}$ ions are replaced by Mg$^{2+}$ and Sr$^{2+}$ ions during the sol-gel synthesis. This was reflected in the relatively low Ca/P ratios of XHA scaffolds which ranged from 1.28-1.40 when compared to the Ca/P ratios of ~1.6 corresponding to BHA. XHA scaffolds also showed peaks for the substituted Mg and Sr and the analysis revealed that the Mg and Sr content in the XHA scaffolds ranged from 0.9-1.5% and 1.5-2.7% respectively. The (Ca+x)/P molar ratios of XHA when the (no. of moles of) Mg$^{2+}$ and Sr$^{2+}$ ions are considered, rises to 1.52-1.74 validating the co-substitution, The Mg/P and Sr/P molar ratios were identical to those of synthetic equimolar Mg—Sr co-substituted HA scaffolds prepared by Aina et al. when analysed by EDX (Aina, V., Lusvardi, G., Annaz, B., Gibson, I. R., Imrie, F. E., Malavasi, G., Menabue, L., Cerrato, G., Martra, G., 2012. *Magnesium- and strontium-co-substituted hydroxyapatite: the effects of doped-ions on the structure and chemico-physical properties*. J. Mater. Sci. Mater. Med. 23, 2867-79).

TABLE 5

Elemental composition of BHA and XHA scaffolds as estimated by EDX analysis.

| Element (wt %) | Sample BHA | XHA |
|---|---|---|
| C | 11 | 34.40 |
| O | 46 | 41.83 |
| Na | trace | 1.38 |
| Mg | trace | 1.04 |
| Sr | trace | 2.57 |
| Ca | 29 | 11.70 |
| P | 13 | 7.08 |
| Ca/P ratio* | 1.66-1.73 | 1.28-1.40 |
| (Ca + x)/P ratio* | — | 1.52-1.74 |

*indicates values calculated across four different regions per sample.

EXAMPLE 7.3

Inductively Coupled Plasma-Mass Spectrometry (ICP-MS) Analysis

The results of the ICP-MS analysis (Table 6) agreed with those of the EDX analysis in identifying the composition of Ca, P, Mg, Sr and Na in the MIA scaffolds, The Ca/P ratios calculated by ICP-MS were identical to those calculated by EDX for BHA scaffolds. However, The XHA scaffolds presented a much higher Ca/P ratio of 1.68 as compared to ~1.4 as calculated by the EDX analysis. The difference could be due to the fact the Ca/P ratios found in mammalian bones are non-stoichiometric and vary significantly along different regions of bones. The Ca/P ratios are also found to increase with increase in calcification of the bone (Bigi, A., Cojazzi, G., Panzavolta, S., Ripamonti, A., Roveri, N., Romanello, M., Noris Suarez, K., Moro, L., 1997. *Chemical and structural characterization of the mineral phase from cortical and trabecular bone* J Inorg Biochem 68, 45-51). Na and Mg occur as trace elements in mammalian bones as represented in the BHA scaffolds in the present study. The content of Sr in bones is close to negligible at 0.05% (Dorozhkin, S. V., Epple, M., 2002. *Biological and Medical Significance of Calcium Phosphates*. Angew. Chemie Int. Ed. 41, 3130-3146). Na & Mg are known to play a vital role in bone development and their deficiency is often associated with bone loss and fragility (Akram, M., Ahmed, R., Shakir, I., Ibrahim, W. A. W., Hussain, R., 2014. *Extracting hydroxyapatite and its precursors from natural resources*. J. Mater. Sci. 49, 1461-1475). It is also worth noting that while Mg ions known for their supporting role in regulating bone mineral density, Mg can only be substituted up to 10% in HA. However, increasing Mg concentrations in HA is known to have a destabilizing effect on the latter's crystal structure preventing apatite crystallization in solution and favouring the formation of a secondary β-TCP phase (Bigi, A., Falini, G., Foresti, E., Gazzano, M., Ripmonti, A., Roveti, N., 1996. *Rietveld structure refinements of calcium hydroxylapatite containing magnesium*. Acta Crystallogr. Sect. B Struct, Sci. 52, 87-92; Bigi, A., Falini, G., Foresti, E., Ripamonti, A., Gazzano, M., Roveri, N., 1993. *Magnesium* influence on hydroxyapatite crystallization. J. Inorg. Biochem. 49, 69-78; Bigi, A., Foresti, E., Gregorini, R., Ripamonti, A., Roveri, N., Shah, J. S., 1992. *The role of magnesium on the structure of biological apatites*. Calcif. Tissue Int. 50, 439-444; Bigi, A., Foresti, E., Ripamonti, A., Compostella, L., Fichera, A. M., Gazzano, M., Roveri, N., 1988. *Structural and chemical characterization of inorganic deposits in calcified human mitral valve*. J. Inorg. Biochem. 34, 75-82). XHA scaffolds showed a forty-fold increase in the Sr levels. The role of Sr in bone metabolism is well established as it is known to favour bone formation, prevent bone resorption and is used in the treatment of osteoporosis (Canalis, E., 1996. *The divalent strontium salt S12911 enhances bone cell replication and bone formation in vitro*. Bone 18, 517-523; Takahashi, N., Sasaki, T., Tsouderos, Y., Suda, T., 2003. *S 12911-2 inhibits osteoclastic bone resorption in vitro*. J. Bone Miner. Res. 18, 1082-7). Also (Ca+x/P) ratios of XHA 1.52-1.74 were found to be comparable to the commercially available bovine HA based products BioOss® (1.54) and Endobon® (1.57) as determined by Lee et al. and Joschek et al. respectively (Lee, J. I. L., Yi, G. S., Lee, J. W., Kim, D. J., 2017. *Physicochemical characterization of porcine bone-derived grafting material and comparison with bovine xenografts for dental applications*. J. Petiodontal Implant Sci. 47, 388-401; Joschek, S., Nies, B., Krotz, R., Göpferich, A., 2000. *Chemical and physicochemical characterization of porous hydroxyapatite ceramics made of natural bone*. Biomaterials 21, 1645-1658).

TABLE 6

ICP-MS Analysis of BHA and XHA scaffolds

| COMPOSITION | BHA | XHA |
|---|---|---|
| Na (% w/w) | 0.7 | 0.72 |
| Ca (% w/w) | 38 | 34 |
| P (% w/w) | 17 | 16 |
| Mg (% w/w) | trace | 0.54 |
| Sr (% w/w) | trace | 1.9 |
| Ash %* | 97 | 92 |
| Ca/P ratio | 1.75 | 1.68 |

EXAMPLE 7.4

Scanning Electron Microscopy

The SEM micrographs of XHA (FIG. 38) showed interconnected porosity similar to the BHA scaffolds (FIG. 37). The pore sizes ranged from 180-600 μm. These measurements are in agreement with the literature which prescribes a minimum pore size of 100 μm which would allow for the infiltration of osteogenic cells and transport of nutrients and wastes in and out of the scaffolds (Bignon, A., Chouteau, J., Chevalier, J., Fantozzi, G., Carret, J. P., Chavassieux, P., Boivin, G., Melin, M., Hartmann, D., 2003. *Effect of micro- and macroporosity of bone substitutes on their mechanical properties and cellular response*. J. Mater. Sci. Mater. Med; Hing, K. A., Annaz, B., Saeed, S., Revell, P. A., Buckland, T., 2005. *Microporosity enhances bioactivity of synthetic bone graft substitutes*, in: Journal of Materials Science: Materials in Medicine). The XHA scaffolds presented rough surfaces showing agglomerations in the pore walls unlike BHA. This can be attributed to the deposition of the particles of sol-gel synthesis and on the surface of the scaffolds.

Porosity of a biomaterial has a direct implication on its functionality. The literature prescribes a minimum porosity of 100 μm as essential for bone ingrowth (Le Huec, J. C., Schaeverbeke, T., Clement, D., Faber, J., Le Rebeller, A., 1995. *Influence of porosity on the mechanical resistance of hydroxyapatite ceramics under compressive stress*. Biomaterials 16, 113-118; Orlovskii, Komlev, V. S., Barinov, S. M., 2002. *Hydroxyapcuite and Hydroxyapatite-Based Ceramics*. Inorg. Mater. 38, 973-984). An interconnected porous structure allows for cellular migration, colonisation, vascularisation and consequently a mechanically stable implant integration with the host tissue. Porosity also contributes to effective release of growth factors and efficient nutrient exchange (Loh, Q. L., Choong, C., 2013. *Three-dimensional scaffolds for tissue engineering applications: role of porosity and pore size*. Tissue Eng. Part B. Rev. 19, 485-502; Mbarki, M., Sharrock, P., Hallo, M., ElFeki, H., 2017. *Hydroxyapatite bioceramic with large porosity*. Mater. Sci. Eng. C 76, 985-990). Porous materials can be classified according to their pore sizes into microporous (pore sizes <10 μm) and macroporous (>50 μm) materials (Gaasbeek, R. D. A., Toonen, H. G., van Heerwaarden, R. J., Buma, P., 2005. *Mechanism of bone incorporation of β-TCP bone substitute in open wedge tibial osteotomy in patients*. Biomaterials 26, 6713-6719; Habibovic, P., Yuan, H., van der Valk, C. M., Meijer, G., van Blitterswijk, C. A., de Groot, K., 2005. *3D microenvironment as essential element or osteoinduction by biomaterials*. Biomaterials 26, 3565-3575). While macroporosity is essential for bone ingrowth, microporosity helps to further improve the effect. Materials with multi-scale (both macro and micro) porosity have been shown to perform better in biological studies. Woodard et al., studied the performance of HA scaffolds with multi-scale porosity implanted intramuscularly in porcine models. Whilst the authors observed bone ingrowth into the macropores, they also noted the deposition of organic material in the micropores of the material (Woodard, J. R., Hilldore, A. J., Lan, S. K., Park, C. J., Morgan, A. W., Eurell, J. A. C., Clark, S. G., Wheeler, M. B., Jamison, R. D., Wagoner Johnson, A. J., 2007. *The mechanical properties and osteoconductivity of hydroxyapatite bone scaffolds with multi-scale porosity*. Biomaterials 28, 45-54). Both BHA and XHA scaffolds used in the present study showed both macro (120-700 μm) and micro porosity (600 nm~5 μm) as can be seen in the SEM images (FIGS. 37 & 38). it is worth noting that the sol-gel deposition hasn't completely blocked off the micropores of the XHA samples.

EXAMPLE 7.5

X-Ray Diffraction

While the XRD spectra of XHA (FIG. 40) agreed with those of BHA (FIG. 39) & reference peaks of HA (JCPDS 00-09-0432), the peaks of XHA were of lower intensity, slightly broader, presented a downward shift to lower diffraction angles indicating a possible decrease in the crystallinity of the samples. A low intensity peak observed at 2θ=30.9° in XHA was attributed to β-TCP (Tavares, D. dos S., Castro, L. de O., Soares, G. D. de A., Alves, G. G., Granjiero, J. M., Granjeiro, J. M., 2013. *Synthesis and cytotoxicity evaluation of granular magnesium substituted β-tricalcium phosphate*. J. Appl. Oral Sci. 21, 37-42).

The presence of Mg—Sr ions XHA can be attributed to the decrease in crystallinity of XHA. It has been established that the presence of Mg and Sr increases the solubility of HA in solution. Bigi et al. in 1993 while studying the effect of Mg on the crystallization of HA noted that Mg inhibited the crystallization of the HA phase and also decreased the crystal size of HA (Bigi, A., Falini, G., Foresti, E., Ripamonti, A., Gazzano, M., Roveri, N., 1993. *Magnesium influence on hydroxyapatite crystallization.* J. Inorg. Biochem. 49, 69-78). The findings of this study agreed with Gayathri et al. who observed a peak shift toward lower diffraction angles in Mg-HA nanoparticles when compared with pure HA nanoparticles. The authors believed the incorporation of Mg ions, due to its smaller ionic radius (0.72 Å) compared to Ca (0.99 Å), to have caused a distortion in the apatite lattice (Gayathri, B., Muthukumarasamy, N., Velauthapillai, D., Santhosh, S. G., Asokan, V., 2018. *Magnesium incorporated hydroxyapatite nanoparticles: Preparation, characterization, antibacterial and larvicidal activity.* Arab. J. Chem. 11, 645-654). Gopi et al. experienced a similar effect with Sr-HA where the diffraction peak positions shifted to lower frequencies. However in this case it is the larger ionic radius of Sr (1.13 Å) which was attributed to the distortion in the apatite lattice leading to increased d-spacings (D. Gopi et al., 2014). The literature shows several other studies which agree with the above studies on the effect of Mg and Sr ions on the apatite lattice (Kaygili, O., Keser, S., 2015. *Sol-gel synthesis and characterization of Sr/Mg, Mg/Zn and Sr/Zn co-doped hydroxyapatites.* Mater. Lett. 141, 161-164; Lowry, N., Han, Y., Meenan, B. J., Boyd, A. R., 2017. *Strontium and zinc co-substituted nanophase hydroxyapatite.* Ceram. Int. 43, 12070-12078; Tsai, S.-W., Yu, W.-X., Hwang, P.-A., Huang, S.-S., Lin, H.-M., Hsu, Y.-W., Hsu, F.-Y., 2018. *Fabrication and Characterization of Strontium-Substituted Hydroxyapatite-CaO-CaCO3 Nanofibers with a Mesoporous Structure as Drug Delivery Carriers.* Pharmaceutics 10, 179). A study conducted by Aina et al. in 2012 shed more light on the effects of Mg and Sr substitution and co-substitution on the HA lattice. In a single substituted Mg-HA, the authors observed an increase in the formation of a secondary β-TCP with increasing concentration Mg due to its solubilizing effect. However, introducing an equimolar concentration of Sr stabilized the apatite lattice and even reversed the β-TCP formation. In their preparations, $Ca_{9.5}$ $Mg_{0.5}$ $(PO_4)_6$ $(OH)_2$ presented ~26% (3-TCP while the $Ca_9Mg_{0.5}Sr_{0.5}(PO_4)_6(OH)_2$ composition contained only ~6% β-TCP demonstrating the stabilizing effect of the co-presence of Sr on the apatite lattice. The above literary evidence provides a strong case to argue that while the XHA scaffolds did show a peak for the unfavourable β-TCP which can be attributed to the incorporation of Mg ions in the lattice, the Sr ions are responsible for counteracting this effect. The low intensity of the said peak indicates a diminutive composition of β-TCP due to the stabilizing effect of Sr ions that restore some of the lost crystallinity of XHA. Table 7 compares the diffraction peaks of BHA and XHA against characteristic HA peaks from reference HA JCPDS pattern 00-09-0432 demonstrating XHA's peak shift to lower diffraction angles and also the peak for β-TCP.

TABLE 7

XRD peak comparison showing peak shift to lower Bragg angles in XHA for the HA phase and also the occurrence of a β-TCP peak

| PHASE | JCPDS 70-2064 β-TCP (2θ) | JCPDS 09-0432 HA (2θ) | BHA (2θ) | XHA (2θ) |
|---|---|---|---|---|
| HA | — | 25.87° | 25.91° | 25.73° |
| HA | — | 31.77° | 31.76° | 31.62° |
| HA | — | 32.19° | 32.17° | 32.06° |
| HA | — | 46.71° | 46.73° | 46.56° |
| β-TCP | 31.1° | — | absent | 30.92° |

EXAMPLE 7.6

In Vitro Characterization

Chemical Stability

To assess the in-vitro chemical stability and degradation of the prepared scaffolds (BHA, and XHA), simulated body fluid (SBF) solution was prepared according to the Kokubo protocol (Kokubo, T., Kushitani, H., Sakka, S., Kitsugi, T., Yamamuro, T., 1990. *Solutions able to reproduce in vivo surface-structure changes in bioactive glass-ceramic A-W3,* J. Biomed. Mater. Res. 24, 721-734)). The samples (n=3, size: 10 mm³) were immersed in Falcon tubes containing 10 ml of SBF solution and were placed in an incubator at 37° C. for 1, 4, 7, 14 and 28 days. After soaking the scaffolds, the pH value of the SBF solution at different time points was obtained by a pH meter. The pH of the SBF solution prior to soaking the scaffolds (day 0) was recorded as being 7.4. After different periods of immersion, the samples were withdrawn from the SBF solution, gently rinsed with distilled water, and dried at 60° C. for 48 hours. The degradation of the scaffolds was measured by calculating the weight loss of each sample. The rate of weight loss was calculated over predetermined time intervals according to the following formula:

$$W_L = (W_0 - W_1)/W_0 \times 100\%$$

where $W_0$ and $W_1$ denote the weights of sample before and after immersion respectively. A Vernier calliper was used to measure the dimensions of the scaffold before and after immersion in SBF solution.

BHA:

The chemical stability of BHA in SBF is shown in FIG. 41. A slow but steady increase in the pH of the SBF solution during the period of observation. However, the pH values which were on the rise ranging from 7.48 on day 1 to 7.61 on day 7, only showed little variation and seemed to stabilize over the period of next 21 days finishing at a pH of 7.62 on day 28. No statistical significance was observed in the pH differences between the observed time points when the results were analysed on GraphPad Prism using a one-way ANOVA with Tukey's multiple comparison test suggesting the BHA scaffolds were chemically stable (ANOVA, P=0.2578).

XHA

The XHA scaffolds showed the least fluctuation in the pH of SBF over the incubation time of 28 days when compared to BHA (FIG. 42). Measuring 7.56 on day 1, the pH value then dropped to 7.49 on day 4 but recovered to 7.57 on day 7 after which the changes stabilised, ending at 7.54 at the end of day 28. When analysed using one-way ANOVA with Tukey's multiple comparison, no statistically significant difference in the pH was observed over the 28-day observation period highlighting the chemical stability of XHA scaffolds (ANOVA, P=0.6708).

Kokubo et al. prepared simulated body fluid to essentially mimic the physiological conditions of the intracellular compartment of human body fluids, especially blood plasma. SBF thus helped Kokubo apt al. to perform in vitro simulations of in vivo conditions (Kokubo, T., 1991. *Bioactive glass ceramics: properties and applications.* Biomaterials 12, 155-163; Kokubo, T., Kushitani, H., Sakka, S., Kitsugi, T., Yamamuro, T., 1990. *Solutions able to reproduce in vivo surface-structure changes in bioactive glass-ceramic A-W3.* J. Biomed. Mater. Res. 24, 721-734; Oyane, A., Kim, H.-M., Furuya, T., Kokubo, T., Miyazaki, T., Nakamura, T., 2003. *Preparation and assessment of revised simulated body flu-* ids. J. Biomed. Mater. Res. 65A, 188-195). In the present study, SBF was used to determine the in vitro chemical stability and biodegradation characteristics of the BHA and XHA scaffolds. It is important to estimate the chemical stability of a biomaterial designed for biomedical applications as it plays a significant role in determining the (host) cellular response to such materials (Ratnayake et al., 2016). The pH of the SBF prior to scaffold immersion was measured to be 7.4 (Day 0). The graphical analysis of chemical stability of the BHA scaffolds immersed in SBF for 28 days is shown in FIG. 5.21. The pH of the BHA scaffolds showed a sustained increase over the entire duration of the 28 days from measuring 7.48 on day 1 to 7.62 on day 28. However, the rate of increase plateaued after day 14 where the pH of the SBF was measured to be 7.61. However the findings of BHA in the present study is in disagreement with those of Ratnayake et al. who observed a decreasing trending in pH values for SBF containing BHA scaffolds reaching as low as 7.11 (Ratnayake et al., 2016). The increase in pH caused by BHA in the present study when immersed in aqueous solutions (like SBF) could be due to the following reasons. First could be due to the presence of carbonate ions that occur as trace elements naturally in bone (Akram, M., Ahmed, R., Shakir, I., Ibrahim, W. A. W., Hussain, A. 2014. *Extracting hydroxyapatite and its precursors from natural resources*. Mater. Sci. 49, 1461-1475). Carbonates are known to drive the pH towards the alkaline levels. Saalfeld et al. noted that an increase in pH could be due to fact that HA containing aqueous solutions are primarily composed of $Ca^{2+}$ and $H_2PO_4^-$ ions. The reaction of the $Ca^{2+}$ ions with the $H_2O$ of the aqueous solutions (in this study, SBF) leads to an increase in pH. The authors also observed that while HA is nearly insoluble in water, it is possible for the $Ca^{2+}$ ions to leach out of the apatite lattice into solutions thereby causing an elevation in the pH levels. This effect wears out when the release of ions is limited causing a decrease in pH (Saalfeld, U., Meenen, N. M., Jüres, T. T., Saalfeld, H., 1994. *Solubility behaviour of synthetic hydroxyapatites in aqueous solution: Influence of amorphous constituents on pH value*. Biomaterials 15, 905-908). This in part explains the stabilization of pH post day 14. The partial dissociation of HA into $HPO_4$ is also known to reduce the pH levels (Christoffersen, M. R., Dohrup, J., Christoffersen, J., 1998. *Kinetics of growth and dissolution of calcium hydroxyapatite in suspensions with variable calcium to phosphate ratio*. J. Cryst. Growth 186, 283-290).

The SBF containing XHA scaffolds showed the least fluctuation in pH among the two scaffold groups varying between 7.56-7.54 across the incubation period of 28 days. To recap, the XHA scaffolds are composed of the BHA produced by the SCWE process upon which Mg—Sr ions are co-substituted in to the BHA lattice using a sol-gel based method. The pH of the SBF conditioned by the XI-IA scaffolds showed an increased pH to 7.56 on day 1. While the increase in pH could he explained by leaching of $Ca^{2+}$ ions leaching out from the apatite lattice. While the incorporation of Mg and Sr bears beneficial effects in terms of bioactivity and mechanical properties, both these metallic cations are known to cause distortion in the apatite lattice (parameters) (Aina et al., 2012; Gayathri et al., 2018). While Mg ions are known to have an inhibitory effect on the crystallization of HA, both Mg and Sr ions are known to increase the solubility of the otherwise insoluble HA (Boanini., E., Torricelli, P., Fini, M., Bigi, A, 2011. *Osteopenic bone cell response to strontium-substituted hydroxyapatite*. J. Mater. Sci. Mater. Med. 22, 2079-88; Christoffersen, J., Christoffersen, M. R., Kolthoff, N., Bärenholdt, O., 1997. *Effects of strontium ions on growth and dissolution of hydroxyapatite and on bone mineral detection*. Bone 20, 47-54; Ren, F., Leng, Y., Xin, R., Ge, X., 2010. *Synthesis, characterization and ab initio simulation of magnesium-substituted hydroxyapatite*. Acta Biomater. 6, 2787-2796), Gonzalez et al. observed when Mg alloys are immersed in a physiological medium, $Mg^{2+}$ are released which then combine with the water in the aqueous medium to form alkaline $Mg(OH)_2$, a degradation product which precipitates in solution (Gonzalez, J., Hou, R. Q., Nidadavolu, E. P. S., Willumeit-Römer, R., Feyerabend, F., 2018. *Magnesium degradation under physiological conditions—Best practice*. Bioact. Mater. 3, 174-185). A similar effect in the XHA scaffolds could see ionic magnesium from the apatite lattice being released into the solution undergoing degradation in the SBF slightly elevating the pH in the process. This effect would be similar for strontium which could see the release of $Sr^{2+}$ ions into solution forming strontium hydroxide. The presence of only about ~1 wt % Mg and ~2 wt % Sr in XHA as revealed by EDX and ICP-MS analysis means that there were not much free ionic Mg or Sr to cause a drastic increase in the pH hence explains why the pH of XHA-conditioned SBF showed little fluctuation and did not rise beyond 7.57 making them the most chemically stable of the two samples.

EXAMPLE 8

Live/Dead Assay for Cell Viability

The cell viability of the BHA and XHA scaffolds was assessed using the LIVE/DEAD cell cytotoxicity assay. FIG. 43 shows the graphical comparison of viability of Saos-2 cells cultured on BHA and XHA scaffolds at 24, 48 and 72 hours of observation. At 24 hours XHA scaffolds exhibited slightly higher cell viability compared to BHA. However, the differences were not statistically significant when analyzed using one-way ANOVA with Tukey's multiple comparison (P=0.93).

Both BHA and XHA scaffolds presented a small decrease at 48 hours but like 24 hours, the results were not found to be statistically significant (ANOVA, P=0.9). At 72 hours, both scaffolds presented increased cell viability, with each scaffold group demonstrating their highest values across all three timepoints. XHA scaffolds presented the higher cell viability at 72 hours of observation but the differences were not statistically significant as there was only a slight difference between the viability of BHA and XHA scaffolds (ANOVA, P=>0.9). The fluorescence microscopy images of the cell viability of BHA and XHA scaffolds presenting live and dead cells on the surface across 24, 48 and 72 hours are presented in FIGS. 44 and 45.

EXAMPLE 9

MTS Assay for Cell Proliferation

The cell proliferation of the BHA, and XHA scaffolds was determined using the MTS assay. FIG. 46 compares the proliferation of Saos-2 cells seed on to the scaffolds as a function of time. BHA scaffolds presented the lowest cell numbers across all three time points (2.4 h, 48 h, and 72 h) while the XHA scaffolds presented the highest. XHA presented significantly higher cell numbers than BHA scaffolds at 24 h (t-test, P=0.018) and 72 h (t-test, P=0.016). Upon analyzing the results using unpaired two-tailed t-test, the differences were found to be statistically significant. No statistical significance was observed between the BHA and XHA scaffolds at 48 h despite XHA presenting the higher cell number (t-test, P=0.132).

EXAMPLE 10

Antibacterial Activity

The antibacterial properties of the prepared BHA and XHA scaffolds were tested against Gram-negative *E. coli* and Gram-positive *S. aureus* over a period of 24 hours. The antibacterial activity was determined by comparing (and normalising) the number of bacterial colonies formed in petri-plates containing powdered BHA and XHA scaffolds against a petri-plate containing plain Mueller Hinton agar as control to determine the percentage reduction in growth for each scaffold (FIGS. 48 & 49).

TABLE 8

Summary of percentage reduction in growth presented by BHA and XHA scaffolds against *E. coli* and *S. aureus*

| Organism | Mean of percentage reduction in growth (%) | |
| --- | --- | --- |
|  | BHA | XHA |
| *E. coli* | 13.08 ± 3.63 | 55.7 ± 9.7 |
| *S. aureus* | 11.44 ± 8.59 | 40.15 ± 6.4 |

From Table 8 and FIGS. 47-49 it is evident that both BHA and XHA exhibited antibacterial activity against *E. coli* and *S. aureus*. However, XHA scaffolds inhibited the bacterial species nearly four times as much as BHA scaffolds.

The BHA and XHA scaffolds were subject to Live/Dead® assay, MTS assay for cell proliferation, and antibacterial testing. Saos-2 human osteosarcoma cells were used to evaluate the in vitro biocompatibility (osseocompatibility) of the scaffolds due to their close resemblance to osteoblasts in their ability to undergo differentiation and lay down a bone tissue extracellular matrix and are known to produce better alkaline phosphatase expression over MG63 osteoblast like cells (Rodan, S. B., Imai, Y., Thiede, M. A., Wesolowski, G., Thompson, D., Bar-Shavit, Z., Shull, S., Mann, K., Rodanl, G. A., 1987. *Characterization of a Human Osteasarcoma Cell Line (Saos-2) with Osteoblastic Properties*, Cancer Research). Saos-2 cells have been the cell type of choice in several such studies which involved testing of biomaterials for applications in bone tissue engineering (Kanno, T., Takahashi, T., Tsujisawa, T., Ariyoshi, W., Nishihara, T., 2005. *Platelet-rich plasma enhances human osteoblast-like cell proliferation and differentiation*. J. Oral Maxillofac. Surg. 63, 362-369; Ratnayake, J. T. B., Gould, M. L., Shavandi, A., Mucalo, M., Dias, G. J., 2016. *Development and characterization of a xenograft material from New Zealand sourced bovine cancellous bone*. J. Biomed. Mater. Res. B. Appl. Biomater. 105, 1054-1062). The Live/Dead and MTS assays were carried out by seeding $6 \times 10^3$ cells directly on to the surface of the scaffolds and observe them over 24, 48 and 72 hours. During this period, the GM was replaced every 24 hours to keep the cells nourished and remove the build-up of waste products and dead cells. The endpoint of 72 hours was chosen to evaluate the cell viability and proliferation of Saos-2 cells, since leaving the cells to grow in the well-plates for an extended period of time will lead to them becoming over-confluent and will eventually lead to impeded cell growth due to the nutrient demand and cell death due to contact inhibition (Walker, 2012).

Results of the Live/Dead cell assay were presented in FIG. 43. The BHA scaffolds showed a viability of 75-90% across the three timepoints. These findings are consistent with those of Ratnayake et al. who observed similar values of cell viability in their BHA scaffolds (Ratnayake et al., 2016). The XHA scaffolds presented higher cell viability across all three timepoints compared to BHA scaffolds which were used as the control. The live cells presented a green fluorescence when observed under the fluorescent microscope due to the conversion of non-fluorescent calcein AM to fluorescent calcein. The dead cells emitted red fluorescence as a result of the binding of the ethidium homodimer-1 to the cell membrane of the dead cells. As it can be seen through the images (FIGS. 44 & 45), it was evident that the interconnected porosity observed. in all of the BHA and XHA scaffolds proved to be advantageous as the Saos-2 cells were able to penetrate through the deeper pores of the scaffolds and attach themselves to the inner scaffold surface. Cellular migration and attachment into the interior pores of the scaffold helps to improve cell-scaffold attachment which is integral for osseointegration (Krishnamurithy, G., M. R., Hamdi, N Abbas, A. A., Raghavendran, H. B., Kamarul, T., 2014, *Characterization of bovine-derived porous hydroxyapatite scaffold and its potential to support osteogenic differentiation of human bone marrow derived mesenchymal stem cells*. Ceram. Int. 40, 771-777; O'Brien, F. J., Harley, B. A., Yannas, I. V., Gibson, L. J., 2005. *The effect of pore size on cell adhesion in collagen-GAG scaffolds*. Biomaterials 26, 433-441; Oliveira, J. M., Silva, S. S., Malafaya, P. B., Rodrigues, M. T., Kotobuki., N., Hirose, M., Gomes, M. E., Mano, J. F., Ohgushi, H., Reis, R. L., 2009. *Macroporous hydroxyapatite scaffolds for bone tissue engineering applications: Physicochemical characterization and assessment of rat bone marrow stromal cell viability*. J. Biomed. Mater. Res. Part A 91A, 175-186; Teixeira, S., Ferraz, M. P., Monteiro, F. J., 2008. *Biocompatibility of highly macroporous ceramic scaffolds: cell adhesion and morphology studies*. J. Mater. Sci. Mater. Med. 19, 855-859). Also, the number of dead cells decreased between 48 and 72 hours with all the scaffolds presenting close to 90% viability at the experimental endpoint pointing towards an increasing trend in cell viability with time.

MTS assay was used to evaluate the influence of BHA and XHA on the proliferation of Saos-2 cells. Cell proliferation is a vital component of new tissue regeneration and it is essential for a biomaterial scaffold to provide a biocompatible surface where the precursor cells can attach and colonize to promote tissue regeneration (Park, J., Lakes, R. S., 2007. *Biomaterials: An Introduction*. Springer Science & Business Media), The ability of bovine-derived HA to promote cell proliferation is well documented in the literature. Matsumoto et al. noted mouse calavarial-derived osteoblast cells (MC3T3-E1) cells cultured on bovine bone derived HA scaffolds showed greater increases in DNA, collagenous protein synthesis, cell proliferation and ALP activity compared to those cultured on synthetic HA (Matsumoto, T., Kawakami, M., Kuribayashi, K., Takenaka, T., Minamide, A., Tamaki, T., 1999. *Effects of sintered bovine bone on cell proliferation, collagen synthesis, and osteoblastic expression in MC3T3-E1 osteoblast-like cells*. J. Orthop. Res. 17, 586-592). Both the BHA, and XHA scaffolds showed an increase in cell proliferation with cell numbers of each scaffold higher than that the preceding timepoint (FIG. 46). Ratnayake et al: observed that BHA scaffolds expressing better cell proliferation and higher cell numbers when compared to synthetic HA (Ratnayake et al., 2016). BHA scaffolds used in the present study showed a significant increase in cell numbers between 24 and 72 hours. The cell numbers produced by BHA scaffolds in the current study were also nearly identical to the work of Ratnayake et al., albeit the fact that XHA scaffolds showed better cell numbers compared to BHA.

XHA scaffolds showed the highest turnover in cell numbers through the 24, 48 and 72 hours of observation, shown in FIG. 46. The cell numbers of XHA being significantly higher than BHA at 24 hours and 72 hours can be attributed to the presence of Mg and Sr ions which were substituted into the BHA. The substitution of Mg ions into the apatite lattice is known to have a beneficial effect on the osteoblast proliferation and bone metabolism (Witte, F., Feyerabend, F., Maier, P., Fischer, J., Störmer, M., Blawert, C., Dietzel, W., Hort, N., 2007, *Biodegradable magnesium-hydroxyapatite metal matrix composites*. Biomaterials 28, 2163-74). Qi et al. observed increased cell proliferation and no adverse effects on the morphology of MG63 cells grown on Mg-HA coatings on a titanium alloy substrate (Qi, G., Zhang, S., Khor, K. A., Lye, S. W., Zeng, X., Weng, W., Liu, C., Venkatraman, S. S., Ma, L. L., 2008. *Osteoblastic cell response on magnesium-incorporated apatite coatings*. Appl. Surf. Sci. 255, 304-307), Canalis et al. studied the effects of S12911, a divalent strontium salt on cell proliferation and bone formation using rat calavarial cells. The authors observed the salt enhanced the replication of the osteoblast precursor cells and in low concentrations Sr ions increased bone formation and decrease bone resorption (Canalis, E., 1996. *The divalent strontium salt S12911 enhances bone cell replication and bone formation in vitro*. Bone 18, 517-523). Ravi et al. demonstrated Sr-HA powders were non-toxic to human periodontal ligament fibroblast cells (Ravi, N. D., Bahl, R., Sampath Kumar, T. S., 2012 *Strontium-Substituted Calcium Deficient Hydroxyapatite Nanoparticles: Synthesis, Characterization, and Antibacterial Properties*. J. Am. Ceram. Soc. 95, 2700-2708). The biocompatibility of Mg—Sr alloys was studied by Bornapour et al: (Bornapour, M., Muja, N., Shum-Tim, D., Cerruti, M., Pekguleryuz, M., 2013. *Biocompatibility and biodegradability of Mg—Sr alloys: the formation of Sr-substituted hydroxyapatite*. Acta. Biomater. 9, 5319-30). The authors observed the alloys were non-toxic to human vascular endothelial cells and displayed sustained biodegradability attributed to the presence of Sr ions (Bornapour et al., 2013). The significantly high cell proliferation of XHA compared to BHA scaffolds in the present study agrees with the outcomes of the literature mentioned above and the results of the Live/Dead assay for cell viability, thereby highlighting the positive impact of Mg—Sr co-substitution into the BHA lattice.

The antibacterial mechanism of metal ions is presented in FIG. 50 using $Sr^{2+}$ as an example.

There are 3 known mechanisms by which metal ions released from HA lattice can exert their antibacterial effect (Dastjerdi, R., Montazer, M., 2010. *A review on the application of inorganic nano-structured materials in the modification of textiles: Focus on anti-microbial properties*. Colloids Surfaces B Biointerfaces 79, 5-18; Diaz-Visurraga, J., Gutiérrez, C., Von Plessing, C., Garcia, A., 2011. *Metal nanostructures as antibacterial agents. Sci. Technol. against Microb*. Pathog. Res. Dev. Eval. 210-218; Hajipour, M. J., Fromm, K. M., Akbar Ashkarran, A., Jimenez de Aberasturi, D., Larramendi, I. R. de, Rojo, T., Serpooshan, V., Parak, W. J., Mahmoudi, M., 2012. Antibacterial properties of nanoparticles. Trends Biotechnol. 30, 499-511; Simchi, A., Tamjid, E., Pishbin, F., Boccaccini, A. R. 2011. *Recent progress in inorganic and composite coatings with bacteri-*

*cidal capability for orthopaedic applications*. Nanomedicine Nanotechnology, Biol. Med. 7, 22-39).

1. Attachment of ions to the cell membrane of the bacteria through electrostatic forces, which disrupts the membrane integrity and inhibits the transport of protons and other essential molecules in and out of the cell.
2. Metal ions penetrate the cell membranes of the bacteria and bind to their DNA thereby inhibiting their replication and impede ATP production.
3. By forming reactive oxygen species which are free radicals that cause an irreversible stress on the bacterial cells causing them to rupture and thereby leading to cell death.

XHA scaffolds showed the highest bactericidal activity at 24 hours against *E. coli* and *S. aureus* compared to BHA (FIG. 47). This was characterized by a great reduction in the number colonies in XHA plates inoculated with *E. coli*. XHA plates inoculated with *S. aureus* allowed more colony growth than with *E. coli* but the colonies were less densely clustered and in lower number than those of BHA inoculated with the same bacterium. The minimal bactericidal activity of BHA against both strains of bacteria can be attributed to the presence of trace elements in the bovine bone (Akram et al., 2014) and we can attribute the significantly high antibacterial activity of the XHA scaffolds against both *E. coli* and *S. aureus* to the Mg and Sr ions present in the XHA scaffold as a result of them being substituted into the BHA lattice during the sol-gel method. Lin et al; demonstrated the significantly high antibacterial effect of Sr-HA against Gram-positive and Gram-negative strains of bacteria in comparison to pure HA (Lin, Y., Yang, Z., Cheng, J., Wang, L., 2008. *Synthesis, characterization, and antibacterial property of strontium half and totally substituted hydroxyapatite nanoparticles*, J. Wuhan Univ. Technol. Sci. 23, 475-479) and their findings agreed with the results of a similar study conducted by Ravi et al., (Ravi, N. D., Balu, R., Sampath Kumar, T. S., 2012. Strontium-Substituted Calcium Deficient Hydroxyapatite Nanoparticles: Synthesis, Characterization, and Antibacterial Properties. J. Am. Ceram. Soc. 95, 2700-2708).

While the preferred embodiments of the present invention have been described in detail hereinabove, it should be understood that various changes, adaptations, and modifications may be made therein without departing from the spirit of the invention and the scope of the appended claims. It will be obvious to a person skilled in the art that the present invention may be embodied in other specific forms without departing from its spirit or essential characteristics. The described embodiments are to be considered in all respects only as illustrative and not restrictive.

We claim:

1. A process of preparing ion substituted bovine-derived hydroxyapatite, said process comprising:
   mixing stoichiometric amounts in the range of 0.01 $gmol^{-1}$ to 10 $gmol^{-1}$ of a phosphate precursor and an ion precursor in de-ionized water at a temperature in the range of 70° C. to 90° C. to obtain phosphate-ion precursor solution;
   adding of a solution of a stoichiometric amount in the range of 0.01 $gmol^{-1}$ to 10 $gmol^{-1}$ of calcium precursor in de-ionized water to the phosphate-ion precursor solution to obtain a reaction mixture;
   placing bovine-derived hydroxyapatite into the reaction mixture at a pH value in the range of 9.0 to 12.0, and stirred at 70-90° C. for 1-8 hours to obtain the ion-substituted bovine-derived hydroxyapatite; and heating the ion-substituted bovine-derived hydroxyapatite at a temperature in the range of 300° C. to 1200° C. for 1 to 8 hours.

2. The process as claimed in claim 1 for preparing silicon substituted bovine-derived hydroxyapatite, said process comprising:

mixing stoichiometric amounts in the range of 0.01 gmol$^{-1}$ to 10 gmol$^{-1}$ of ammonium hydrogen phosphate and silicon tetraacetate in de-ionized water at a temperature of in the range of 83° C. to 88° C. to obtain phosphate-silicon precursor solution;

adding of a solution of stoichiometric amount in the range of 0.01 gmol$^{-1}$ to 10 gmol$^{-1}$ calcium nitrate tetrahydrate in de-ionized water to the phosphate-silicon precursor solution to obtain a reaction mixture;

placing bovine-derived hydroxyapatite into the reaction mixture at a pH value of 10.0 to 11.0, adjusted using 40-70 ml of ammonium hydroxide solution and stirred at a temperature in the range of 83° C. to 88° C. for 3 to 6 hours to obtain the silicon-substituted bovine-derived hydroxyapatite; and heating the silicon-substituted bovine-derived hydroxyapatite at a temperature in the range of 550° C. to 650° C. for 3 to 6 hours.

3. The process as claimed in claim 1 for preparing magnesium-strontium co-substituted bovine-derived hydroxyapatite, said process comprising:

mixing stoichiometric amounts in the range of 0.01 gmol–1 to 10 gmol–1 of ammonium hydrogen phosphate and equimolar quantities of magnesium chloride hexahydrate and strontium nitrate in de-ionized water at a temperature in the range of 83° C. to 88° C. to obtain phosphate-magnesium-strontium precursor solution;

adding of a solution of stoichiometric amount in the range of 0.0lgmol–1 to 10 gmoi–1 of calcium nitrate tetra hydrate in de-ionized water to the phosphate-magnesium-strontium precursor solution to obtain a reaction mixture;

placing bovine-derived hydroxyapatite into the reaction mixture at a pH value of 10.0 to 11.0, adjusted using 40 ml to 70 ml of ammonium hydroxide solution stirred at a temperature range of 83° C. to 88° C. for 3 to 6 hours to obtain the magnesium-strontium co-substituted bovine-derived hydroxyapatite; and heating the magnesium-strontium co-substituted bovine-derived hydroxyapatite at a temperature in the range of 550° C. to 650° C. for about 3 to 6 hours.

4. The process as claimed in claim 2, wherein the Calcium/Phosphate molar ratio is in the range of 1.5 to 2.0, and the Calcium/(Phosphate+Silicon) molar ratio is in the range of 1.0 to 2.0.

5. The process as claimed in claim 3, wherein the Calcium/Phosphate molar ratio is in the range of 1.5 to 2.0, and (Calcium +Magnesium+Strontium)/Phosphate molar ratio is in the range of 1.5 to 2.0.

6. The process as claimed in claim 4, wherein the Calcium/Phosphate molar ratio is 1.73 and the Calcium/(Phosphate+Silicon) molar ratio is 1.67.

7. The process as claimed in claim 5, wherein the Calcium/Phosphate molar ratio is 1.67 and the (Calcium+Magnesium+Strontium)/Phosphate molar ratio is 1.67.

\* \* \* \* \*